Oct. 3, 1944.  A. H. DICKINSON ET AL  2,359,630
SORTING MACHINE
Filed Dec. 18, 1940  12 Sheets-Sheet 4
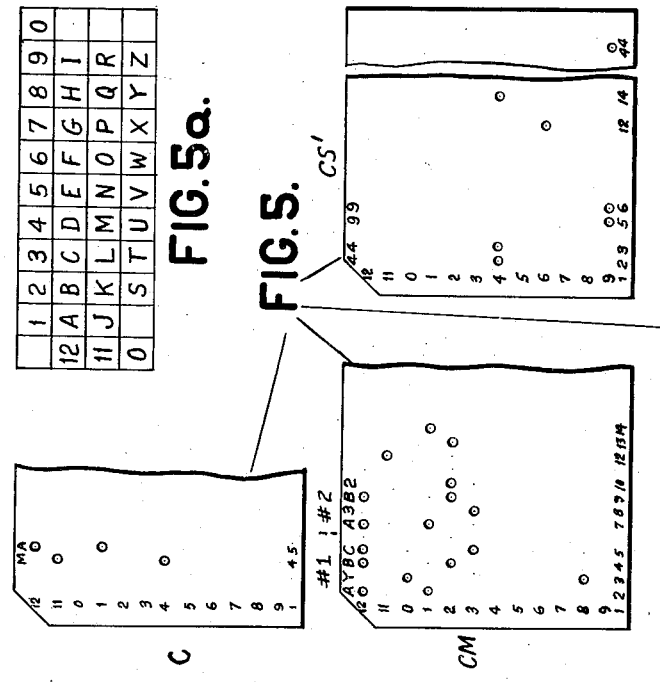
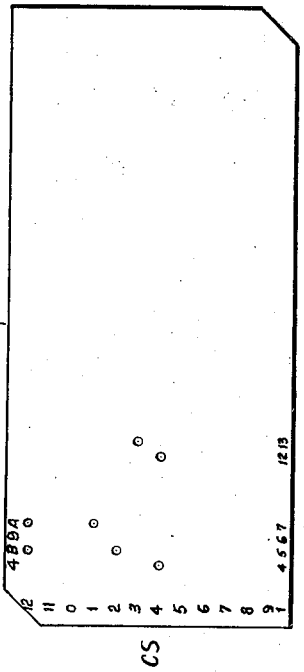
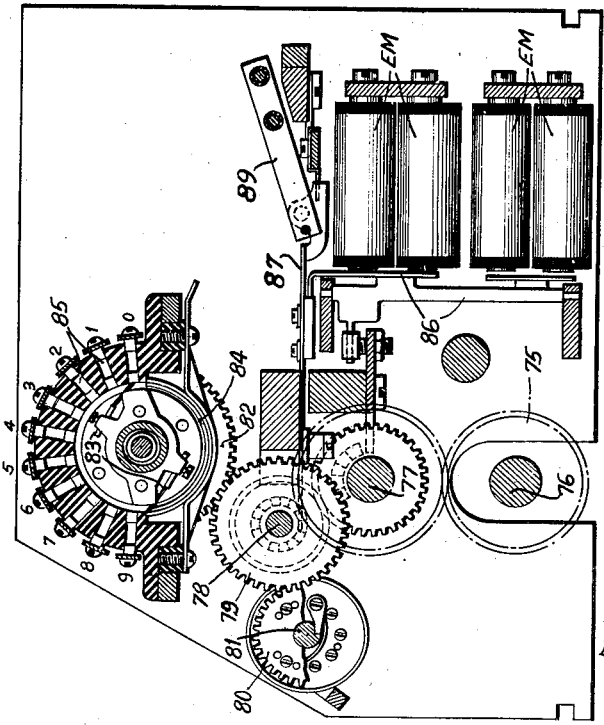
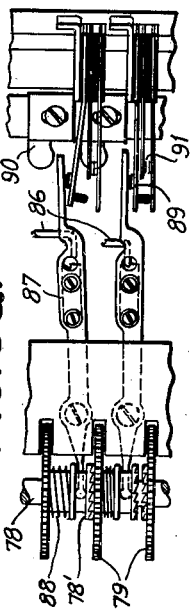

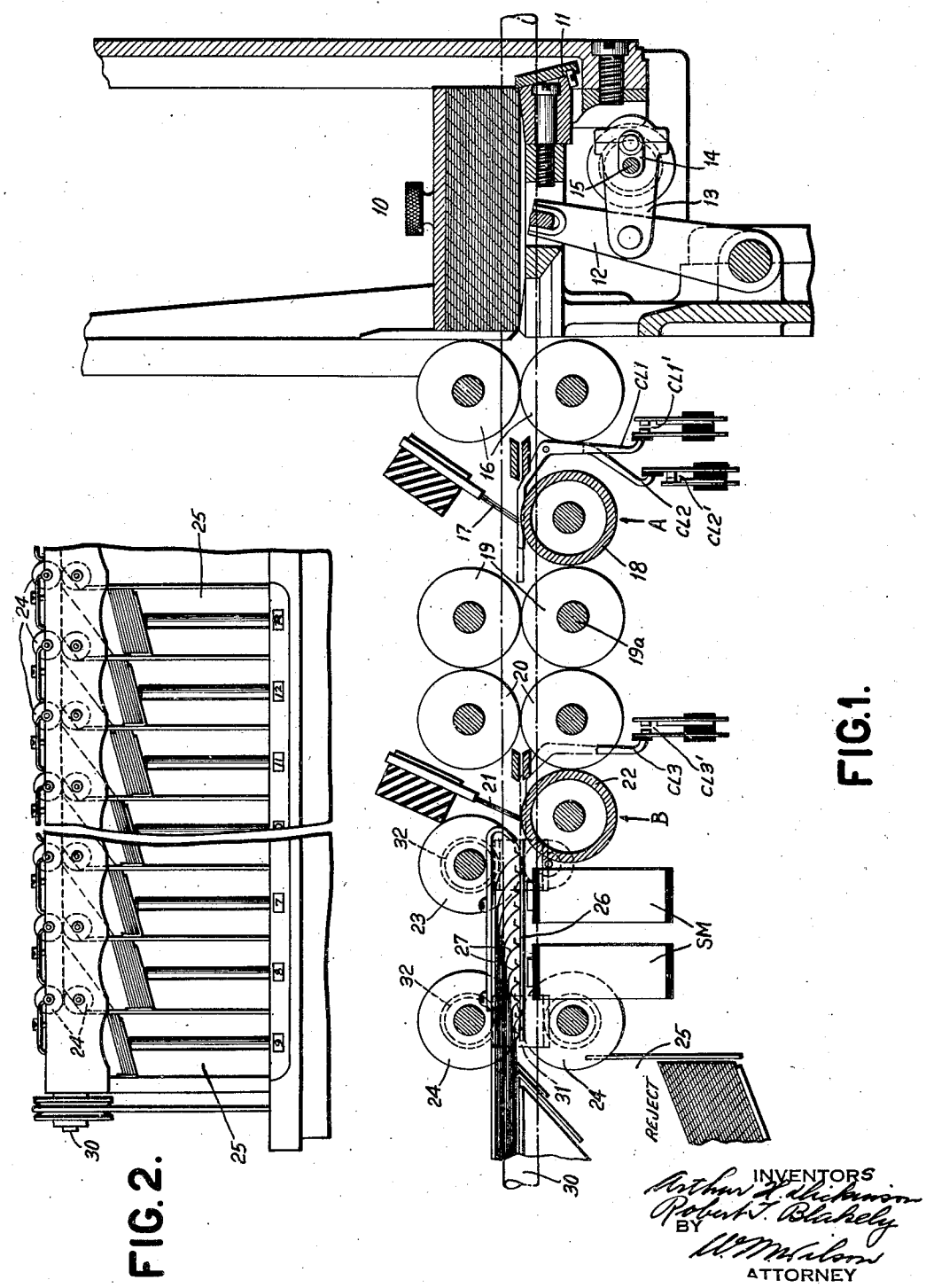

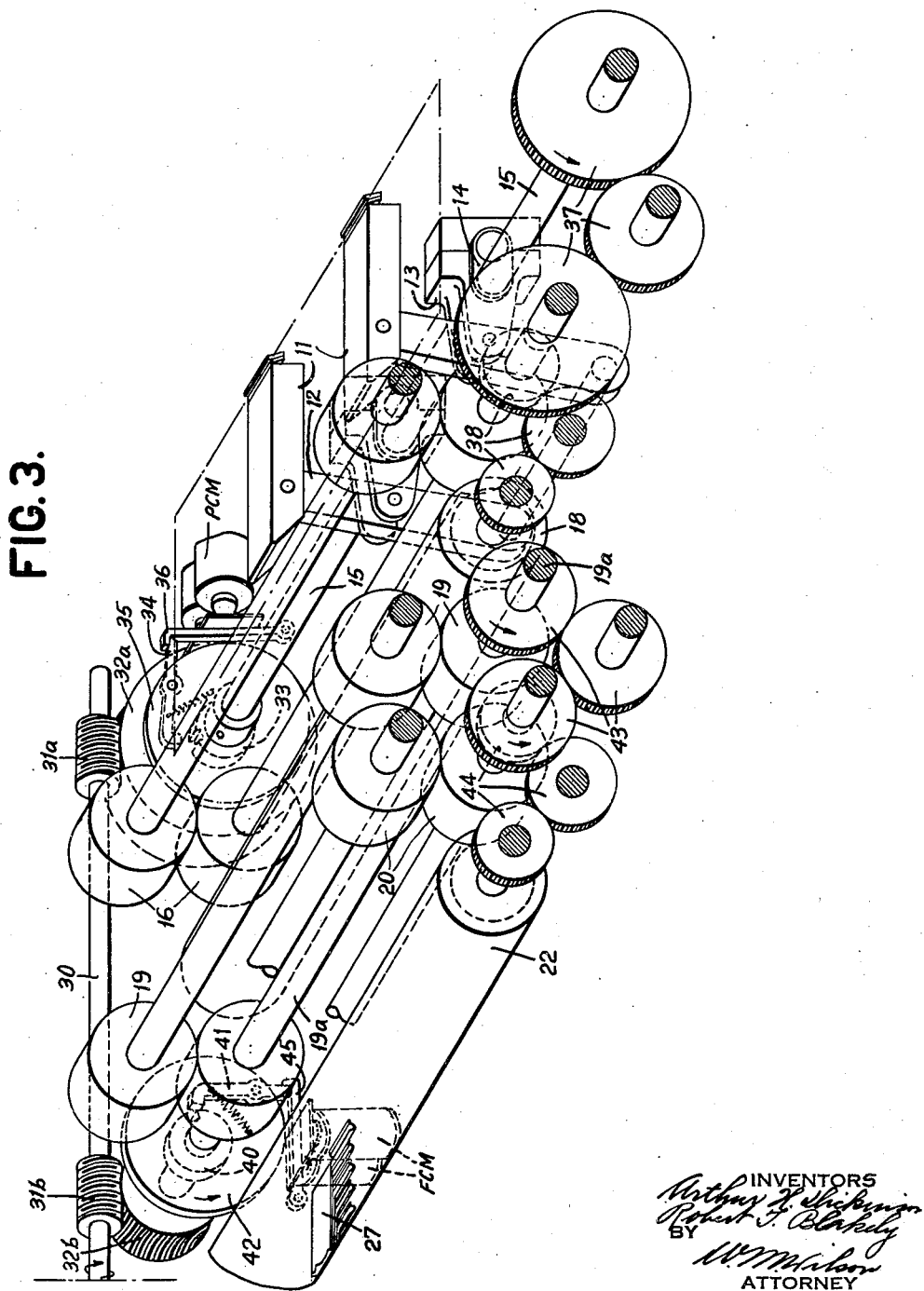

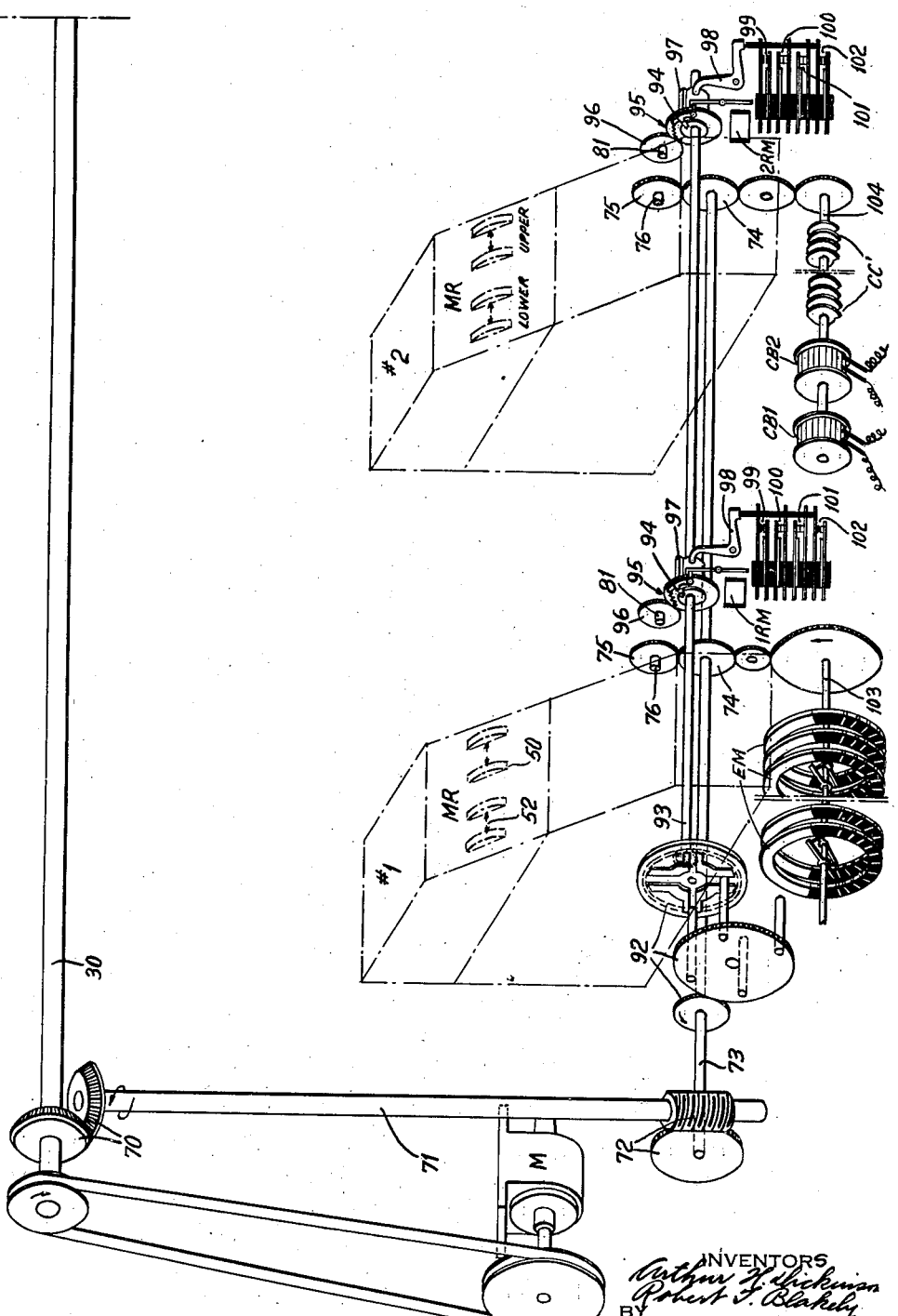

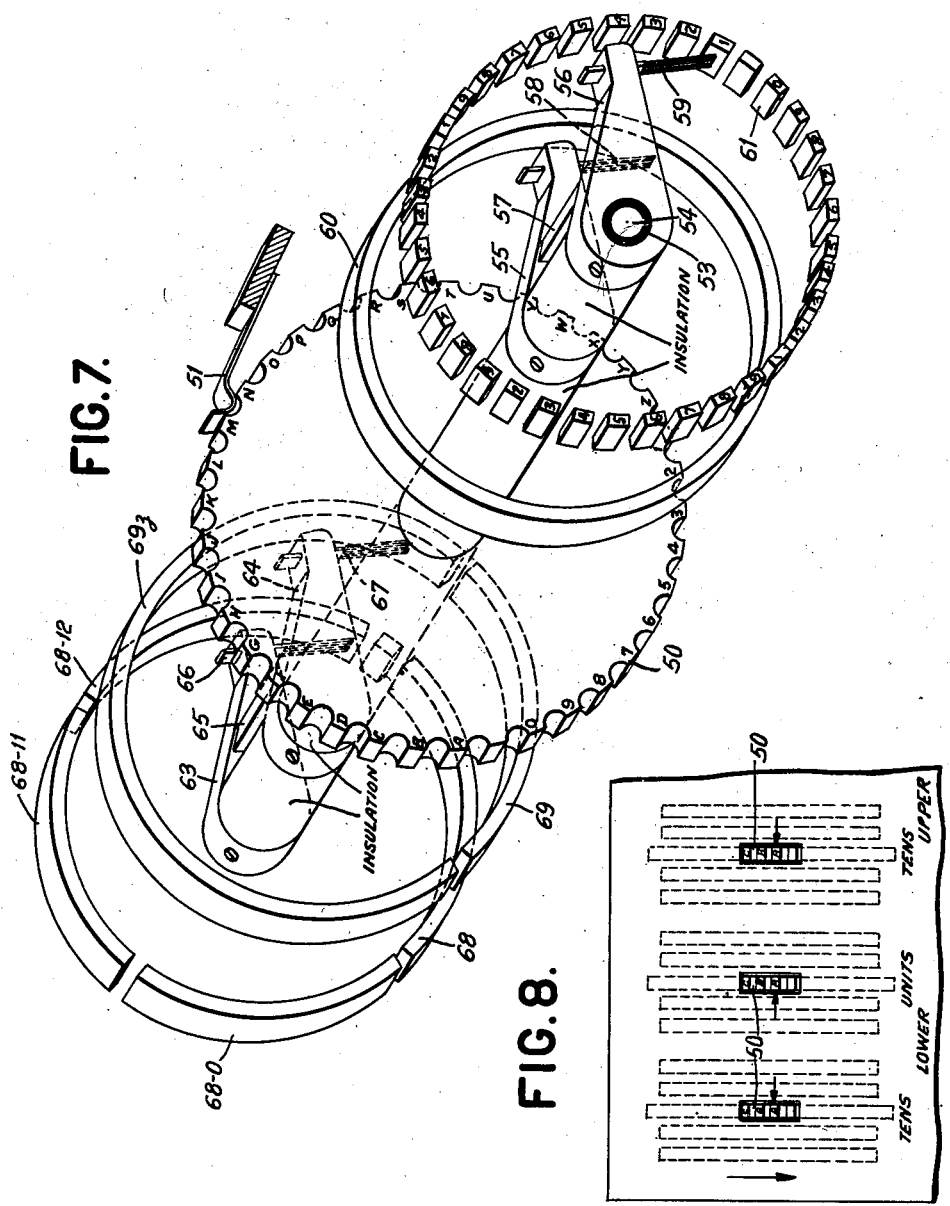

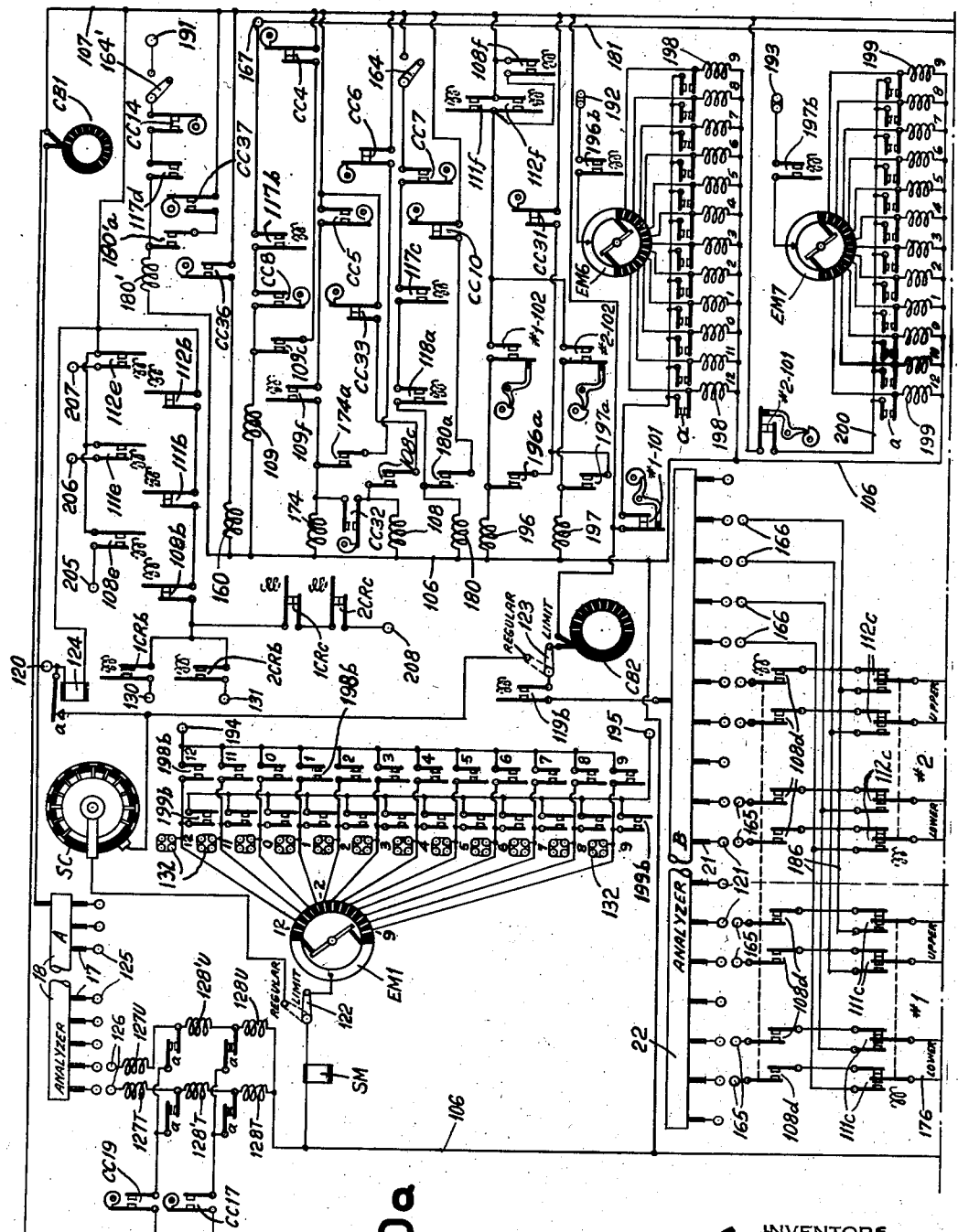

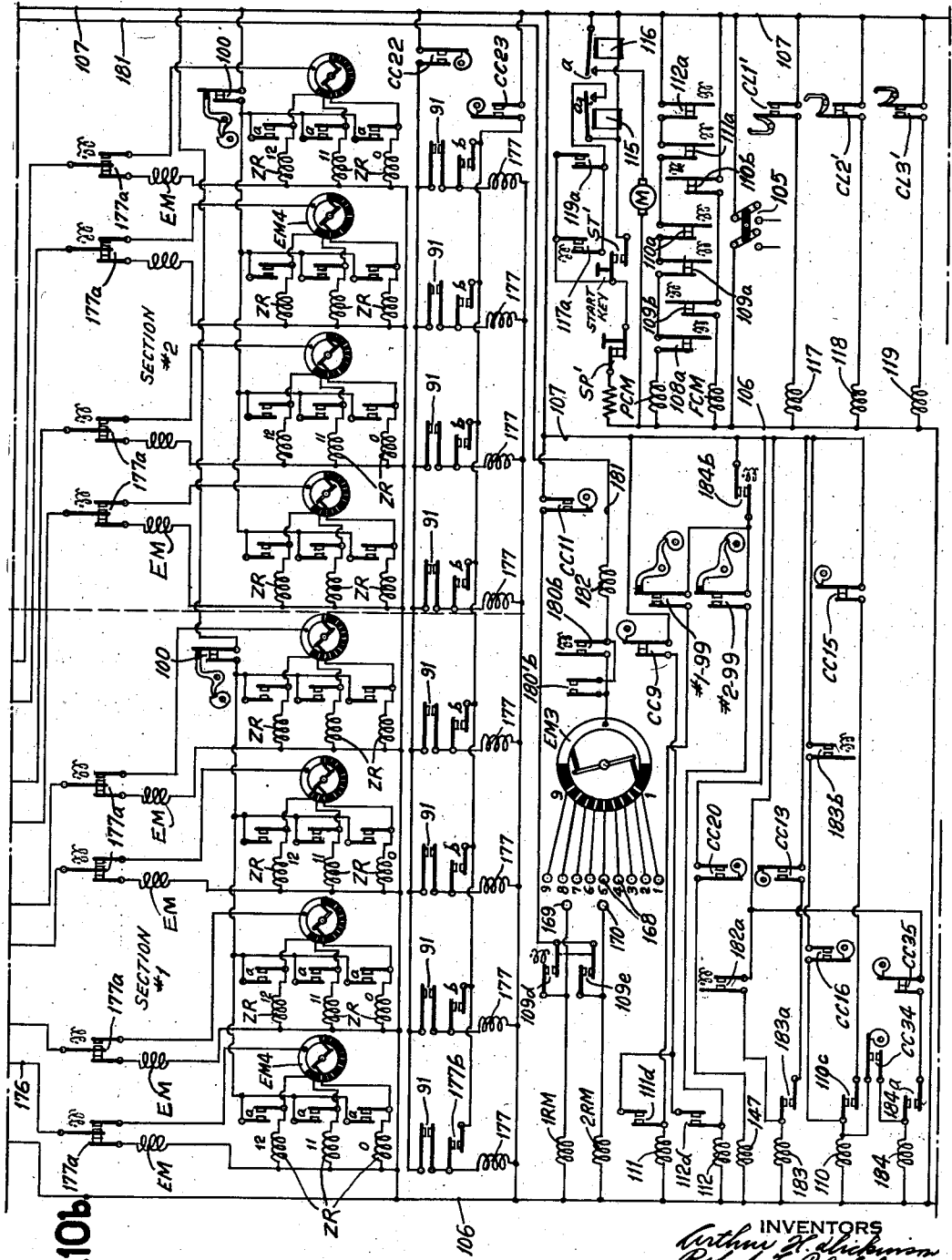

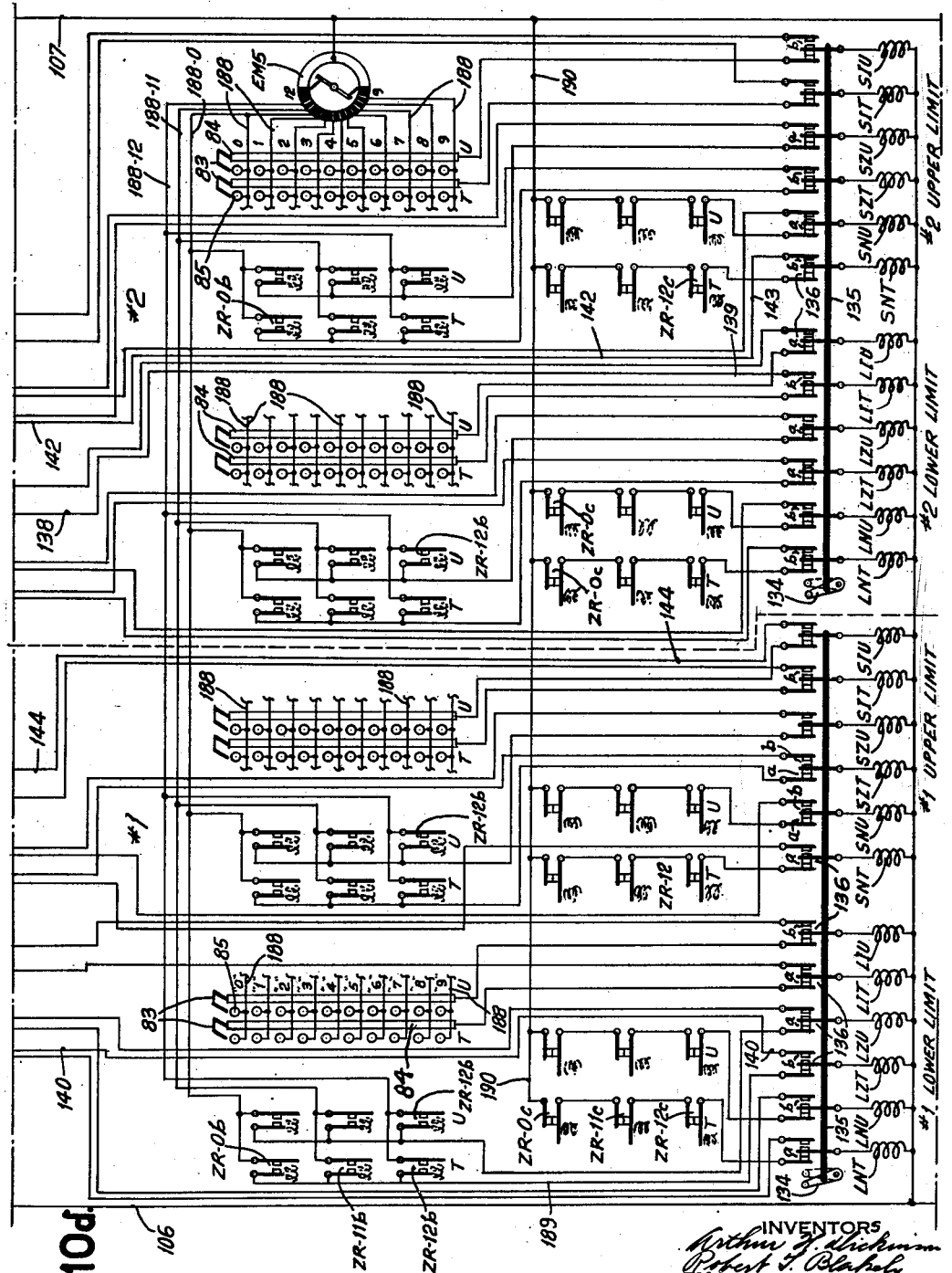

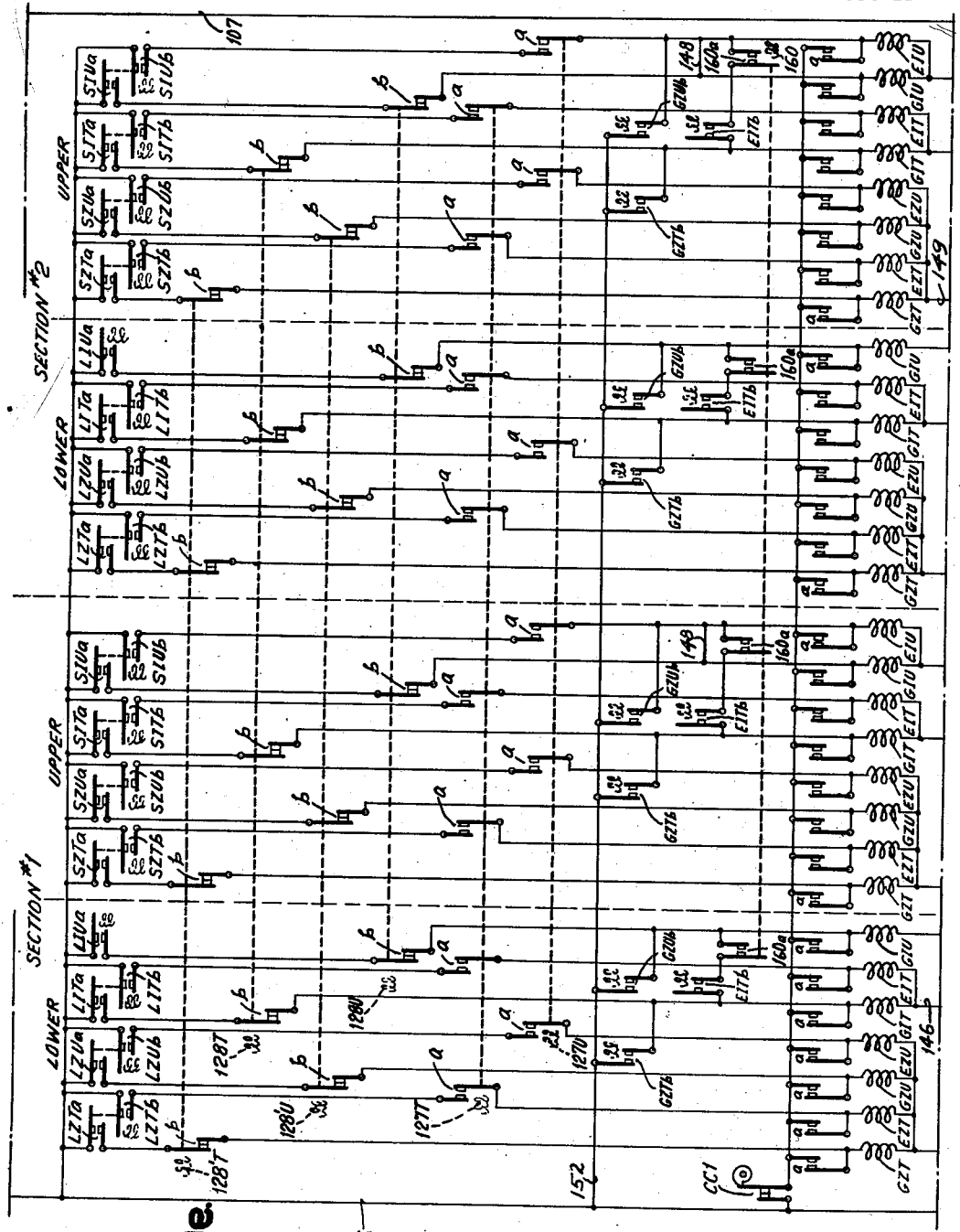

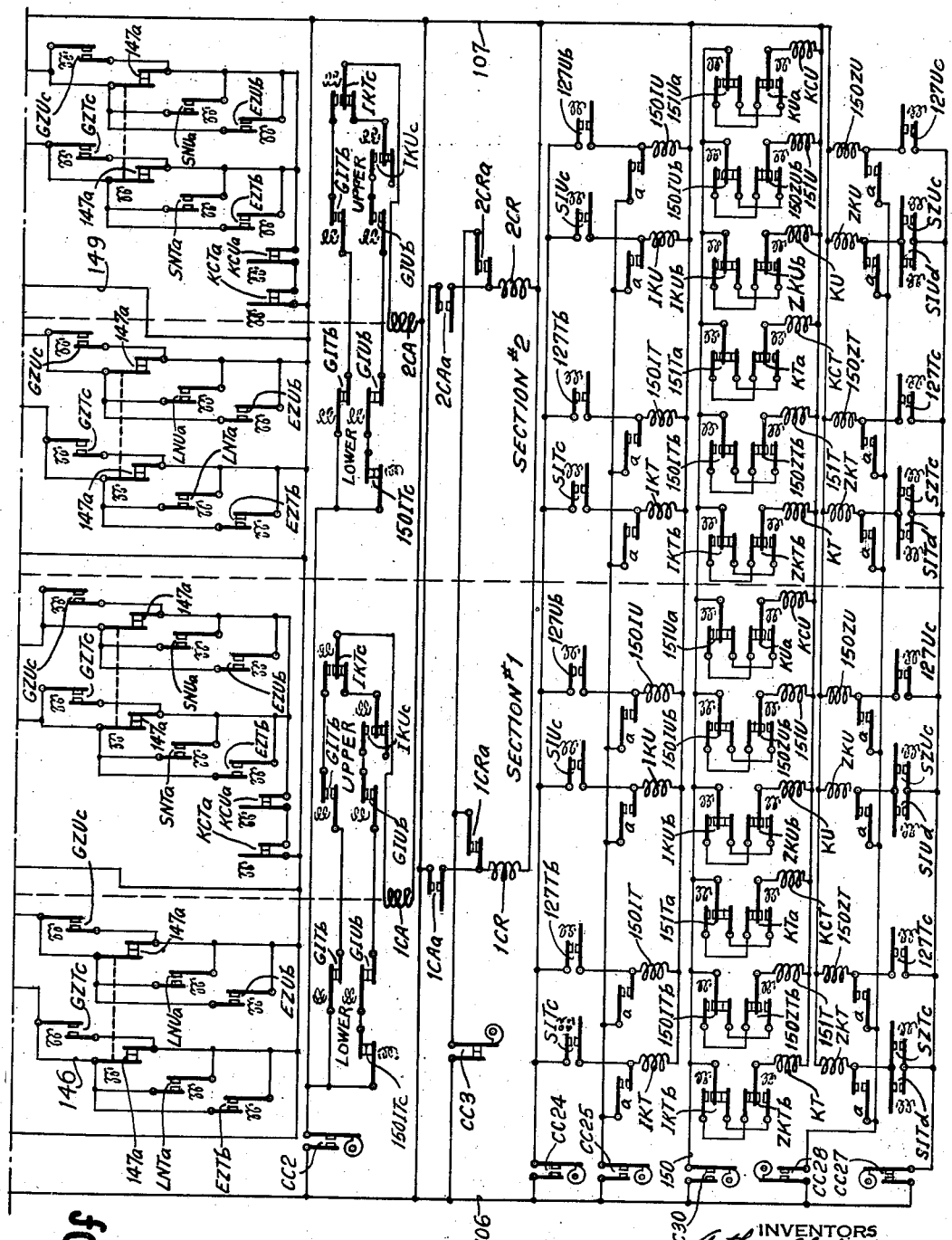

Patented Oct. 3, 1944

2,359,630

UNITED STATES PATENT OFFICE 2,359,630

SORTING MACHINE

Arthur H. Dickinson, Scarsdale, N. Y., and Robert T. Blakely, Ridgewood, N. J., assignors to International Business Machines Corporation, New York, N. Y., a corporation of New York Application December 18, 1940, Serial No. 370,674

20 Claims. (Cl. 209—110)

This invention relates to a record sorting machine or the like and is directed to improvements in the machine disclosed in a prior application, Serial No. 362,499, filed October 24, 1940, of common ownership.

An object of the present invention is to provide means for sorting records according to a comparison of combinationally designated alphabetic data with limit data.

A further object of the invention is to provide means for sorting records according to a comparison of alphabetic or numerical data or a combination of alphabetic and numerical data with alphabetic or numerical or a combination of alphabetic and numerical limit data.

A further object resides in means for comparing data on records with represented data in a suitable representing means to determine whether the represented and record data agree or disagree in kind of data; i. e., whether the represented and record data are similarly alphabetic, numerical, or similar combinations of numerical and alphabetic data.

A further object resides in the provision of means whereby the machine is controlled according to the comparison of data on a record with data represented in a representing means both as to the relative magnitude of the data and as to their agreement or disagreement in kind.

A further object of the invention is to provide means controlled by a special record to preselect a destination to which records are to be sorted when data thereon are found to compare favorably with data in a suitable representing means.

A further object of the invention is to provide means for storing combinational or component characteristics of items with means for conditioning the storing means under control of and in accordance with combinational data representations on a record.

A further object of the invention is to provide for sorting of a record which bears limit data to be compared with data on following records to any of several selected destinations.

A further object of the invention is to provide for selective sorting to one of different selected destinations of a record having data outside the upper and lower limits of a given range of data.

A further object of the invention is to provide means for sensing a record while in motion for component or combinational designations of an item and to compare such designations with component designations of a control item to determine which item is greater.

A further object of the invention resides in the provision of electrical means for electrically representing combinational characteristics or designations of upper and lower limit items of a limit range with means for comparing the electrical representations of the characteristics with electrical equivalents of combinational characteristics of items on records to ascertain whether the record data lie within the limits of the range.

A further object of the invention is to electrically compare combinational designations of a control item with combinational designations of an item represented on a record to determine which is greater.

In general, the preferred embodiment of the invention comprises known sorting means in which a sorting magnet is energized at a differential time of a cycle to open a path between the entrance ends of a pair of guide blades. A record moves into the opened path and is led by the guide blades to one of a plurality of receiving pockets.

According to my invention, a pair of analyzing stations are provided at which means are provided to successively sense the records for data designations. The records have parallel columns of index positions 9 to 0, 11, and 12 of which positions 0, 11, and 12, may be referred to as zone positions and of which the others may be termed intrazone positions. According to a given code, digits are represented by singly perforating a column in positions 9 to 0 while an alphabetic item is represented by a combination of zone and intrazone perforations in a column. A plurality of record columns are selected as a control field and the perforations in the control field are sensed at the leading analyzing station and converted into differentially timed equivalents. The differentially timed equivalents are compared with differentially timed electrical equivalents of limit data. The limit data may be represented on manual or automatic representing means, alternatively selected for operation during a run of records through the machine. The limit data are set up in the representing means as combinational characteristics representing data by the same code as used for representing data on the records. Each limit section of a limit range has quantitative zone and intrazone comparing relays respectively controlled by the differentially timed electrical equivalents of the zone and intrazone characteristics of the record item and limit item. The quantitative comparing relays determine the relation in time and, thereby, the magnitude of the limit data characteristics to the record data characteristics. Means are provided to bring the comparisons by the zone and intrazone relays of each limit section into conjunction, to determine whether the limit data of the section are greater than the record data. The characteristics of the record data and limit data are also read out to control qualitative comparing relays which compare the data to determine whether they agree or disagree in kind of data.

When the upper and lower limits of a range are found by the quantitative comparing relays to encompass the data in the control field of the record and when, further, the data are found by the qualitative comparing relays to agree, a sorting control relay is operated. This sorting control governs energization of the sorting magnet to direct the record to a preselected receiving pocket. A plurality of limit ranges are provided, each with its own sorting control, to enable the record to be sorted to one or another receiving pocket depending on which limit range encompasses the record data. Novel means are provided to reject or selectively sort a record whose data lie outside all the limit ranges.

The automatic limit representing means are set up under control of special records. One such record may bear the data for a plurality of limit ranges, while another such record may bear the data for only one limit range. When a special record is detected, the previous limits of a range or ranges are canceled out of the automatic representing means, and new limits are read out of the record into the automatic representing means. The special record may also preselect a receiving pocket or pockets for the records whose control data are to be compared with the limits. The special record may be rejected after its limits are read out or may be sorted to a selected receiving pocket.

According to my invention, novel automatic representing and storing means for combinationally designated data are provided. This representing means comprises an accumulator type of element adapted to be set to represent either digits 9 to 0 or intrazone points 9 to 1 of alphabetic data and also comprises zone designation representing means in the form of columns of relays, each column adapted to be set up according to the zone points read out of a column of the special record.

Other objects of the invention will be pointed out in the following description and claims and illustrated in the accompanying drawings, which disclose, by way of example, the principle of the invention and the best mode which has been contemplated, of applying that principle.

In the drawings:

Fig. 1 is a sectional elevation through the rear portion of the sorting machine.

Fig. 2 shows, in elevation, receiving pockets of the sorting machine.

Fig. 3 is an isometric view of the record feeding and driving means.

Fig. 4 is a diagrammatic outside view of the limit representing means, and also shows the drive connections to the intrazone limit automatic representing means and certain electrical elements.

Fig. 5 indicates the various records handled by the machine.

Fig. 5a is a code table, indicating the component characteristics of the various data.

Fig. 6 is a sectional elevation through an automatic intrazone and digit limit representing means.

Fig. 6a is a plan view of certain clutch and control elements of intrazone and digit limit automatic representing means.

Fig. 7 is an isometric view of one of the manual limit representing means.

Fig. 8 is a front outside view showing a fragment of the manual representing means.

Figure 9:
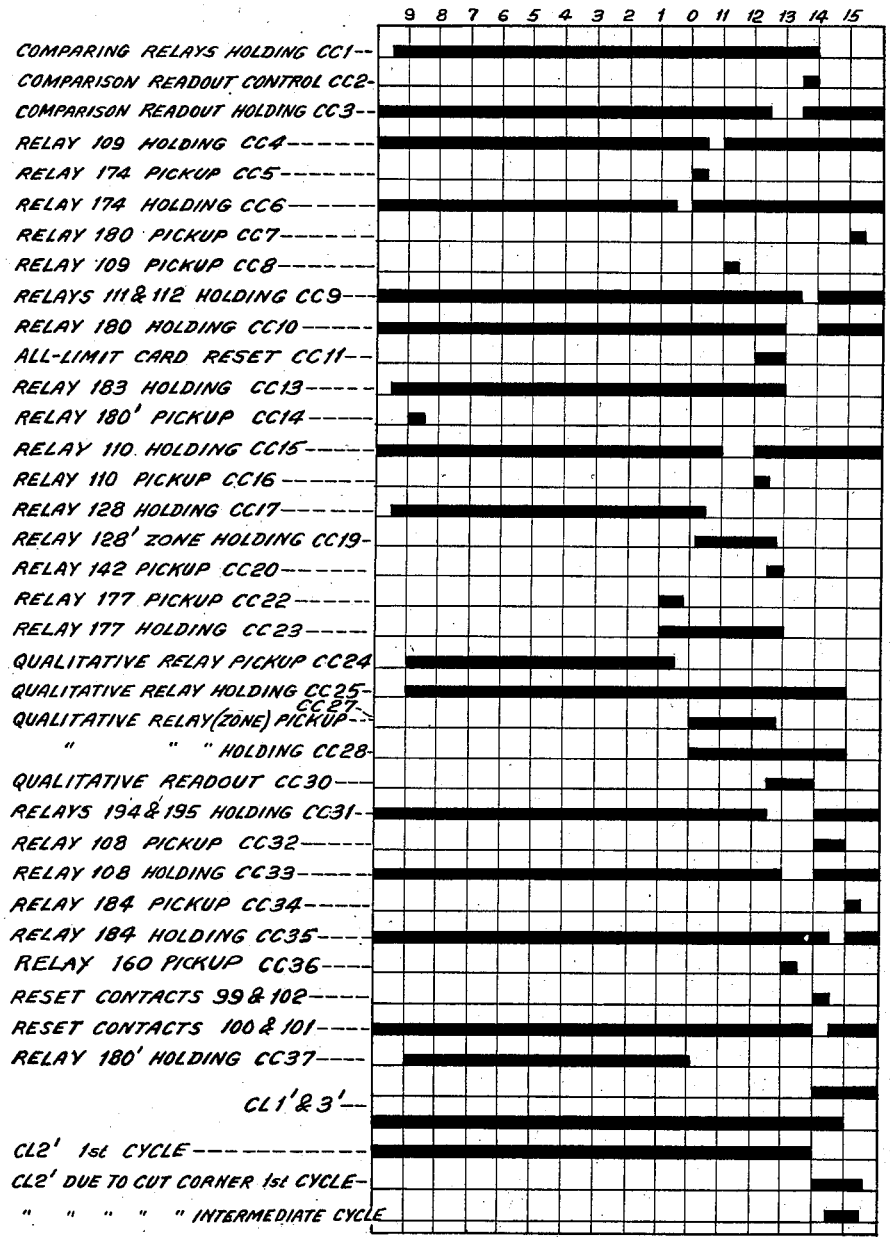

Fig. 9 is a timing chart; and

Figs. 10a, b, c, d, e, and f show the circuits of the machine.

The record cards and limits

Fig. 5 shows four record cards designated C, CM, CS, and CS'. Each card has a plurality of columns, each column with twelve index postions 9 to 0 11, and 12. Letters of the alphabet and numbers may be represented on these cards. Fig. 5a is a chart showing the codes designating letters and digits. Each letter of the alphabet is represented by a combination of two perforations in a column, one perforation being in one of the 9 to 1 positions and the other in one of the 0, 11, and 12 positions. The 9 to 1 positions may be referred to as the within-zone or intrazone positions and the 0, 11, and 12 positions as the zone postions. The combinations including an intrazone perforation with a "12" perforation represent letters A to I and are in the "12" zone. The letters J to R are represented by intrazone points plus an "11" perforation and are in the "11" zone. The letters S to Z are represented by intrazone perforations 2 to 9 plus a "0" perforation and are in the "0" zone. The digits 9 to 0 are represented by singly perforating a column in the corresponding index positions.

The limits may be numerical or alphabetical or a combination of the two. They may be multi-denominational, two orders for example. In such case, either order may contain a letter or digit and the two orders may contain a combination of letter and digit; for example A2 or 3T. The letters are considered as having magnitudes corresponding to their position in the alphabet. Thus, A is the lowest alphabetic value and Z is the highest, and any of limits AA to AZ is lower than any limit BA to BZ. Likewise any limit A0 (zero) to A9 is lower than any limit B0 (zero) to B9. The higher of two limit orders is the controlling order. Thus, Z1 is higher than A9, 9A is higher than 1Z; and ZA is higher than YZ.

The limits may be manually set up in manual limit representing means shown in Figs. 4, 7, and 8 and which will be explained later. When the limits are set up in the manual representing means the entire stack of cards to be sorted will contain only detail cards C, each of which will have a control field with detail data to be compared with the manually selected limits.

Alternatively, the limits may be set up automatically in automatic limit representing means shown in Figs. 4, 6, and 6a, which will be explained later. The limits are entered in the automatic limit representing means under control of limit cards CM, CS, and CS' (Fig. 5). The card CM bears representations of a plurality of limit ranges, each range having an upper and lower limit. For convenience, the card CM may be referred to as an all-limit card. When a plurality of new limit ranges are to be automatically entered in the automatic representing means, a card CM, bearing the limits of the plurality of ranges, precedes a group of detime of energization of a sorting magnet SM during a cycle (Fig. 9) in which the card is passing through analyzer B. The armature 26 of the magnet SM supports the downwardly biased entrance ends of guide blades 27. Each pair of blades defines a passage for the card leading to a different sorting pocket. If the card moves below all the blades, it goes to the reject pocket. Upon energization of magnet SM at a differential time of the cycle, it permits those blades unsupported by the card to drop and open a path for the card to a pocket 25—9 to 0, 11, or 12.

The prime mover of the machine is a motor M (Fig. 4). Through a belt and pulley drive, the motor rotates an upper, horizontal shaft 30. Spaced worms 31 (Figs. 1 and 2) on this shaft drive worm wheels 32 on the shafts of feed rolls 23 and 24 which continue in rotation as long as motor M is running. For reasons connected with the present inventions, the picker and feed means in advance of feed rolls 23 are driven through one-revolution clutches which may be disengaged by means presently described in order to interrupt picker feed and feed of the card through analyzer B. Referring to Fig. 3, shaft 30 has a worm 31a meshed with a worm wheel 32a. This worm wheel is rigid with a clutch collar 33 having a single notch adapted to be engaged by a clutch dog 34. The clutch dog is pivotally carried by a disk 35 fastened to the picker shaft. In disengaged position, clutch dog 34 is latched by the armature lever 36 of a clutch magnet PCM. Energization of this magnet causes release of the dog to enable it to engage the notch of clutch collar 33 at the beginning of a cycle (Fig. 9) and thereby cause rotation of picker shaft 15. Through gearing 37, shaft 15 rotates the lower shaft of feed rolls 16. The upper feed rolls are driven through friction by the lower feed rolls. Further gearing 38 is provided to rotate contact roll 18 of analyzer A from the shaft of the lower feed rolls 16. When clutch magnet PCM is de-energized, its armature 35 intercepts the clutch dog 34 and causes the picker shaft, as well as feed rolls 16 and contact roll 18 driven thereby, to stop rotating at the end of a cycle.

Clutch means also is provided between shaft 30 and the lower shaft 19a of feed rolls 19. This clutch means comprises a worm 31b on shaft 30 meshed with a worm wheel 32b rotatable about the shaft 19a. Rigid with wheel 32b is a clutch collar 40 having a single notch adapted to be engaged by a clutch dog 41 carried by a disk 42 fastened to shaft 19a. Gearing 43 is provided between shaft 19a and the shaft of the lower feed rolls 20 and gearing 44 between the latter shaft and contact roll 22 of analyzer B. The upper feed rolls 19 and 20 are driven by friction from the lower companion feed rolls. When a clutch magnet FCM is energized, it releases armature latch 45 from clutch dog 41, causing the dog to engage the notch of collar 40 at the beginning of a cycle, thereby setting the feed rolls 19 and 20 and the contact roll 22 in rotation. Deenergization of clutch magnet FCM causes the latter feed and contact rolls to be declutched at the end of a cycle.

REPRESENTING MEANS FOR THE LIMITS (Figs. 4, 6, 7, and 8)

The record cards are adapted in accordance with the present invention to be sorted according to whether control data on detail cards C (Fig. 5) lie within certain limit ranges, alphabetic or numerical or a combination of alphabetic and numerical. As an example, two sections of representing means for representing two ranges of limits are provided. These sections are designated generally as #1 and #2 (see Fig. 4). Similar elements of the different sections may be differentiated by prefixing their common reference designation by the number of the section. Each section contains manual representing means and automatic representing means which are alternatively made effective at will. Each representing means in each section has two denominational orders, tens and units for a lower limit and two similar denominational orders for the upper limit. The lower limit denominations and the elements appertaining thereto may be distinguished by prefixing letter L to their reference designations while the upper limit may be similarly distinguished by letter S. For convenience, the units order elements may be identified by suffixing letter U to the reference designations and the tens order may be similarly distinguished by letter T. It is to be understood that two sections and two denominational orders of representing means are merely used as illustrative and that a greater number of sections and orders may be provided.

*Manual representing means.*—The manual representing means is designated generally as MR. Fig. 7 shows one order of the manual representing means. Each order has an index wheel 50 notched to coact with an impositive detent 51. The lands of wheel 50 are inscribed with letters of the alphabet and digits. Wheel 50 protrudes through the casing to enable it to be manually turned to a desired limit position. The limit to which the order is set is indicated by the character on the wheel opposite a suitable index 52. Wheel 50 is suitably fixed to a sleeve shaft 53, of insulating material, rotatably mounted on a fixed shaft 54. Located to one side of wheel 50 and fastened by means such as set screws to sleeve shaft 53 is a brush carrier assembly comprising a pair of conductive arms 55 and 56 rigidly united by a conductive bridge 57. Arms 55 and 56 carry brushes 58 and 59, respectively. Brush 58 engages a contact ring 60 while brush 59 is adapted to engage one of the segments 61 of a commutator ring. The segments 61 relate to the digit and intrazone index positions of the code (Fig. 5a), and the index position to which each segment relates is indicated in Fig. 7. The assembly of elements 55 to 61 may be referred to as the intrazone readout commutator of one order of the manual representing means.

At the side of wheel 50 opposite the intrazone commutator is a zone readout commutator. This comprises arms 63 and 64 rigidly joined by a bar 65 and respectively carrying brushes 66 and 67. Brush 66 is adapted to wipe a commutator ring provided with zone segments 68—12, 68—11, 68—0, and 68. Segment 68—12 relates to the characters in the "12" zone (Fig. 5), 68—11 to the characters with zoning position "11," 68—0 to the characters in the "0" zone, and 68 to the characters represented by perforating a column in one of the 9 to 0 positions; i. e., the digits 9 to 0. Brush 67 is adapted to wipe either a segment 69Z or 69 associated respectively with the zoning segments 68—12, 11, and 0 and with the segment 68.

When index wheel 50 is set to a letter of the alphabet, brush 59 is engaged with a segment 61 corresponding to the intrazone position and brush 66 is engaged with the segment 68—0, 11, tail cards to be sorted according to the newly set up limits. In order to enable the machine to detect the presence of the limit card CM, this card is punched in a suitable column; for example, column 12, as shown in Fig. 5, with an "11" control perforation.

The limit card CS bears the limits for one range and has its lower right hand corner cut off to enable the machine to detect the presence of this card and initiate operations for inserting new limits in a selected one of a plurality of limit range representing sections. The card CS is punched in a suitable column; for example, column 12, as shown in Fig. 5, with a selection perforation 1 to 9 for selecting the section to receive the limits from the card. The card CS for each different section will have a different selection perforation. Fig. 5 shows, as an example, a section-selection perforation "4" for selecting section #1 to receive new limits. Another card CS will have a different section-selection perforation, say "7," in the same card column. When all but one of the limit ranges to determine sorting of a group of detail cards are to be retained, the group is led by a card CS bearing the new limits for the one range to be newly set up.

The limit card CS' also bears the limits for only one range and has a section-selection representation such as "6" in column 12 of card CS' (Fig. 5) for selecting the limit representing section to receive new limits from the card CS'. Differing from card CS, the limit card CS' does not have a special, right hand cut corner, but instead has a "9" perforation in a special column; for example, column 44 as shown in Fig. 5. In a manner which will be explained later, when the machine detects the "9" perforation in the special column, operations are initiated for setting up new limits in the section selected by the card CS'. A succession of such cards CS' may precede a group of detail cards, and each of the cards of the succession will set up new limits in a different section of the automatic limit representing means.

In a manner which will be explained later, the detail cards whose data lie within a range of one section or another of the limit representing means, manual or automatic, may be directed to manually preselected sorting pockets. Alternatively, automatic preselection of sorting pockets for the detail cards may be effected, as will be explained in detail later. The automatic preselection of pockets is controlled by the limit cards. For this purpose, the all-limit card CM may have two special columns with perforations for determining the sorting pockets to which the detail cards, whose data lie within two ranges, are to be sorted. One such special column will contain the pocket-selecting perforation for cards lying within one of the ranges of limits and the other special column will have the perforation for selecting the pocket for cards lying within another range. For example, in Fig. 5, card CM is provided with a perforation "2" in special column 13 to preselect the "2" sorting pocket for cards C whose detail values lie within the range of limits contained in a section #1 and is provided in column 14 with a perforation "1" to select sorting pocket "1" for detail cards whose detail data lie within the range of a section #2. The single-limit cards CS may have only one special column with a perforation for selecting the pocket for cards lying within the range of the section to be newly set up under control of the limit card. As shown in Fig. 5, card CS has a "3" perforation in column 13 to preselect pocket "3" for cards lying within the range of a #1 section. Likewise, each card CS' may have a single column with a perforation to preselect the pocket for cards lying within the range of the section whose limits are to be newly set up under control of the card CS'. In Fig. 5, the card CS' is shown as having a "4" perforation in column 14 for selecting pocket "4" for cards lying within the range of a #2 limit representing section.

The cards are arranged and fed through the machine face down and bottom first, so that index positions 9 to 1, 0, 11, and 12 are read in that order. The magnitude of the positions is determined by their order of passing through the machine. Thus, positions 9 to 1 inclusive correspond to magnitudes 9 to 1, while position 0 is considered as quantitatively greater than position 11 and position 11 as quantitatively superior to position 12.

It will be noted by reference to the code shown in Fig. 5a that all the letters of the "0" zone are higher in the alphabetic scale of values than letters of the "11" and "12" zone, and that the zone "11" letters are similarly higher than the zone "12" letters. Thus, between two letters of different zones, the letter which has a quantitatively higher zone position is quantitatively greater, regardless of the magnitude of the intrazone positions. Between two letters of the same zone, the letter which has a greater intrazone position is quantitatively greater.

THE SORTER STRUCTURE (Figs. 1 to 3)

For purposes of the disclosure, the invention has been applied to a sorter of the general type shown in Patent No. 1,741,985. Changes and additions have been made to suit the purposes of the invention. It will be understood that principles of this invention have a wider application than to the specific embodiment disclosed herein.

In detail, the sorter has a hopper 10 for the stack of cards to be sorted. Below the hopper are pickers 11 connected to rocker arms 12. Each arm 12 is linked by a member 13 to a crank arm 14 of a picker shaft 15. During a revolution of the picker shaft, pickers 11 are reciprocated and on their forward stroke feed the bottom card out of the hopper to feed rolls 16. These feed rolls advance the card to an analyzer A comprising a row of sensing brushes 17, one for each card column, and a contact roll 18. As the card is about to engage brushes 17, it operates card levers CL1 and CL2 to close card lever contacts CL1' and open card lever contacts CL2'. Before the card leaves rolls 16, it is engaged by upper and lower feed rolls 19, the lower rolls being fixed to a shaft 19a. Rolls 19 complete the feed of the card through analyzer A and advance it to feed rolls 20. The feed rolls 20 move the card to an analyzer B comprising a row of sensing brushes 21 and a contact roll 22. Just before engaging brushes 21, the card operates card lever CL3 to close contacts CL3'. When the leading end of the card passes analyzer B, it is engaged by feed rolls 23 which advance the card to the first of successive pairs of feed rolls 24. These feed rolls feed the card to one of the sorting pockets 25. There are thirteen such pockets, known as the 9, 8 ... 0, 11, 12, and reject pockets. The pocket to which the card is led depends on the or 12 corresponding to the zone position of the designation for the letter. For example, if letter A is at index position, brush 59 is on segment 61—1 while brush 66 is on segment 68—12. Readout circuits through these brushes and segments will read out character A as a limit. When index wheel 50 is set to a digit, brush 59 is on the segment 61 corresponding to the digit while brush 66 is on segment 68. The manner in which the manual limits are read out will be explained later in connection with the circuits.

*Automatic limit setting means.*—The automatic limit representing or setting means is adapted to be set under control of limit record cards CM, CS' or CS (Fig. 5) in accordance with alphabetic or numerical or a combination of alphabetic and numerical limits represented on the cards. To enable combinationally coded characters derived from limit cards to be stored as a limit for a group of detail cards C, relay means which will be explained later in the circuit description are employed for representing and storing the zone positions of such characters. The intrazone portions of alphabetic characters and the digits are set up and stored in entry receiving means of the nature disclosed in Patents Nos. 1,976,617 and 2,097,145. Since the entry receiving means in the present case does not serve to accumulate data, the carry means between denominational orders is preferably omitted. The entry receiving means for the numerical or intrazone portion of a designation will now be explained, with the explanation confined to details necessary to an understanding of the purposes of the present invention. For other details, resort may be had to the aforementioned patents.

Referring to Fig. 4, shaft 30, through bevel gears 70, rotates a vertical shaft 71. Worm gearing 72 affords drive from shaft 71 to a horizontal drive shaft 73. Shaft 73 has a gear 74 for each of sections #1 and #2, each gear meshed with a gear 75 on a shaft 76. Referring to Fig. 6, shaft 76 is geared to a shaft 77 and the latter is geared, in turn, to an accumulator clutch shaft 78 (see also Fig. 6a). Individual clutch means 78' for each order is provided between shaft 78 and a gear 79. Gear 79 is meshed with a gear 80, rotatably mounted on a reset shaft 81, and with the gear 82 of a readout commutator. The gear ratios are such that gear 82 makes half a revolution for one turn of gear 80. Gear 82 carries the usual brushes 83 of a readout commutator. During one half a turn of gear 82, one brush 83 is engaging the common commutator segment 84 while the other brush is wiping the spaced, individual segments 85—0 to 9; during the next half turn of gear 82, the positions of the brushes 83 are reversed. The entry of values equivalent to positions 9 to 1 (which may represent intrazone positions of alphabetic data or may represent digits 9 to 1) is effected by energizing an entry magnet EM (one for each order) at a differential time of the cycle (see Fig. 9) corresponding to the perforated position 9 to 1 sensed by a brush 17 as a limit card is in motion through analyzer A. Energization of magnet EM rocks its armature 86 (see also Fig. 6a) to release a clutch lever 87 for counterclockwise movement (Fig. 6a) under the influence of the usual clutch spring 88 and a leaf spring 89. As the clutch lever rocks counterclockwise, it renders the clutch means 78' between the gear 79 (of the order corresponding to the one containing the energized magnet EM) and shaft 78 effective. Gear 79 and the parts driven thereby are thereupon set in rotation at the differential time of the cycle corresponding to the sensed, perforated position 9 to 1 and rotate until the "0" point of the cycle. At the "0" point, cyclically operating cam means (not shown), such as disclosed in Patent No. 1,976,617, causes movement of a mechanical knock-off 90 to engage and restore the clutch lever 87 to latched position, thereby also causing gear 79 to be declutched. Thus, the gear 79 and the parts driven thereby rotate through a number of steps equal to the number of cycle points between the differential point at which magnet EM was energized and the "0" point, or in other words, a number of steps equal to the value corresponding to the sensed position 9 to 1.

When the clutch lever 87 was released by armature 86 of magnet EM in order to clutch the related gear 79 to shaft 78 for rotation, the leaf spring 89 withdrew an insulating lug from the lower spring blade of a pair of so-called list contacts 91, permitting these contacts to close. These remain closed up to the "0" point of the cycle, at which point the parts are restored, to normal positions. Thus, for each order of the automatic representing means, a pair of list contacts 91 is provided to be closed if any 9 to 1 entry is made in the order and to remain closed until the "0" cycle point. The purpose of the list contacts will be explained subsequently.

Means such as disclosed in Patent No. 2,097,145 are provided to restore the automatic representing means comprising the commutators 83—85 to zero. Separate resetting means is provided for each of sections #1 and #2 to enable them to be reset individually. Referring to Fig. 4, the reset means comprises Geneva gearing 92 between shaft 73 and a shaft 93. Shaft 93 carries the drive elements of reset clutches 94 which are rendered effective for a cycle by energization of reset magnets RM. The driven portion of each reset clutch comprises a gear 95 meshed with a gear 96 on reset shaft 81. When magnet RM of a section is energized, it causes reset shaft 81 of the section to make one turn during which, through well-known means such as described in Patent 2,097,145, the gears 80 are picked up and returned to zero positions. Since brushes 83 of the readout commutators are geared to gears 80, the brushes also will be reset to zero positions.

The driven gear 95 of each reset clutch 94 is rigid with a cam 97 which during rotation of the gear acts through a follower 98 to temporarily change the normal state of a plurality of mutually insulated switches 99, 100, 101, and 102. Switches 99 and 102 thereby are momentarily closed and switches 100 and 101 are momentarily opened.

Shaft 73 drives a shaft 103 carrying the brushes of emitters EM individually identified in the circuit diagram. Also driven by shaft 73 is a shaft 104 carrying cams CC' for operating CC cam contacts shown in the circuit diagram and the timing of which is indicated in Fig. 9. Shaft 104 also carries circuit breakers CB1 and CB2.

CIRCUITS AND OPERATION

The machine is capable of several different types of operation. These are: "regular sorting" in which a stack of cards is sorted according to values in a selected card column; sorting of detail cards C (Fig. 5) according to manually selected limit ranges; sorting of cards C according to limit ranges selected by an all-limit card CM (Fig. 5); and sorting of cards C according to limit ranges selected by single-limit cards CS or CS' (Fig. 5).

To start operations of any type, the operator closes main switch 105 (Fig. 10b, lower right corner), connecting current lines 106 and 107 to a suitable source of supply. As soon as power is placed on lines 106 and 107, clutch magnets PCM and FCM (Fig. 3) are energized as follows (Fig. 10b, lower right):

*PCM:* Line 106, PCM, relay contacts 108a, 109a, 110a, 111a, and 112a, line 107.

*FCM:* Line 106, FCM, relay contacts 109b, 110b, line 107.

With clutch magnets PCM and FCM energized, the entire card feed means is prepared for operation.

The following additional starting operations are common to regular sorting and sorting according to manually selected limit ranges. Referring to the lower right hand corner of Fig. 10b, the operator depresses the start key, closing contacts ST' to complete a circuit extending also through stop key contacts SP', relay coil 115, and motor relay coil 116. Coil 116 closes its "a" contacts to establish the circuit of motor M. Shaft 30 (Figs. 1 to 4) is set in rotation and with magnet PCM energized, the first cycle (Fig. 9) begins. During this cycle, the first card moves out of the hopper and to a position in which it is just about to enter analyzer A, meanwhile causing card lever contacts CL1' to close and CL2' to open. Closure of contacts CL' completes the circuit of card lever relay coil 117 (Fig. 10b, lower right). Coil 117 closes contacts 117a, shunting the start key contacts ST' and together with relay contact 115a providing a shunt circuit for motor relay coil 116. The start key may now be released without interrupting operation of motor M. During the second cycle, the first card traverses the analyzer A and the second card is fed out of the hopper. At the end of the second cycle, the first card is about to enter analyzer B and has just caused card lever contacts CL3' to close. Before the first card released card levers CL1 and CL2, the second card engaged and operated them to maintain contacts CL1' closed and CL2' open. At the end of the second cycle, the second card is about to enter analyzer A. Thus, after the two initial cycles, contacts CL1' and CL3' are closed and CL2' open. The closure of contacts CL1' and CL3' completes the circuits of card lever relay coils 117 and 119 while the opening of contacts CL2' breaks the circuit of card lever relay coil 118. As long as cards continue to feed out of the hopper and through analyzers A and B, the above condition of coils 117, 118, and 119 will be maintained. Coils 117 and 119 close their "a" relay contacts either of which, in conjunction with relay contacts 115a, shunts out the start key contacts ST'. Thus, the machine continues automatically in operation until the card lever relay contacts 119a open which occurs after the last card passes analyzer B brushes 21.

The different types of operation will now be described in detail.

*Regular sorting.*—In this type of operation, cards are to be sorted to one of the pockets 25 (Figs. 1 and 2) according to digital values represented in a selected card column. For this type of operation, a column containing digital values only is selected to control sorting. Before starting operations, a plugwire (not shown) is connected between a socket 120 (top center of Fig. 10a) and the socket 121 wired to the analyzer B brush 21 which is adapted to sense the selected card column of a run of cards. Switches 122 and 123 (Fig. 10a) are set to dotted line positions. The regular sorting commutator SC (top of Fig. 10a) is provided. The rotor of this commutator may be carried by any of the cyclically operating shafts, preferably the shaft of contact roll 22 of analyzer B.

The machine having been started in the manner described above and the two initial cycles having been completed, the first card is in position to move through analyzer B during the next cycle. The selected brush 21 senses the index positions 9 to 0, 11, and 12 of the selected column in succession at the differentially timed points 9 to 0, 11, and 12 of a cycle (Fig. 9). Assume that the card has a "4" perforation. Then at the "4" point of the cycle, the following circuit forms (Fig. 10a):

*Sorting magnet SC—Regular sorting.*—Line 107, a relay coil 124, socket 120, the plugwire (not shown) to the selected socket 121 of analyzer B, the connected brush 21, contact roll 22, card lever relay contacts 119b, switch 123 in dotted position, the "4" position of commutator SC, switch 122 in dotted position, sorting magnet SM, to line 106.

Magnet SM having been energized at the "4" differential line of a cycle, the card will be routed to the "4" sorting pocket 25. Relay coil 124, which was also energized by the above circuit, closes its "a" contacts to shunt out analyzer B, causing the circuit to break under control of commutator SC so as to prevent sparking of the brush 21 as it leaves the perforation.

In a similar manner, the other cards of the run will be sorted to the pockets corresponding to the values in the selected card column. Cards which are unpunched in the selected column are routed to the reject pocket.

LIMIT SORTING

In limit sorting, detail cards C (Fig. 5) are to be sorted in a single run according to whether detail data in a selected control field lies within one or another range of limits, numerical, alphabetic, or a combination of numerical and alphabetic. The limit range may be determined manually or automatically and several different types of limit sorting are possible with the present machine. For any type of limit sorting, switches 122 and 123 (Fig. 10a) are set in full line positions. The control field of the detail cards to be measured against the limit has two columns, related to each other as two denominational orders, one of which may be considered as the units order and the other as the tens order. Two orders are employed to conform to the number of orders in each representing means for one of the limits. Obviously, the number of orders is merely illustrative and a greater or less number of orders may be provided.

*Detail value readout coils.*—Preliminary to starting any type of limit sorting, the A analyzer brushes 17 adapted to sense the control field of cards C to be compared with the limit ranges are brought into detail value readout circuits by extending plugwires (not shown) between plug sockets 125 wired to these brushes (Fig. 10a, upper left) and a pair of plug sockets 126. One of these sockets is plugged in this manner to the units order column of the control field and wired to a units order detail readout coil 127U, 128U, and 128'U, while the other socket 126 is plugged to the tens order column of the control field and is wired to tens order detail readout coils 127T, 128T, and 128'T.

As a detail card passes during a cycle through analyzer A, the selected brushes 17 sense index positions 9 to 0, 11, and 12 of the columns of the control field in succession at the correspondingly designated points of the cycle (see Fig. 9). When a brush 17 encounters a perforation in any of the index positions of the units order control column, a pick up circuit for energizing the related readout coils 127U, 128U, and 128'U is completed as follows (Fig. 10a):

*Detail value readout coils.*—Line 107, circuit breaker CB1, the common contact roll 19 of analyzer A, the brush 17, the plugwire connection (not shown) between a socket 125 and a socket 126, the coils 127U, 128U, and 128'U, to line 106.

Coil 127U is momentarily energized at the differential cycle time at which the perforation was sensed and which corresponds to the value of the perforated index position. Coils 128U and 128'U close their respective "a" stick contacts. Coil 128U relates to the digit and intrazone positions 9 to 0 while coil 128'U relates to the zone positions 0, 11, and 12. If the perforation sensed by the brush 17 is in one of the positions 9 to 1, coil 128U alone will be held energized through its "a" contacts and cam contacts CC17 (Fig. 9) which are closed during the period of the cycle extending from before "9" to about "0½." When contacts CC17 break at about "0½," the energized coil 128U will be de-energized. The purpose of coil 128U is to retain a readout from the units order of the detail field of an intrazone position 9 to 1 or of a digit position 9 to 0. If the perforation sensed by the brush 17 is a zone perforation 0, 11, or 12, coil 128'U will be held energized through its stick points "a" and cam contacts CC19 (Fig. 9) which are closed during the "0" point and remain closed until shortly before "13." The coil 128'U serves to retain the readout of a zone position of the units order detail column.

Similarly, coils 127T, 128T, and 128'T are energized at differential times of the cycle in accordance with the perforations sensed in the tens order column of the control field of a detail card C passing through analyzer A. Coil 127T is energized momentarily, coil 128T is held through cam contacts CC17 if a perforation 9 to 0 has been sensed, and coil 128'T is held through cam contacts CC19 if a zone perforation 0, 11, or 12 has been sensed.

In the above manner, coils 127U and T provide a momentary readout of all detail value perforations while coils 128U and T provide a maintained readout of perforations 9 to 0 and coils 128'U and T a maintained readout of zone perforations 0, 11, and 12.

*Manual preselection of sorting pockets.*—The pockets 25 to receive the cards C according to which limit range embraces the control detail value may be manually preselected. For this purpose, a pair of sockets 130 and 131, respectively associated with sections #1 and #2, are provided (upper center of Fig. 10a). To preselect, manually, a pocket for cards whose detail values are within the range of section #1, a plugwire (not shown) is extended from socket 130 to one of a column of multiple sockets 132. Each multiple socket 132 is wired to one of the emitter segments 9 to 0, 11, 12 of an emitter EM1, through which a limit-sorting circuit (traced later) of sorting magnet SM extends.

Thus, if pocket "9" is to receive the cards having detail values in the range of section #1, socket 130 is plugged to a socket 132 wired to emitter segment "9." Similarly, a pocket for receiving the cards whose detail values are in the range of section #2 may be chosen manually by plugging socket 131 to the multiple socket 132 wired to the emitter segment corresponding to the desired pocket.

*The limit readout coils.*—As shown at the bottom of Fig. 10d, there are six lower limit and six upper limit readout coils for each of sections #1 and #2. The lower limit coils are designated LNU, LNT, LZU, LZT, LIU, and LIT. The upper limit coils are designated SNU, SNT, SZU, SZT, SIU, and SIT. In these reference designations, letter H indicates lower limit and letter S upper limit, while letters U and T respectively indicate units and tens orders. The coils having the letter N in the reference designation are adapted to be energized continually as long as the limit-representing order associated therewith is set to any digit. The coils having the letter Z in the reference designations are adapted to be energized at differential time of a cycle in accordance with the zone positions of alphabetic limits; i. e., at 0, 11, or 12 cycle points. The coils having the letters I in the reference designations are adapted to be energized at differential times corresponding to digits or to the intrazone positions of alphabetic limits. Thus, a coil LNU is energized when the lower limit in the units order of a section is set to a digit; a coil SZT is energized at a differential time corresponding to the zone position 0, 11, or 12 of an upper alphabetic limit in the tens order of a section; and a coil LIU is energized at a differential time corresponding to the digit or intrazone position 9 to 1 of a lower limit in the units order of a section or, else, at the "0" time if the related limit is set to digit "0."

The limit readout coils are adapted to be controlled alternatively by the manual or automatic limit representing means. When the limit readout coils are to be controlled by the manual representing means, handles 134 of switch bars 135 are placed in dotted line positions (Fig. 10d), causing sides "b" of switches 136 to be closed. When the limit readout coils are to be controlled by the automatic limit representing means, handles 134 are set in full line positions, causing sides "a" of switches 136 to be closed.

The sorting of a stack of cards C according to whether detail values thereon lie within the range of the manual limit representing means MR (Figs. 4, 7, and 8) of section #1 or #2 will now be explained in detail.

Reading Out Manually Selected Limits

For reading out manual limits, switch handles 134 (Fig. 10d, bottom) are set in dotted positions in order to close sides "b" of switches 136. The manual limits are selected by setting manual limit representing means MR (Figs. 4, 7, and 8).

During the cycle in which a card is passing through analyzer A, its detail value is read out to energize coils 127T and U, 128T and U, and 128'T and U at differential times corresponding to the positions of the perforations representing the detail value. During this same cycle, the limits are read out of the manual representing means to energize the limit readout coils at differential times corresponding to the positions representing the limits. Thus, the coil LIT of a section is energized at one of the cycle points 9 to 0 corresponding to a digit 9 to 0 or at one of the cycle points 9 to 1 corresponding to the intrazone position of the tens order lower limit of the section of representing means MR. As an example, assume that the tens order, lower limit portion of section #2 of the representing means MR has its brush 59 engaged with a segment 61—1 in the "11" zone (Fig. 7). At the "1" point of a cycle, the following circuit forms (start with Fig. 10c):

*Intrazone position limit readout coil LIT circuit.*—Line 107, the "1" position of emitter EM2, the "1" intrazone line 137 of the "11" zone, the row of commonly connected "1" segments 61 of the "11" zone, which includes the segment engaged by the brush 59 of the tens order lower limit of section #2, the connected brush 58, the contact ring 60, wire 138 (continue with Fig. 10d), the "b" side of the connected switch 136, the coil LIT of section #2, to line 106.

Similarly, coil LIU of a section will be energized at a differential time corresponding to the intrazone position 9 to 1 or the digit position "0" of the units order limit portion of the section of representing means MR. In similar fashion, upper limit readout coils SIT and SIU will be energized at differential times corresponding to the intrazone positions 9 to 1 or digit position "0" of the upper limit portions of sections of representing means MR. The lower limit coil LZT (Fig. 10d, bottom) of a section is energized if the tens order of the lower limit portion of the manual representing means of the section is set to represent a letter. The energization of this coil occurs either at the "12," "11," or "0" cycle point depending on which zone includes the selected letter. For example, if the tens order lower limit portion of section #1 of representing means MR has been set to select a letter of the "0" zone, its brush 66 (Fig. 7) is on a segment 68—0 while brush 67 is on the segment 69Z. The circuit for coil LZT of section #1 is then closed at the "0" time, as follows (start with Fig. 10c):

*Zone position limit readout coil LZT circuit.*—Line 107, the "0" position of emitter EM2, the "0" zone line 139, segment 68—0 of the lower limit, tens order portion of section #1, brushes 66 and 67, segment 69Z, line 140 (continue with Fig. 10d), the "b" side of the connected switch 136, coil LZT of section #1, to line 106.

When the selected limit in the tens order of a lower limit portion of a section of the representing means MR is within the "11" zone, brush 66 is on a segment 68—11 and coil LZT of the section is energized at the "11" time. When the tens order lower limit of a section is in the "12" zone, brush 66 is on segment 68—12 and coil LZT of the section is energized at the "12" time.

In a similar manner, the limit readout coils LZU are energized at "0," "11," or "12" of a cycle when the units order of the lower limit portion of representing means MR is set to represent a letter.

The upper limit coils SZU and SZT also are energized in a similar way at "0," "11," or "12" when the upper limit orders of a section of representing means MR are set to represent letters.

When an order of the representing means is set to represent a digit, the brush 66 of this order is on segment 68 while the brush 67 is on segment 69 of the order. The limit readout coil associated with this order and whose designation includes letter N will then be energized as soon as current is supplied to lines 106 and 107 and will remain energized until the setting is changed to represent a letter. For example, if the tens order of the upper limit portion of section #2 is set to represent any digit 9 to 0, the following circuit is established (start with Fig. 10c):

*Coil SNT circuit.*—Line 107, wire 141, segment 68 and brush 66 of the tens order of the upper limit portion of section #2, connected brush 67, segment 69, wire 142 (continue with Fig. 10d), the "b" side of the connected switch 136, coil SNT of section #2, to line 106.

If the digit is "0"; for example, in the units order upper limit of section #1, coil SIU of this section will be energized as follows (Figs. 10c and 10d):

*Digit "0" limit readout.*—Line 107, the "0" position of emitter EM2, zone line 139—0, the segments 68—0 of the lower limit portion of section #1, wire 143, connected to all the "0" segments 61, "0" segment 61 of the upper limit units order of section #1, the brush 59 engaged therewith, connected brush 58, segment 60, wire 144, connected switch side 136b, coil SIU of section #1, to line 106.

In above manner, the manually selected limits are read out during each cycle by energizing the limit readout coils at differential times corresponding to the zone and intrazone position of letters and to the 9 to 0 positions of digits.

THE COMPARING MEANS

The comparing means or the means to ascertain which of the limit ranges embraces detail data on a detail card may be considered as comprising two main divisions. One division comprises means for effecting a quantitative comparison by which is meant a comparison of the relative magnitude of the detail value and each of the limits of the ranges. This division may be considered further as having two subdivisions. One subdivision comprises means for quantitatively comparing the zone positions of the detail value with the zone positions of the limits to determine their relative magnitude and separate means for quantitatively comparing the positions 9 to 0 of the orders of the detail value with the 9 to 0 positions of the orders limits to ascertain their relative magnitude. The other subdivision comprises means for integrating the separate quantitative comparisons of zone and intrazone positions of detail and limit alphabetic values; that is, bringing these separate comparisons into conjunction to determine whether alphabetic or numerical detail data is greater or less than alphabetic or numerical limit data.

The second main division of the comparing means comprises means for qualitatively comparing the detail data with the limits, by which is meant a comparison of the detail and limit data in corresponding denominational orders to determine whether they agree or disagree in kind of data. This qualitative comparison determines whether a limit section and the detail field of a card both contain alphabetic data or both contain numerical data in corresponding orders. When the qualitative comparison detects unlike kinds of items in a column of the detail data of a card and a corresponding order of a limit range, the quantitative comparison of the positions of the items is rendered ineffective to control sorting of the card to the pocket assigned to this limit range. The upper and lower limits of the same range are set to the same kind of data. Thus, if the lower limit of one range consists of a number in the tens order and a letter in the units order, the upper correspondingly has a number in the tens order and a letter in the units order. It is, therefore, sufficient for the purposes of this disclosure to qualitatively compare only the upper limit of a section with the detail value. In a manner which will be explained later, if the upper limit of a section is found to disagree qualitatively with the detail value of a card, the card will not be sorted to the pocket assigned to the section. It is also possible to set one section to one kind of limits and the other section to a different kind of limits. This will enable the machine to separate cards of one kind from cards of another kind. For example, one limit range may be set to 0 (zero) A lower limit and 9Z upper limit while the other range may be set to A0 (zero) lower limit and Z9 upper limit. In that case, all cards whose detail values have a digit in the tens order and a letter in the units order will be sent to one pocket and all cards whose detail values have a letter in the tens order and a digit in the units order will be sent to another pocket. This principle may be extended by providing four limit ranges instead of two, one range to control sorting of letter-digit cards, a second to control sorting of letter-letter cards, a third to control sorting of digit-letter cards, and the fourth to control sorting of digit-digit cards. By providing still more limit ranges, it is possible to sort each kind of cards to different pockets depending on which of limit ranges of the same kind of data contains the detail values.

The values to be compared are represented by zone and intrazone positions if alphabetic, and by positions 9 to 0 if the values are numerical. These positions are converted into differentially timed equivalent impulses. Since the positions 9 to 0, 11, 12 of a card column pass an analyzing brush in that order, the impulses representing perforations in these positions are timed to occur at cycle points 9 to 0, 11, and 12 (see Fig. 9). The conversion of the detail value positions into differentially timed impulse equivalents during a cycle is effected, as explained before, by energizing detail position readout coils 127T and U, 128T and U, and 128'T and U (Fig. 10a) under control of the analyzer A. The conversion of the positions of the limit values into differentially timed impulse equivalents is effected during the same cycle, in the manner explained previously, by energizing the limit readout coils, shown at the bottom of Fig. 10d, at differential times of the cycle. The quantitative comparison, or the comparison of the relative magnitude of positions of detail data in a detail card with the positions of the limits, is effected by determining the relative time of energization, during the cycle in which the card is traversing analyzer A, of the detail value readout coils and the limit readout coils.

*The magnitude comparing means.*—Referring to Fig. 10e, the top row of contacts contains the "*a*" relay contacts of the limit readout coils, the contacts of the second row are "*b*" contacts of all the limit readout coils except the units order lower limit readout coils LIU for which "*b*" contacts are unnecessary, as will be understood from the subsequent description. The contacts of the third row are the "*b*" contacts of detail readout coil 128'T. The contacts of the fourth row are the "*b*" contacts of the detail readout coil 128T. The fourth and fifth row contain the "*b*" contacts of detail readout coils 128'U and 128U, respectively. The sixth and seventh row contain the "*a*" contacts of detail readout coils 127T and 127U, respectively. At the bottom of Fig. 10e, are shown the magnitude comparing coils GZT, EZT, GZU, EZU, GIT, EIT, GIU, and EIU. A first letter E of the designation of a comparing coil denotes equality of positions, limit and detail, in an order while a first letter G denotes that the limit position is prior in time, or greater, than the detail position of the same order. A second letter Z in the designation of a comparing coil denotes association of the coil with zone positions while a second letter I denotes association of the coil to intrazone or digit positions. For example, EZT designates a comparing coil which is to be energized if, in the tens orders, the zone positions of the detail data and the limit portion of the section containing the coil are equal. The coil GIU represents a comparing coil adapted to be energized when the intrazone or digit position in the units orders of a limit is greater than the intrazone or digit position in the units order of the detail field. A group of these eight different kinds of magnitude-comparing coils is provided for the upper limit part of each section and a group of seven such comparing coils, the EIU coil being omitted, is provided for the lower limit part of each section.

*Comparing coils GIT and GIU.*—There is a pair of coils GIT and GIU in each limit part of each section, as shown in Fig. 10e. These coils compare the intrazone and digit positions of the detail field of a card passing through analyzer A with the intrazone and digit positions of the limits. Each tens order coil GIT is in series with a pair of "*b*" contacts of tens order detail readout coil 128T and the "*a*" contacts of a limit readout coil. Assume that during a cycle, the tens order of the detail field has an intrazone or digit position inferior to the intrazone or digit position in the lower limit part of section #1. Accordingly, the contacts LITa (#1) will be closed while the contacts 128Tb are still unopened, and the following circuit is established (start with Fig. 10e):

*GIT coil circuit.*—Line 106, contacts LITa (#1), the pair of contacts 128Tb in series therewith, coil GIT (#1, lower) wire 146 (continue with Fig. 10f), a pair of contacts 147a, to line 107.

Coil GIT closes its "*a*" stick contacts to provide a holding circuit through cam contacts CCI which do not open until "14" of the cycle, or until after all of the positions 9 to 0, 11, 12 have been read out.

The circuit of a units order coil GIU is completed similarly through a pair of "*a*" contacts of a units order limit readout coil and a pair of contacts 128Ub of the units order detail readout coil 128U. If the intrazone or digit position of the units order of a limit is superior to the intrazone or digit position of the units order of the detail field, the "*a*" contacts of the readout coil for the intrazone and digit portion of the limit will close before contacts 128Ub open, causing the coil GIU related to this limit to be energized and held through its "*a*" points and cam contacts CCI.

If the digit or intrazone position in an order of the detail field is superior to the digit or intrazone position in the corresponding order of a limit, the contacts 128Tb or 128Ub (depending on the order) will be opened before the "*a*" contacts of the readout coil for the limit, are closed and will be held open until about "0½," the detail readout coils for intrazone and digit positions being held through cam contacts CC11 (Figs.

9 and 10a) until then. In such a case, the GIT or GIU coil related to the limit will not be energized through a circuit such as traced above. For example, if the units order of the detail field is perforated in position "9," coil 128U will be energized at the "9" time and will close its "a" contacts to provide the stick circuit through cam contacts CC17. Contacts 128Ub will now remain open until about "0½." If, further, the units order of the upper limit of section #1 has any one of the intrazone and digit positions 8 to 0, the coil SIU of section #1 will be energized at the corresponding 8 to 0 time and will close its "a" contacts. Since the 128Ub contacts were opened at the "9" time and will remain open until past the "0" line, the closure of the "a" contacts of the coil SIU of section #1 will not be effective to complete the circuit of coil GIU (section #1, upper limit). Likewise, if any other units order limit, upper or lower, of any section has an intrazone or digit position 8 to 0, the open contacts 128Ub will prevent the closure of the "a" contacts of the limit readout coils for such 8 to 0 positions from being effective to energize related coils GIT or GIU. It is believed clear, then, that if the limit has a digit or intrazone position superior to such position of the corresponding order of the detail field, the coil GIT or GIU will be energized as a manifestation of the superiority of the limit digit or intrazone position. It should be noted that when the detail readout coils 128 and 128' are energized at the same cycle point as a limit readout coil, the "b" contacts of the detail readout coils will open before the "a" contacts of the limit readout coils close. Thus, in any order, if the limit and detail values are equal, the related comparison coil with the reference letter G will not be energized.

*The EIT and EIU coils.*—There is a coil EIT in each limit part of each section and a coil EIU in the upper limit part of each section. These coils detect equality of intrazone or digit positions of a limit with the digit or intrazone positions of the detail field. Each tens order coil EIT is in series with a normally opened pair of contacts 127Ta of the tens order detail readout coil 127T and with a pair of "b" contacts of a tens order intrazone and digit limit readout coil. If, in the tens orders, the detail data and a limit have the same digit or intrazone positions 9 to 0, the limit readout contacts "b" and the detail readout contacts 127Ta will be closed simultaneously and a circuit will be completed through the related EIT coil. Assume, for example, that the tens order of the lower limit of section #1 has an "8" position and that the tens order of the detail field has the same position. Then at the "8" cycle time, the contacts LITb (section #1) and 127Ta will close simultaneously, completing the following circuit (Fig. 10e):

*EIT coil circuit.*—Line 106, contacts LITb (#1) the pair of contacts 127Ta in series therewith, coil EIT (#1, lower), wire 146 (turn to Fig. 10f), a pair of contacts 147a, to line 107.

In a similar manner, the other coils EIT will be energized when the limits related thereto have the same intrazone or digit positions as the tens order of the detail field. Likewise, the units order coil EIU will be energized through the "b" contacts of a units order upper limit readout coil and contacts 127Ua of units order detail readout coil 127U when the units order of the detail field and the units orders of the upper limit have the same digit or intrazone positions.

A coil EIU is provided only in the upper limit part of each section, and this coil is connected by a wire 148 in parallel with the coil GIU of the same group. Hence, whenever a coil EIU is energized, the companion coil GIU also is energized. The purpose of this arrangement is to enable a card with detail data equal to an upper limit to be treated as though it were within the limits.

When a coil EIT or EIU is energized, it closes its "a" contacts to provide a holding circuit through cam contacts CC1.

*The zone position comparing coils.*—The coils GZT, GZU, EZT, and EZU compare the zone positions of the limits with the zone positions of the detail field. Each tens order coil GZT is in series with a pair of normally closed contacts 128'Tb of the tens order detail readout coil 128'T and a pair of "a" contacts of the related limit readout coil. The coil GZT will be energized only if the zone position in the related tens order limit is superior to the zone position in the tens order of the detail field of the card. For example, assume that the tens order zone position in the upper limit of section #2 is "0," and the zone position in the tens order of the detail field is "11." Accordingly, coil SZT (#2) will be energized at the "0" time, while the coil 128'T will be energized at the "11" time by the analysis of the zone position "11" in the tens order of the detail field. Contacts SZTa (#2) will be closed while the contacts 128'Tb are still unopened, and the following circuit will be completed (Fig. 10e):

*Coil GZT circuit.*—Line 106, contact SZTa (#2), the pair of contacts 128'Tb in series therewith, the coil GZT (#2, upper), wire 149 (turn to Fig. 10f), to line 107.

In a similar way, the circuits of the other comparing coils GZT will be completed if the tens order of the detail field has a zone position inferior to the zone positions of the limits related to the comparing coils.

Similar circuits may be completed through any of the units order zone position comparing coils GZU when the zone position of the units order of the related limit is superior to the zone position in the units order of the detail field. The circuit of a coil GZU will extend through the pair of "a" contacts of the related zone position limit readout coil LZU or SZU and a pair of "b" contacts of the detail readout coil 128'U.

When coil 128'T or 128'U is energized, it is held through its "a" stick contacts and cam contacts CC19 (Figs. 9 and 10a) until after the readout period, "0" to about "12½" for the zone positions. The open contacts 128'Ub or 128'Tb will then prevent subsequent closure of LZTa or SZTa contacts from being effective to energize coils GZT or GZU.

A coil EZT will be energized if the zone position in the tens order of the detail field is the same as the zone position in the tens order of a limit. For example, if, in the tens orders, the upper limit of section #2 has a zone position "12" and detail field also has zone position "12," coil SZT (#2) and coil 127T will be energized simultaneously. Contacts SZTb (#2) and contacts 127Ta will close to concurrently complete the following circuit:

*Coil EZT circuit.*—Line 106, contacts SZTb (#2), the pair of contacts 127Ta in series therewith, coil EZT (#2, upper) wire 149, to line 107.

Similarly, a coil EZU will be energized if the units order of the related limit and the units order of the detail field have the same zone positions. The circuit of the coil EZU will then extend through the "b" contacts of the related limit readout coil and the contact 127Ua in series therewith.

When any coil GZT, GZU, EZT, or EZU is energized, its stick contacts "a" close to provide a holding circuit through cam contacts CC1.

It should be noted that the pickup and holding circuits of the zone position comparing coils return from the coils directly to line 107. The zone coils after being energized therefore will be held energized until cam contacts CC1 open about at "14" of the cycle. On the other hand, each of the intrazone and digit position comparing coils is energized by a circuit having a return path through pairs of contacts 147a to line 107. Contacts 147a are test contacts which open during a test period to determine whether the energization of the intrazone and digit comparing coils should be maintained through alternative return paths. The intrazone and digit coils will remain energized, only if certain conditions are satisfied, through one of the alternative return paths, as will be explained later in detail.

The action of the detail readout coils with respect to the limit readout coils may be briefly summarized as follows:

The detail readout coils 127U and T are effective for both zone and intrazone periods of the cycle to control the circuits through zone and intrazone equality comparison coils. The detail readout coils 128U and T are effective during the period 9 to 0 of a cycle to control the intrazone and digit comparing coils GIU and GIT. If a coil 128T or U is energized at 9, 8 ... or 0, it prevents energization of a coil GIT or GIU upon readout at the same or a subsequent time of an intrazone or digit limit position 9 to 0. If coil 128T or U is energized at "0," it is held through its "a" contacts and cam contacts CC19 until after "12" of the cycle. It will function to prevent the readout of a "0" digit limit from energizing the related coil GIT or GIU, but will have no function, even though it is held energized until after "12" in connection with the readout of a "0" zone limit or an "11" or "12" zone limit since the "b" contacts of the coils 128T and U are not in circuit with any contacts of the zone limit readout coils. Thus, in considering the effect of a zone limit readout, coils 128T and U may be disregarded. Coils 128'T and U are momentarily energized upon readout of a detail value 9 to 1 and have no effect since their "b" contacts are not in circuit with the intrazone and digit comparing coils. Coils 128'T and U, if energized at the "0" time, are held through their "a" contacts and cam contacts CC19. Their energization at the "0" time has no effect on the readout of a "0" digit limit but only on the readout of a "0" zone limit or on the readout of an "11" or "12" zone limit since their "b" contacts are in circuit only with the zone comparing coils.

There are special circuits for picking up coils GIT and GIU under certain conditions other than those described before, as will be explained in detail in connection with specific examples given hereinafter.

*Qualitative comparison.*—The qualitative comparison, as previously stated, is required to determine whether the data in the control field of the card passing through analyzer A agrees or disagrees in kind from the data set up in the limit sections. The circuits of the qualitative comparison means are shown in Fig. 10f, bottom half. Since only the upper limits need be qualitatively compared with the detail data, each section includes only one set of tens and units orders of qualitative comparing means. The qualitative comparing means of each section includes two coils IKT and IKU adapted to be energized under control of the readout of intrazone positions 9 to 1 in the tens and units orders of the upper limit representing means of the section; two coils XKT and ZKU adapted to be energized under control of the readout of zone positions in the tens and units orders of the upper limit representing means of the section; two coils 150IU and 150IT adapted to be energized under control of the readout of the intrazone positions 9 to 1 in the tens and units orders of the control field of the card passing through analyzer A; and two coils 150ZT and 150ZU adapted to be energized under control of the readout of the zone positions in the tens and units orders of the control field of the card.

When the intrazone position of a detail value is sensed, the detail readout coil 127T or 127U is momentarily energized, depending on the denominational order column in which the position is located. Assume, for example, that an intrazone position is sensed in the units detail column, energizing coil 127U. Coil 127U closes two pairs of 127Ub contacts, causing energization of the two coils 150IU, one in each section, as follows (Fig. 10f):

*Coil 150IU.*—Line 106, cam contacts CC24, contacts 127Ub, coil 150IU, line 107.

Coil 150IU closes its "a" contacts, providing a holding circuit through cam contacts CC25.

Similarly, if an intrazone position is sensed in the tens order of the detail field, contacts 127Tb are closed and two coils 150IT, one in each of the sections, are energized.

During the zone period, 0 to 12 of the cycle, if a zone position is sensed in the units order of the detail field, coil 127U is again momentarily energized, closing two pairs of contacts 127Uc (bottom of Fig. 10f) to energize two coils 150ZU, one in each section, through circuits such as the one traced below.

*Coil 150ZU.*—Line 106, cam contacts CC27, contacts 127Uc, coil 150ZU, to line 107.

Coil 150ZU closes its "a" contacts, providing a holding circuit through cam contacts CC28.

Similarly, the coil 127T when energized during the zone period, closes its "c" contacts to cause energization of both coils 150ZT.

When the tens order upper limit of section #1 has any intrazone position, limit readout coil SIT (Fig. 10d) of this section is momentarily energized and closes SITc contacts to complete the following circuit (Fig. 10f):

*Coil IKT.*—Line 106, cam contacts CC24, contacts SITc, coil IKT of section #1, to line 107.

Coil IKT closes its "a" contacts, providing a holding circuit through cam contacts CC25.

Similarly, coil IKU of section #1 is energized when the units order upper limit character of this section has any intrazone position. In like manner, coils IKT and U of section #2 are energized if intrazone positions are sensed in the tens and units order upper limit characters of section #2.

If the upper limit of section #1 has a zone position in the units order, coil SZT (Fig. 10d) of this section is energized, closing contacts SZTc (bottom of Fig. 10f) to complete the following circuit:

*Coil ZKT.*—Line 106, cam contacts CC27, contacts SZTc, coil ZKT, line 107.

Coil ZKT closes its "a" contacts to provide a holding circuit through cam contacts CC28.

In similar fashion, coil ZKU of section #1 is energized if the units order of the upper limit of this section has a zone position and, likewise, coils ZKT and U of section #2 are picked up and held if the upper limit orders of this section have zone positions.

The intrazone coils IKU and T and 150IU and T may be picked up only during the intrazone period 9 to 1 of the cycle, since cam contacts CC24 are closed only for this period.

The zone coils ZKU and T and 150ZT and U may be picked up only during the zone period, 8 to 12, since cam contacts CC27 close only for the zone period.

Each coil IKT is paired with a coil ZKT through their "b" transfer contacts. The normally closed side of contacts ZKTb is connected to the normally open side of contacts IKTb. When one of these paired coils is energized, its "b" contacts are reversed. Assume, for example, that coil IKT alone of the paired coils of section #1 has been energized during a cycle. Accordingly, its "b" contacts will be reversed and the following circuit forms (Fig. 10f) when cam contacts CC30 (see also Fig. 9) close after all the possible index positions have been read out:

*Coil KT.*—Line 106, cam contacts CC30, the upper, now closed side of contacts IKTb, the normally closed side of contacts ZKTb, coil KT, to line 107.

Similarly, coil KT will be energized if coil ZKT alone of the paired coils has been energized.

If both paired coils ZKT and IKT have been energized, both their "b" contacts will be reversed and the circuit of coil KT cannot be completed. Likewise, if neither coil has been energized, coil KT will not be energized when contacts CC30 close.

Coils IKU and ZKT are similarly paired to control energization of coils KU.

Each coil 150IU is paired with a coil 150ZU through their "b" contacts. When only one of these paired coils, say 150ZU, has been energized during a cycle, the following circuit will form when cam contacts CC30 close:

*Coil 151U.*—Line 106, cam contacts CC30, the normally closed side of contacts 150IUb, the now-closed lower side of contacts 150ZUb, coil 151U, to line 107.

Since the coils 150IU of both sections are commonly controlled and the coils 150ZU of both sections are also commonly controlled, the coil 151U in each section will be energized if a zone position alone or an intrazone position alone of the units order detail field has been read out.

Similarly, coils 151T will be energized if the tens order detail column has a zone position alone or an intrazone position alone.

When both the paired coils 150ZU and 150IU are energized, indicating the presence of both zone and intra-zone positions in the units order detail column, both their "b" contacts are reversed and coils 151U will not be energized. When neither coil 150ZU or 150IU has been energized, indicating a blank units order column in the detail field, the coils 151U also will remain unenergized.

In a similar way, coils 150ZT and 150IT are paired to control energization of coils 151T.

Each coil KT is paired with a coil 151T and each coil KU is paired with a coil 151U through their "a" transfer contacts. If the upper limit in the units order of a section has only a zone or an intrazone position, the coil KU of the section will be energized. If also, the detail units order has only a zone or an intrazone position, the coils 151U will be energized. With the coil KU of a section and the coil 151U located in this section both energized, their "a" contacts are reversed and a circuit cannot extend therethrough. If the units order upper limit of a section has both zone and intrazone positions or neither, the related coil KU will be deenergized. Also, if the units order detail column has zone and intrazone positions or neither, coils 151U will be unenergized. With coils 151U and KU of a section both deenergized, their "a" contacts are in normal condition, preventing completion of a circuit therethrough. Assume, now, that the units order upper limit of a section has only an intrazone or a zone position. The related coil KU will be energized, shifting its "a" contacts. Assume, further, that the units order detail column has both zone and intrazone positions, so that the coils 151U are unenergized and their "a" contacts are in normal condition. Accordingly, the following circuit will be completed through the "a" contacts of the coil 151U and the "a" contacts of the energized coil KU paired with the coil 151U:

*Coil KCU.*—Line 106, cam contacts CC30, the lower side of contacts 151Ua, the now-closed lower side of contacts KUa, coil KCU, to line 107.

Similarly, coil KCU will be energized if in the related pair of coils KU and 151U, the coil 151U alone has been energized.

In like fashion, coils KCT are controlled by pairs of coils KT and 151T.

Coils KCU and KCT of each section are the qualitative comparison readout coils. It will be clear from the above description that coil KCU of a section is energized only when the detail units order and the upper limit units order of the section both do not have zone and intrazone positions, or when they both do not have zone positions alone, or when they both do not have intrazone positions alone. Likewise, coil KCT is energized upon similar disagreement in kind in the tens orders. Thus, in the manner described, energization of either or both of coils KCT and KCU manifests lack of agreement in kind of data.

In the foregoing description, the zone position unaccompanied by an intrazone position has been referred to in order to take into consideration the "0" digit. The "0" is represented by the "0" index position occurring alone in an order. If the card has a "0" digit; say, in the units order, the coils 150IU will not be picked up during the intrazone period. Instead, during the zone period, the coils 150ZU will be picked up and held. If the upper limit units order of a section also has a digit "0," the zone limit readout coil SZU of the section will remain deenergized, but the coil SIU (Fig. 10d) will be energized at the "0" point of the zone period. Coil SIU will close its contacts SIUd (bottom of Fig. 10f). These contacts are in parallel with contacts SZUc of the same section and complete an alternative circuit of coil ZKU of the section. This alternative circuit is established only if the upper limit in the units order has a "0" digit, since for other digits the coil SIU will close its "d" contacts before the zone period and, hence, before cam contacts CC27 have closed. With coil ZKU of a section energized alone, the related coil KU will be energized, in the manner described before. With only the coils 150ZU energized, coils 151U will be energized.

The energization of coil KU of a section and energization of its companion coil 151U prevent energization of related coil KCU of the section. The unenergized condition of coil KCU manifests agreement in kind of data in the units orders of a limit section and the detail field of the card passing through analyzer A. In a similar way, coil KCT manifests qualitative agreement if it remains unenergized.

The occurrence of "0" digits in corresponding orders of detail value and upper limit has been discussed. If, instead, the detail order has a digit 9 to 1, coils 150IU or 150IT will be energized while the paired coil 150ZU or T will be unenergized. Again, coil 151U or T will be energized just as when the detail order had a "0" digit. If the detail order has a "0" digit and the upper limit of a section has a digit 9 to 1 in the corresponding order, then coil IKU or T of the section will be energized while the paired zone coil will not be energized. Again coil KU or T will be energized just as when the limit has a "0" digit.

Zone and intrazone positions of an order represent letters, intrazone positions occurring alone in an order represent digits 9 to 1, position "0" occurring alone in an order indicates digit "0." The qualitative comparison of these various kinds of characters has been explained above as controlling energization of coils KCT and KCU.

*Examples of sorting according to manually set limits*

Figure 10C:
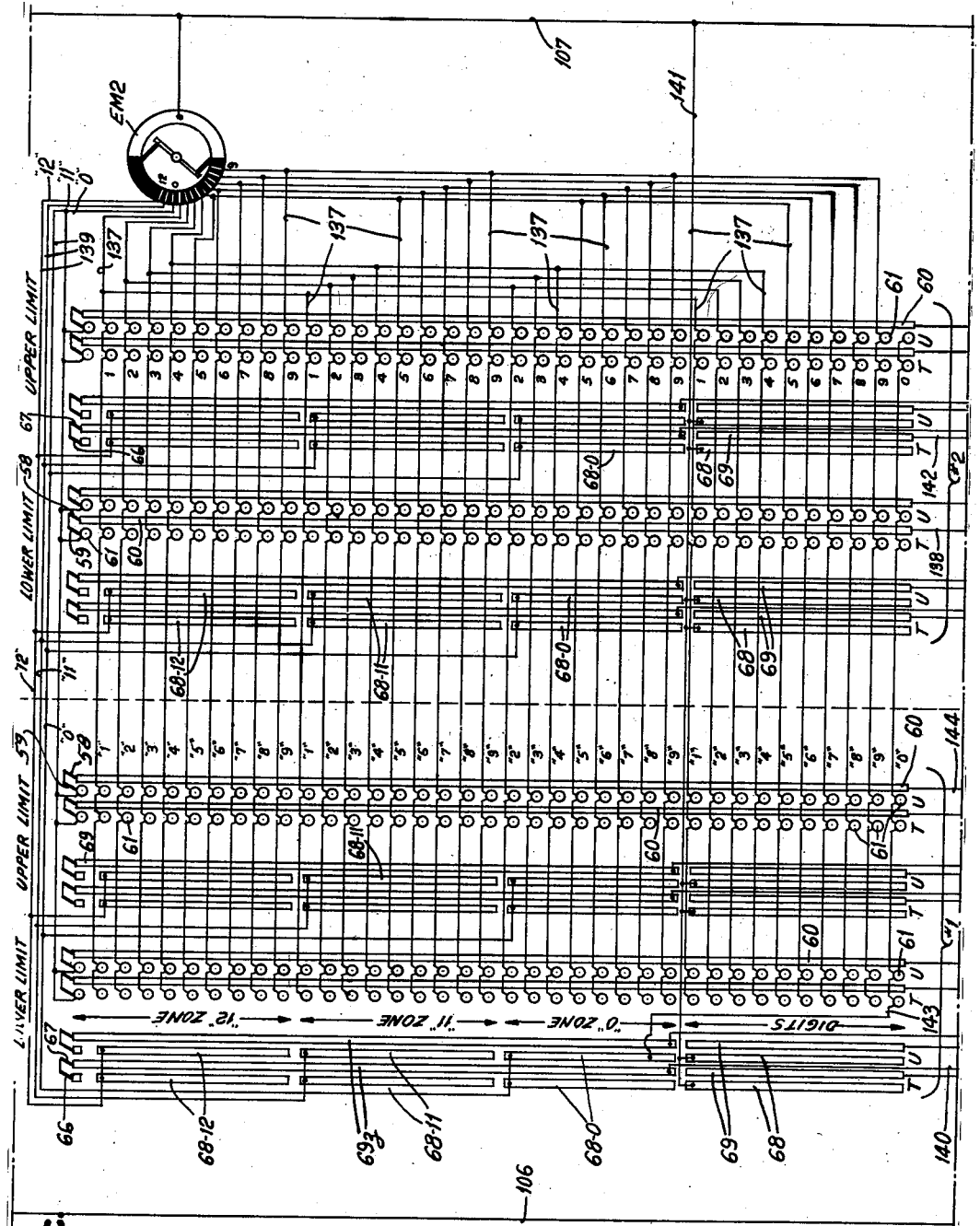

For the following examples, assume pocket "7" has been manually preselected for section #1 and pocket "9" for section #2. For this preselection, the plug socket 130 (Fig. 10a) is connected by a plugwire (not shown) to one of the 132—7 sockets, and plug socket 131 is similarly connected to a plug socket 132—9. The hand switches 122 and 123 (Fig. 10a) are set in "limit" positions. The switches 136 of each section (Fig. 10d) are set in alternative positions in which their "b" sides are all closed to connect the limit readout coils to the manual limit-representing means (Fig. 10c). The manual representing sections (Figs. 4, 7, and 8) are set to the desired limits. Sockets 125 (Fig. 10a) of the analyzer A brushes 17 for sensing the columns of the control field of the card passing through analyzer A are connected by plugwires (not shown) to sockets 126 of coils 127T, 128T, and 128'T and 127U, 128U and 128'U. Having taken these preliminary steps, the machine is set in operation in the manner explained before.

*Example 1*

Assume the card traversing analyzer A has detail data MA represented in the control field and that the limits are EA to NA in section #1, and TA to YA in section #2. The positions of these characters are indicated below:

| Data | Positions | | | |
|---|---|---|---|---|
| | Tens order | | Units order | |
| | Zone | Intrazone | Zone | Intrazone |
| Card—MA | 11 | 4 | 12 | 1 |
| Section #1: | | | | |
| Lower—EA | 12 | 5 | 12 | 1 |
| Upper—NA | 11 | 5 | 12 | 1 |
| Section #2: | | | | |
| Lower—TA | 0 | 3 | 12 | 1 |
| Upper—YA | 0 | 8 | 12 | 1 |

The operations during the comparing cycle in which the card is passing through analyzer A and during the sorting cycle which follows the comparing cycle are described below with reference to the cycle points in which the operations occur.

COMPARING CYCLE

*The "8" cycle point.*—The intrazone position "8" of the tens orders character Y of the upper limit of section #2 is read out, causing energization of limit readout coil SIT of this section (see Fig. 10d). Coil SIT of section #2 closes its "a" and "b" contacts (see Fig. 10e). Closure of contacts SITb is without effect because the 127Ta contacts will not be concurrently closed. The closure of the contacts SITa causes energization of the comparison coil GIT of the upper limit of section #2. Coil SIT of section #2 also closed contact SITc (lower half of Fig. 10f) thereby causing energization of coil IKT of this section.

*The "5" cycle point.*—The "5" intrazone position in the upper limit character N of section #1 is read out causing energization of coil SIT of section #1. Closure of contacts SITa, in section #1, results in energization of comparison coil GIT of the upper limit of section #1. Also the closure of contacts SITc of section #1 causes energization of qualitative comparison coil IKT of section #1.

The "5" position of character E of the lower limit of section #1 is read out causing energization of coil LIT of this section. Contacts LITa close and complete the circuit of coil GIT in the lower limit of section #1.

*The "4" cycle point.*—The intrazone position "4" in the tens order of the control field of the card is read out, causing energization of detail value readout coils 127T, 128T, and 128'T (Fig. 10a). Contacts 127Ta close momentarily but since corresponding intrazone positions in the limits have not been simultaneously read out, the closure of these contacts is without effect. The two pairs of contacts 127Tb (Fig. 10f) cause energization of the qualitative comparison coils 150IT of both sections. Detail value readout coil 128T closed its "a" contacts to provide the holding circuit through cam contact CC17, and coil 128T will remain energized for the rest of the digit and intrazone period, extending from before "9" to about "0½." Thus, contacts 128Tb having opened at "4" will remain open till about "0½" to prevent subsequent closure of "a" contacts of the limit readout coils from having any effect.

*The "3" cycle point.*—The position "3" of lower limit character T of section #2 is read out causing energization of coil LIT of section #2; the closure of the LITa points is ineffective because the 128Tb contacts are now open. The closure of the LITb contacts is ineffective because the 127Ta contacts have not been closed at the same time.

*The "1" cycle point.*—The "1" positions in the character A of the units orders of the card and all the limits are read out causing the detail value readout coils 127U, 128U, and 128'U and the limit coils LIU and SIU of both sections to be energized. The closure of contacts 127Ua simultaneously with closure of "b" contacts of the upper limit units order coils SIU of both sections causes the parallel coils GIU and EIU of the upper limit of each section to be energized. The closure of the "a" contacts of the limit readout coils is without effect because the 128Ub contacts are now open.

Coils SIU of both sections also close their "c" contacts to cause energization of qualitative comparison coils IKU of these sections.

Coil 127U also closed its "b" contacts (see Fig. 10f) causing energization of both coils 150IU.

*The "0" cycle point.*—The "0" zone position of tens order character T in the lower limit of section #2 is read out causing energization of coil LZT of this section. The "a" and "b" contacts of coil LZT (section #2) close. Closure of the "a" contacts results in the energization of coil GZT in the lower limit portion of section #2.

Referring to Fig. 10e, energized coil GZT (#2, lower limit) closes its GZTb contacts, completing a special circuit through related coil GIT as follows:

*1st special circuit of GIT.*—Line 106, wire 152, now-closed contacts GZTb, coil GIT, and thence through a pair of 147a contacts (Fig. 10f) to line 107.

The zone position of character Y in the tens order of the upper limit of section #2 is also read out, causing energization of coil SZT of this section; contacts SZTa closes, resulting in energization of coil GZT in the upper limit portion of section #2. In addition, contacts SZTc of section #2 close, causing energization of qualitative comparison coil ZKT of this section.

*The "11" cycle point.*—The "11" zone position in the tens order of the control field of the card is read out causing energization of coils 127T, 128T, and 128'T. Coils 128T and 128'T remain energized through their "a" stick points and cam contacts CC19 until the end of the zone period, extending from about "0" to past "12." Coil 127T closes its "a" contacts (Fig. 10e). At the same time, the "11" position of tens order character M in the upper limit of section #1 is read out, causing energization of coil SZT of this section. Contacts SZTb of section #1 close, and with contacts 127Ta also closed, the comparison coil EZT in the upper limit portion of section #1 is energized. Coil SZT (#1) also closed its "c" contacts, causing energization of coil ZKT (#1).

Coil 127T also closed contacts 127Tc (see Fig. 10f) to cause energization of the coil 150ZT of each section.

*The "12" cycle point.*—The "12" zone position of character E in the tens order of the lower limit of section #1 is read out, causing energization of coil LZT of this section. Contacts LZTa and b close (Fig. 10e), but with contacts 128'Tb and 127Ta open, neither comparison coil EZT nor GZT in the lower limit of section #1 is energized.

At the same time, the zone positions "12" in the units order of the card and in the units order of each of the limits are read out causing energization of detail coils 127U, 128U, and 128'U and of limit coils LZU and SZU of both sections. The simultaneous closure of the 127Ua contacts and of the "b" contacts of these limit coils causes energization of coils EZU in the upper and lower limit portion of each section.

The closure of contact 127Uc (Fig. 10f) causes energization of both coils 150ZU. The closure of contacts SZUc in each section likewise results in energization of the coils ZKU of both sections.

Cam contacts CC19 open after the "12" positions have been read out, breaking the holding circuit of coils 128'T and 128'U.

At this point, all the positions have been read out and the following coils are energized:

*Quantitative comparison coils*

| Section #1 | | Section #2 | |
|---|---|---|---|
| Lower | Upper | Lower | Upper |
| GIT | GIT | GIT | GIT |
| | GIU | | GIU |
| | EIU | | EIU |
| EZU | EZU | EZU | EZU |
| | EZT | | GZT |
| | | | GZT |

*Qualitative comparison control coils*

| Section #1 | Section #2 |
|---|---|
| 150IU and 150ZU | 150IU and 150ZU |
| 150IT and 150ZT | 150IT and 150ZT |
| IKU and ZKU | IKU and ZKU |
| IKT and ZKT | IKT and ZKT |

*The test period.*—A test period occurs after all the positions have been read out. The test period is from about "12½" to "13" of the cycle and is timed by the closure of cam contacts CC20 (Fig. 9). When these contacts close, test coil 147 (Fig. 10b, lower left) is energized, opening all the 147a contacts (Fig. 10f). A pair of contacts 147a is in the common return path of the intrazone and digit comparing coils of each order of each limit. The circuits of the zone comparing coils return directly to line 107 (see Figs. 10e and 10f). Thus, the opening of contacts 147a during the test period does not have any effect on the circuits of any zone comparing coils which may have been energized. The opening of contacts 147a during the test period serves as a test to determine which of the energized intrazone coils is to remain energized after the positions have been read out of the card and the limits.

In the present example, coil GIT in the lower limit of section #1 has been energized through a circuit which includes in the return path a pair of 147a contacts. When these contacts open, the circuit of coil GIT (#1, lower) may be held through either of three alternative return paths, one through contacts GZTc (#1, lower), another through contacts EZTb (#1, lower), and a third through LNTa contacts (#1), provided either of the three latter contacts have been closed. Contacts EZTb will have been closed by coil EZT if the latter has been energized as a result of the zone positions in the tens orders of the limit and card field being equal. In the present example, coil EZT (#1, lower) has not been energized and related contacts EZTb are open. Contacts GZTc will have closed if related coil GZT has been energized because of the limit zone position in the tens order being greater than the zone position in the tens order of the card field. In Example 1, coil GZT (#1, lower) has not been energized. Contacts LNTa (#1) are operated by no-zone limit coil LNT of section #1 (see Fig. 10d) which is energized, as previously explained, only if the lower limit of section #1 is set to a digit in the tens order. As the tens order lower limit of section #1 has not been set to a digit for the instant example, coil LNT (#1) is not energized, and contacts LNTa (#1) are open. Thus, when the pair of contacts 147a in the lower limit portion of section #1 open during the test period, all three alternative return paths for the circuit of coil GIT (#1, lower) are open. Hence, coil GIT (#1, lower) is deenergized during the test period.

In the present example, coil GIT (#1, upper) was also energized during the data readout period of the cycle. During the test period, a pair of contacts 147a in the return path common to the intrazone and digit comparing coils GIT and EIT of the upper limit of section #1 open. There are also three alternative return paths for these intrazone and digit comparing coils GIT and EIT. One of these paths is through contacts GZTc (#1, upper) closed by coil GZT which is energized if the zone position in the tens order upper limit is greater than the zone position in the tens order of the card. For the present example, coil GZT (#1, upper) has not been energized. Another return path for the intrazone comparing coils of the upper limit of a section is through a pair of SNTa contacts. Coil SNT relates to an upper limit and is energized only if this limit has been set in the tens order to a digit. In the present example, the upper limit of section #1 has not been set to a digit in the tens order. Hence, coil SNT (#1) is not energized, and its contacts SNTa are open. The third return path for the intrazone comparing coils of the upper limit of a section is through the "b" contacts of the coil EZT of the same group. In the present example, the zone positions in the tens order of the card field and in the tens order of the upper limit of section #1 are equal. Hence, related coil EZT was energized and its contacts EZTb are closed. Accordingly, coil GIT (#1, upper) remains energized after the test period.

In the present example, coils GIT in the upper and lower portions of section #2 have been energized. Also, coils GZT of this section have been energized and their "c" contacts are closed. Hence, during the test period, contacts 147a in the upper and lower limits of section #2 are shunted by contacts GZTc. Accordingly, coils GIT of the upper and lower limits of section #2 remain energized.

*Qualitative test.*—Cam contacts CC30 (Fig. 10f) close from about "12½" to "14" of the cycle. As previously described, if the paired qualitative control coils 150IU—150ZU are both energized or neither is energized, the related coil 151U remains unenergized. Further, if the paired coils IKU and ZKU are both energized or neither is energized, related coil KU remains unenergized. If neither or both of paired coils KU and 151U are energized, the related coil KCU remains unenergized. Similarly, if paired coils 150IT—150ZT and IKT—ZKT of a section are all energized, coils KT and 151T of the section are inactive and coil KCT of the section remains inactive. In the present example, all the qualitative control coils have been energized. Hence, coils KCT and KCU of each section are unenergized. The "a" contacts of the coils KCT and KCU of a section are in series in the common return path of the tens and units orders intrazone and digit comparing coils of the upper limit portion of the section. Since neither contacts KCTa nor KCUa have been opened in the present example, energized coils GIT in the upper limit portions of both sections remain undisturbed by the qualitative comparison. Thus, the continued closure of the contacts KCTa and KCUa of a section indicates that the data in the card field agrees in kind with the data in the upper limit of the section, which, as premised before, is set to the same kind of data in upper and lower limit portions. Hence, as in the present example, with the data in the card field agreeing qualitatively with the limit data of a section, the quantitative comparison of such data remains undisturbed.

*Comparison readout.*—If the upper limit of a section has any significant digit in the tens order or has an alphabetic character, one of the positions 9 to 1 will be read out during each cycle. The qualitative control coil IKT of the section will be energized and held until after the comparison result has been read out. Coil IKT will shift the control blade of its transfer contacts IKTc (Fig. 10f). For the present example, the coils IKT of both sections are energized and their IKTc contacts are in shifted condition. Contacts IKTc of section #1, when in shifted condition, connect a comparison readout coil ICA to the "b" contacts of lower and upper limit coils GIT of section #1. Likewise, contacts IKTc of section #2, when shifted, place a comparison readout coil 2CA in series with the upper and lower contacts GITb of section #2. When cam contacts CC2 (Fig. 10f) close at about "13½" of the cycle, a circuit is completed through coil ICA if both GITb contacts of section #1 are closed or through coil 2CA if both GITb contacts of section #2 are closed, provided, further, that both pairs of contacts IKTc are in shifted condition. The GITb contacts of the lower limit portion of a section are normally closed and remain so only if the detail data is above a two-order lower limit of the section. If the two-order lower limit of a section is greater than the detail data, coil GIT of the lower limit portion is energized and its contacts GITb open, figuratively barring the front door of the section, to the detail data. The GITb contacts of the upper limit comparing coil of a section are normally open. If an upper two-order limit of a section is equal or superior to the detail data, the coil GIT of the upper limit portion is energized, closing its contacts GITb, the closure of these contacts, figuratively stated, bars the rear door of the section to prevent the detail data from passing through and beyond the section. When the GITb (lower) and GITb (upper) contacts of a section are both closed, the detail data, figuratively stated, has entered the front door of the section and been prevented from leaving through the rear door; hence, such detail data is within the limit range of the section.

In the present example, in section #1, coil GIT (lower) was deenergized during the test period and its "b" contacts are now closed, while coil GIT (upper) remains energized and its "b" contacts are now also closed. In section #2, the upper and lower coils GIT remain energized and lower limit contacts GITb are open while upper limit contacts GITb are closed. Further, the transfer contacts IKTc of both sections are in shifted condition. With the several contacts in the stated conditions, upon closure of cam contacts CC2 at about "13½," the circuit of coil ICA is completed as follows (Fig. 10f):

*Coil 1CA.*—Line 106, contacts CC2, GITb (lower), GITb (upper) the upper side of contacts IKTc, coil ICA, to line 107.

Contacts ICAa close, energizing final comparison readout coil ICR. Contacts ICRa close, completing the following circuit:

*Coil 1CR holding circuit.*—Line 106, cam contacts CC3, contacts ICRa, coil ICR, to line 107.

Coil ICR closes contacts ICRb (Fig. 10a) wired to plug socket 130. Cam contacts CC3 remain closed and coil ICR remains energized until about "12½" of the cycle following the comparison cycle. During this following cycle, the card whose detail data has been compared with the limits of both sections, is traversing analyzer B. Assuming plug socket 130 has been connected to a plug socket 132—7, the following circuit forms at the "7" time of the cycle following the comparison cycle (Fig. 10a):

*Limit sorting circuit of magnet SM.*—Line 107, contacts 112b, 111b, 108b, 1CRb, socket 130, the plugwire (not shown) to a socket 132—7, the "7" position of emitter EMI, switch 122 in limit position, sorting magnet SM, to line 106.

Since magnet SM is energized at the "7" time of the cycle in which the card is passing through analyzer B, the card is directed to the "7" sorting pocket 25 (Fig. 2).

In the above manner, the card whose detail data is MA is sorted to the pocket chosen for section #1 whose limits EA to NA embrace the detail data.

During the cycle in which this card is being sorted, the next card is passing through analyzer A and its detail data is being compared to the limits. The comparison is completed before cam contacts CC2 close again to test the comparison result. Cam contacts CC3 open before the comparison result is read out, deenergizing the coil 1CR or 2CR, whichever has been energized, to prepare for new energization of either of these coils according to the new comparison. Thus, the comparison of one card, traversing analyzer A, with limits takes place during the same cycle in which the preceding card, traversing analyzer A, is being sorted according to the previous comparison.

The following principles are drawn from Example 1:

When the highest order of an upper limit of a section has a significant position 9 to 1, the comparison readout is controlled by the action of the highest order quantitative comparing coils of the section. In the present disclosure, the highest order is the tens order, and under the stated condition, coils GIT of the two limit parts of the section are the ultimate comparison readout control coils.

When any intrazone and digit quantitative comparison coil of the limit part of a section is energized, it is held energized during the test period if any zone quantitative comparison coil of the same group or the no-zone limit coil of the limit part has been energized. Thus, in the upper limit part of section #2, coil GIT was energized and held energized during the test period through contacts GZTc of coil GZT (#2, upper), also energized. The converse proposition is true; that if any intrazone and digit coil has been energized and neither a zone coil or no-zone coil of the same group has been energized, the intrazone coil will be deenergized during the test period. For instance, in section #1, lower limit part, coil GIT was energized, during the data readout period but deenergized during the test period because neither the EZT, GZT, nor LNT coil of the same group had been energized.

When the detail character is superior in zone position and inferior in intrazone position to the limit character, the superior zone position dominates and the detail character is found to be greater. Thus, the card character M has a superior zone position and inferior intrazone position to lower limit character E of section #1. The related coil GIT is energized, but with neither of the coils EZT and GZT, of the same group, energized, coil GIT is deenergized during the test period when contacts 147a open (Fig. 10f).

When the detail character is equal in zone position but inferior in intrazone position to the limit character, the intrazone position dominates and the limit character is found to be greater. Thus, detail character M and upper limit character N of section #1 have equal zone positions but the detail character has an inferior intrazone position. Related coil GIT is energized and coil EZT of the same group also energized to close its "b" contacts for continuing the energization of coil GIT during the test period.

When the detail character is inferior in zone position and superior in intrazone position to the limit character, the zone position dominates and determines the limit character to be greater. Thus, detail character M is inferior in zone position but superior in intrazone position to lower limit character T of section #2. Coil GIT of the lower limit portion of section #2 is then energized through the GZTb contacts of coil GZT of the same group and held during the test period through contacts GZTc.

When the detail character is inferior in zone and intrazone positions to the limit character, the intrazone position in conjunction with the zone position dominates. Thus, detail character M is inferior in zone and intrazone positions to upper limit character Y of section #2. Coil GIT of the upper limit portion of section #2 is energized and held through contacts GZTc during the test period.

When the detail data and the limits of a section agree qualitatively in all orders, the quantitative comparison is permitted to remain in control.

*Example 2*

Assume the detail data to be MA, the range of section #1 to be CA to KA, and the range of section #2 to be MA to UA. The positions are indicated below:

| Data | Tens | | Units | |
| --- | --- | --- | --- | --- |
| | Zone | Intrazone | Zone | Intrazone |
| Card—MA | 11 | 4 | 12 | 1 |
| Section #1: | | | | |
| Lower—CA | 12 | 3 | 12 | 1 |
| Upper—KA | 11 | 2 | 12 | 1 |
| Section #2: | | | | |
| Lower—MA | 11 | 4 | 12 | 1 |
| Upper—UA | 0 | 4 | 12 | 1 |

The qualitative comparison will not be discussed for this example as it is the same in nature as for the first example. The quantitative comparison operations are as follows:

*The "4" cycle point.*—The positions "4" of tens order character M of the detail field and characters M and U, respectively of the lower and upper limits of section #2 are simultaneously read out, energizing detail readout coils 127T, 128T, and 128'T and of limit readout coils LIT and SIT of section #2. Through the closed "b" contacts of these limit readout coils and the concurrently closed "a" contacts of coil 127T, the coils EIT of the upper and lower limits of section #2 are energized.

*The "3" cycle point.*—The position "3" in the character C of the lower limit of section #1 is read out, energizing coil LIT of this section. Since contacts 128Tb are open due to maintained energization of coil 128T, and since contacts 127Ta have not closed, the closure of contacts LITa and b is ineffective.

*The "2" cycle point.*—The "2" position in character K of the upper limit portion of section #1 is read out, energizing coil SIT of this section. The closure of the SITa and b contacts is without effect because contacts 128Tb are still held open and contacts 127Ta are not closed at the "2" time.

*The "1" cycle point.*—The units order positions "1" of the card field and all the limits are read out, causing energization of detail coils 127U, 128U, and 128'U and of limit coils LIU and SIU of both sections. The parallel coils EIU and GIU in the upper limits of both sections are energized through the SIUb contacts and the 127Ua contacts.

*The "0" cycle point.*—The zone position "0" in the letter U of the upper limit of section #2 is read out, energizing coil SZT of this section. Related contacts SZTa close, causing coil GZT (#2, upper) to be energized. Related contacts GZTb close, completing a circuit, such as the 1st special circuit described in Example 1, to energize coil GIT of the upper limit of section #2.

*The "11" cycle point.*—The positions "11" of the tens order character M of the card, of K of the upper limit of section #1 and of M of the lower limit of section #2 are read out, energizing detail coils 127T, 128T, and 128'T and limit coils SZT (#1) and LZT (#2). Contacts SZTb (#1) close, and with contacts 127Ta also closed, coil EZT (#1) is energized. Contacts LZTb (#2) close and combine with contacts 127Ta to complete the circuit of coil EZT (#2, lower).

*The "12" cycle point.*—The "12" positions in the units order of the card field and in the units order of each limit are read out, energizing detail coils 127U, 128U, and 128'U and limit coils LZU and SZU of both sections. Consequently, coils EZU in the upper and lower limits of both sections are energized.

At the end of the positions readout period, the following quantitative comparison coils have been energized.

| Section #1 | | Section #2 | |
|---|---|---|---|
| Lower | Upper | Lower | Upper |
| EZU | EZT<br>EZU<br>EIU<br>GIU | EIT<br>EZT<br>EZU | EIT<br>GIT<br>GZT<br>EZU<br>EIU<br>GIU |

In section #1, neither GIT coil is energized and upper and lower relay contacts GITb are in normal condition, so that when cam contacts CC2 close, coil ICA remains unenergized. In section #2, upper limit coil GIT is held during the test period through contacts GZTc of coil GZT (#2, upper). Thus, in section #2, both pairs of contacts GITb are closed at the time cam contacts CC2 close, and coil 2CA is energized. As a result, coil 2CR is energized and its contacts 2CRb close. These contacts are wired to plug socket 131 (Fig. 10a). Assuming socket 131 has been connected by a plugwire (not shown) to a socket 132—9, a limit sorting circuit will be formed during the cycle following comparison similar to the circuit traced in Example 1, but extending through contacts 2CRb (Fig. 10a), socket 131, the plugwire (not shown) to a socket 132—9, and the "9" position of emitter EM1. Magnet SM, energized at the "9" time, will cause the card to go to the "9" pocket. Thus, during the cycle following comparison, the card with detail data MA is directed under control of contacts 2CRb to the sorting pocket assigned to section #2 whose limits MA to UA embrace the detail data.

The following additional principles are deduced from Example 2:

When the detail character is superior in zone position and intrazone position to the limit character, the comparison denotes the detail character to be superior. This may be understood from the comparison of letter M of the card with letter C in the lower limit of section #1.

When the detail character is equal in zone position but superior in intrazone position, the intrazone position dominates and denotes the detail character to be superior. This is indicated by comparison of letter M of the card with letter K of the upper limit of section #1.

When the detail data in all orders of the control field of a card is equal in zone and intrazone positions to all orders of the lower limit of a section, the detail data is below the upper limit of the section and the card is sorted to the pocket assigned to the section. Thus, with detail data MA equal to lower limit MA of section #2, coil GIT (lower limit, #2) remains unenergized and its "b" contacts remain closed. Upper limit coil GIT of section #2 is energized, its "b" contacts close, and the pocket assigned to section #2 is selected for the card.

When the detail character is inferior in zone position and equal in intrazone position, the zone position comparison dominates. Thus, with detail character M inferior in zone position to upper limit character U of section #2 while the intrazone positions are equal, the coil GIT (upper limit, #2) is energized through a special circuit extending through contacts GZTb.

*Example 3*

The card has detail data MM and the limits are MB to MH in section #1, and ML to MQ in section #2. The positions are indicated below.

| Data | Tens | | Units | |
|---|---|---|---|---|
| | Zone | Intrazone | Zone | Intrazone |
| Card—MM | 11 | 4 | 11 | 4 |
| Section #1: | | | | |
| Lower—MB | 11 | 4 | 12 | 2 |
| Upper—MH | 11 | 4 | 12 | 8 |
| Section #2: | | | | |
| Lower—ML | 11 | 4 | 11 | 3 |
| Upper—MQ | 11 | 4 | 11 | 8 |

The qualitative comparison need not be discussed for this example as it is the same in nature as for Example 1.

The quantitative comparison is as follows:

*The "8" cycle point.*—The "8" position in the units order of the upper limit of section #1 is read out, energizing coil SIU (#1). Contacts SIUa close and coil GIU (#1, upper) is energized.

Position "8" in the units order of the upper limit of section #2 is read out, energizing coil SIU (#2). Contacts SIUa (#2) close and coil GIU (#2, upper limit) is energized.

*The "4" cycle point.*—The tens order positions "4" in the card field and all the limits are read out, energizing detail coils 127T, 128T, and 128'T and both limit coils LIT and SIT of both sections. Contacts 127Ta and the "b" contacts of these limit coils close concurrently, causing coils EIT of both limits of each section to energize.

*The "3" cycle point.*—Position "3" in the units order lower limit of section #2 is read out, energizing coil LIT (#2). With contacts 128Tb and 127Ta open, the closure of contacts LITa and b is ineffective.

*The "2" cycle point.*—The units order position "2" of the lower limit of section #1 is read out, again to no effect.

*The "11" cycle point.*—The tens order zone positions "11" of the card and all the limits are read out. Detail coils 127T, 128T, and 128'T and limit coils LZT and SZT of both sections are energized. Closure of contacts 127Ta and the "b" contacts of these limit coils completes circuits through coils EZT of the two limit portions of each section.

The "11" position in the units orders of the card and the two limits of section #2 are read out. The resulting closure of contacts 127Ua and the "b" contacts of the limit coils LZU and SZU of section #2 causes energization of coils EZU (#2, lower) and EZU (#2, upper).

*The "12" cycle point.*—The units order positions "12" of the two limits of section #1 are read out, energizing limit coils LZU and SZU of the section. As contacts 128'Ub were opened at "11" and are held open till after the "12" position sensing period, the closure of the "a" contacts of these limit coils is without effect. The contacts LZUb and SZUb are also ineffective because contacts 127Ua are open.

*The test period.*—Cam contacts CC20 close at about "12½," energizing coil 147 which opens all the test contacts 147a. Prior to the test period, coils EIT and EZT in the lower limit part of section #1 were energized. Hence contacts EZTb are closed, shunting contacts 147a, and maintaining coil EIT (#1, lower) energized. Coils EIT and EZT in the upper limit part of section #1 were energized. Coil EZT closes its "b" contacts, maintaining coil EIT (#1, upper) energized. Likewise, in each limit part of section #2, coils EIT and EZT are energized and these coils EIT remain effective through contacts EZTb during the test period. In section #1, upper limit part, coil GIU has been energized. Neither the contacts SNUa, EZUb, nor GZUb contacts of the same group are closed. Hence, coil GIU (upper, #1) is dropped during the test period. In the upper limit part of section #2, coils GIU and EZU have been energized. Hence, during the test period, coil GIU (upper, #2) is held through contacts EZUb. Thus, in section #2, upper limit part, coils EIT, EZT, GIU, and EZU all remain energized.

At "13" of the cycle, cam contacts CC36 (see Fig. 9) close, causing energization of a coil 160 (Fig. 10a, upper right). Contacts 160a (Fig. 10e) all close. With contacts GIUa and EITb of section #2 (upper limit part) closed, the closure of contacts 160a in the same group completes the following circuit:

*2d special circuit of GIT.*—Line 106, cam contacts CC1, contacts GIUa (#2, upper) a pair of contacts 160a, contacts EITb (#2, upper) coil GIT (#2, upper), and thence through contacts 147a, KCUa, KCTa, to line 107.

At this point, the following quantitative coils are energized:

| Section #1 | | Section #2 | |
|---|---|---|---|
| Lower | Upper | Lower | Upper |
| EIT EZT | EIT EZT | EIT EZT EZU | EIT EZT GIU EZU GIT |

In section #1, neither GIT coil is energized. In section #2, the upper limit coil GIT is energized and the lower limit coil GIT is unenergized. Hence, upon closure of cam contacts CC2 (Fig. 10f), coil 2CA will be energized, in turn causing energization of comparison readout coil 2CR. During the next cycle, the card with detail data MM will be directed to the pocket chosen for section #2 set to limits ML to MQ.

The following additional principles may be drawn from Example 3:

When the detail data is equal in the tens order to a limit, the comparison of the units orders determines the magnitude of the detail data with respect to the limit.

When the detail data is equal in the tens orders to a limit but superior thereto because its zone position is greater in the units order, the comparison indicates the inferiority of the limit regardless of the relative magnitude of the intrazone positions in the units order. Thus, detail data MM is superior to limit MH (#1, upper) owing solely to the fact that zone position "11" of the units order letter M of the detail data is superior to zone position "12" of letter H in the units order of the limit. Accordingly, coil GIT (#1, upper) was not energized, although the intrazone position "8" of limit letter H is greater than intrazone position "4" of the units order detail letter M and coil GIU was energized.

When the detail data and a limit are equal in the tens orders and also in the zone positions of the units order but the limit is inferior in the intrazone position of the units order, the comparison indicates the detail data to be greater. Thus, comparing detail data MM with limit ML (#2, lower), the coils EIT, EZT, and EZU were all energized but as coil GIU of the group was not energized, coil GIT (#2, lower) remained inactive.

When the detail data and a limit are equal in the tens orders and also in zone positions in the units order but the limit is superior in the intrazone position of the units order to the intrazone position of the units order of the detail data, the units order intrazone position of the limit dominates and the comparison determines the limit to be superior to the detail data. Thus, comparing MM of the card with limit MQ (upper, #2), the limit is superior solely because the intrazone position "8" of the units order character Q is superior to position "4" of the units order character M. Coils EIT, EZT, EZU, and GIU are all energized, and the 2d special circuit of GIT of the group is completed after the test period and upon closure of relay contacts 160a.

Example 4

The card has data QG, the limits are HH to QG in section #1 and QM to YH in section #2. The positions are indicated below.

| Data | Tons | | Units | |
|---|---|---|---|---|
| | Zone | Intrazone | Zone | Intrazone |
| Card—QG | 11 | 8 | 12 | 7 |
| Section #1: | | | | |
| Lower—HH | 12 | 8 | 12 | 8 |
| Upper—QG | 11 | 8 | 12 | 7 |
| Section #2: | | | | |
| Lower—QM | 11 | 8 | 11 | 4 |
| Upper—YH | 0 | 8 | 12 | 8 |

The qualitative comparison need not be discussed as the qualitative conditions are the same as in Example 1. The quantitative comparison operations are as follows:

*The "8" cycle point.*—The "8" positions in the tens orders of the detail field and the limits are read out, energizing detail coils 127T, 128T, and 128'T and limit coils LIT and SIT of both sections. Contacts LITb and SITb close and through concurrently closed 127Ta contacts, coils EIT in both limits of each section are energized. The "8" position in the units order of the lower limit of section #1 is read out, its coil LIU is energized and related contacts LIUa close to complete the circuit of coil GIU (#1, lower).

The "8" position in the units order of the upper limit of section #2 is read out, causing coil SIU of the section to energize. Its "a" contacts close and coil GIU (upper, #2) is energized.

*The "7" cycle point.*—The "7" position in the units order of detail data and the upper limit of section #1 is read out, energizing detail coils 127U, 128U, and 128'U and the limit coils SIU of section #1. Contacts SIUb close and as contacts 127Ua are concurrently closed, coil EIU (#1, upper) is energized. In the upper limit parts, the coils EIU and GIU are in parallel; hence coil GIU (#1, upper) is energized.

*The "4" cycle point.*—Position "4" in the units order of the lower limit of section #2 is read out. Coil LIU (#2) is energized and its "a" contacts close, but as contacts 128Ub are open, the coil GIU (#2, lower) is not energized.

*The "0" cycle point.*—The "0" position in the tens order of upper limit of section #2 is read out, energizing related coil SZT. Its contacts SZTa close and coil GZT (#2, upper) is energized. Coil GZT (#2, upper) closes its "b" contacts and as coil EIT in the same group was previously energized, its contacts EITb are closed and the 1st special circuit of related coil GIT (#2, upper) is completed through these "b" contacts in the manner traced before in Example 1.

*The "11" cycle point.*—The tens order detail position "11" is read out, energizing coils 127T, 128T, and 128'T. This tens order position "11" in the upper limit of section #1 is read out and coil SZT (#1) is energized. The "11" position in the tens order of the lower limit of section #2 is read out and coil LZT (#2) is energized. In the units order of the latter limit, the "11" position is read out and related coil LZU is energized. With contacts 127Ta and SZTb (#1) closed, coil EZT (#1, upper) is energized. With contacts 127Ta and LZTb (#2) closed, coil EZT (#2, lower) is energized. The closure of contacts LZUa (#2) completes the circuit of coil GZU (#2, lower).

*The "12" cycle point.*—In the tens order of the lower limit of section #1, the "12" position is read out, causing coil LZT (#1) to be energized. Contacts LZTa and b close to no effect because contacts 127Ta and 128'Tb are open. In the units order, the "12" position is read out of the detail field, the two limits of section #1, and the upper limit of section #2. Detail coils 127U, 128U, and 128'U, limit coils LZT and SZU of section #1, and limit coil SZU of section #2 are energized. Through the "b" contacts of LZU and SZU of section #1 and related contacts 127Ua, coils EZU (both limits #1) are energized. Through contacts SZUb (#2) and related contacts 127Ua, coil EZU (#2, upper) is energized.

At the end of the readout period, the following quantitative comparison coils are energized:

| Section #1 | | Section #2 | |
|---|---|---|---|
| Lower | Upper | Lower | Upper |
| GIU | GIU | EIT | GIT |
| EIT | EIT | EZT | GIU |
| EZU | EIU | GZU | EIT |
| | EZT | | EZU |
| | EZU | | GZT |

*The test period.*—Cam contacts CC20 close at about "12½," causing energization of coil 147 (Fig. 10b) to open all the contacts 147a (Fig. 10f). In section #1, lower limit part, neither the EZT nor GZT coil has been energized and neither contacts EZTb nor GZTc are closed. Hence, coil EIT (#1, lower) is deenergized. In section #1, upper limit part, coil EZT has closed contacts EZTb, maintaining coil EIT (#1, upper) effective. Also in section #1, upper limit part, coil EZU has closed contacts EZUb, maintaining coil GIU (#1, upper) effective. In section #2, lower part, coils EIT, EZT and GZU are energized and contacts EZTb maintain coil EIT (#2, lower) energized. In section #2, upper part, coil GIT is held through contacts GZTc.

*The "13" cycle point.*—Cam contacts CC36 close, energization of coil 160 (Fig. 10a) results and contacts 160a (Fig. 10e) close. In section #1, upper part, contacts EITb and GIUa are closed and upon closure of contacts 160a, coil GIT (#1, upper) is energized through a 2d special circuit of GIT such as traced in Example 3. In section #2, lower part, contacts GZUb and EITb are closed and upon closure of contacts 160a, the following circuit is formed (Figs. 10e and 10f):

*3d special circuit of GIT.*—Line 106, wire 152, contacts GZUb, contacts 160a, contacts EITb, contacts 147a, to line 107.

In section #2, upper part, coil GIT was previously energized and has been held through the test period. Hence, at this point, coil GIT (#1, upper) and coils GIT (upper and lower, #2) are energized. Therefore, upon closure of cam contacts CC2, coil ICA is energized and causes energization of coil ICR. Thus, the card with data QG will be directed to the pocket assigned to section #1 set to the range HH to QG.

The following additional principles are demonstrated by Example 4.

A card whose detail data equals the upper limit of a section is sorted to the pocket selected for the section. This explains why coil GIU is in parallel with a coil EIU in the upper limit parts. By this arrangement, coil GIU of an upper limit part is energized when the units order intrazone position of the upper limit is equal to as well as greater than the units order intrazone position of the detail field. If every other position also is equal, the energization of coil GIU causes the coil GIT of the upper limit to be energized through the 2d special circuit of a coil GIT.

When the detail data is equal to a limit in the tens orders but inferior in the zone position of the units order, the relation of the intrazone positions in the units order is disregarded and the detail data is found inferior by the comparison. This is indicated by comparison of detail data QG with lower limit QM of section #2. Coil GZU was energized and through a 3d special circuit, coil GIT was energized. The superiority of units order intrazone position "7" of the detail letter G to position "4" of the units order limit letter M was disregarded.

Example 5

Assume the card passing through analyzer A has detail data TP and the limits are CX to LP in section #1, and B4 to Y8 in section #2. The positions are shown below:

| Data | Tens | | Units | |
|---|---|---|---|---|
| | Zone | Intrazone | Zone | Intrazone |
| Card—TP | 0 | 3 | 11 | 7 |
| #1 section: | | | | |
| Lower—CX | 12 | 3 | 0 | 7 |
| Upper—LP | 11 | 3 | 11 | 7 |
| #2 section: | | | | |
| Lower—B4 | 12 | 2 | | 4 |
| Upper—Y8 | 0 | 8 | | 8 |

*The "8" cycle point.*—The "8" positions in the units and tens orders of the upper limit of section #2 are read out, energizing coils SIU and SIT of the section. Contacts SIUa and SITa are closed to complete circuits through coils GIU and GIT of the upper limit of section #2. Contacts SIUc and SITc (Fig. 10f) of section #2 close and cause energization of coils IKU and IKT of the section.

*The "7" cycle point.*—The "7" position in the units order of the detail data is read out, energizing coils 127U, 128U, and 128'U. Contacts 127Ub close, energizing coils 150IU of both sections (Fig. 10f). The "7" positions in the units orders of the upper and lower limits of section #1 are read out, energizing coils LIU and SIU of the section. Contacts SIUb (#1, upper) close and with contacts 127Ua closed also, paralel coils EIU and GIU (#1, upper) are energized. Contacts SIUc (#1) also closed to complete the circuit of coil IKU (#1).

*The "4" cycle point.*—The "4" position in the units order of the lower limit of section #2 is read out; coil LIU of the section is energized and its "a" contacts close to no avail because contacts 128Ub are open.

*The "3" cycle point.*—The "3" positions in the tens orders of the detail field and the upper and lower limits of section #1 are read out. Detail coils 127T, 128T, and 128'T and limit coils LIT and SIT of section #1 are energized. Contacts LITb and 127Ta complete a circuit through coil EIT (#1, lower). Contacts SITb and 127Ta complete the circuit of coil EIT (#1, upper). The two contacts 127b (Fig. 10f) close and complete the circuits of coils 150IT of both sections. Contacts SITc (Fig. 10f) of section #1 close, causing coil IKT (#1) to be energized.

*The "2" cycle point.*—The "2" position in the tens order of the lower limit of section #2 is read out, energizing coil LIT (#2). Contacts LITa and b close to no effect because contacts 128Tb and 127Ta are open.

*The "0" cycle point.*—The tens order position "0" of the card field is read out, again completing the readout circuit through coils 127T, 128T, and 128'T. Coil 128'T is held through cam contacts CC19. The tens order zone position "0" in the upper limit of section #2 is read out and coil SZT of the section is energized. Through contacts 127Ta and SZTb, the circuit of coil EZT (#2, upper) is completed. Contacts SZTc (#2) also closed, causing energization of coil ZKT (#2). Contacts 127Tc in each section also closed causing the coil 150ZT in each section to be energized.

Zone position "0" in the units order of the lower limit of section #1 is read out and related coil LZU is energized to close its "a" contacts; hence coil GZU (#1, lower) is energized. Contacts GZUb (#1, lower) close and a circuit makes through coil GIU (#1, lower) as follows, (Figs. 10e and 10f):

*Special circuit of GIU.*—Line 106, wire 152, contacts GZUb, coil GIU, and 147a contacts, to line 107.

*The "11" cycle time.*—The "11" zone position in the tens order of the upper limit of section #1 is read out, related coil SZT is energized, and its "a" and "b" contacts close to no effect since contacts 127Ta are not closed and contacts 128'Tb were opened at "0" and remain open to the end of the zone period. Contacts SZTc (#1) close, causing coil ZKT (#1) to be energized.

The "11" positions in the units orders of the detail value and the upper limit of section #1 are read out. Detail coils 127U, and 128U, 128'U and limit coil SZU are energized. Through contacts 127Ua and SZUb, coil EZU (#1, upper) is energized. Contacts 127Uc close, causing energization of coils 150ZU of both sections. Contacts SZUc (#1) close, causing coil ZKU (#1) to be energized.

*The "12" cycle point.*—Position "12" in the tens orders of the lower limits of sections #1 and #2 are read out. Coils LZT are energized and their "a" and "b" contacts close to on effect since contacts 127Ta and 128'Tb are open.

At this point, the following coils are energized:

| Section #1 | | | Section #2 | | |
|---|---|---|---|---|---|
| Quantitative | | Qualitative | Quantitative | | Qualitative |
| Lower | Upper | | Lower | Upper | |
| EIT | EIT | 150IT | | GIT | 150IT |
| GZU | EIU | 150ZT | | GIU | 150ZT |
| GIU | GIU | 150IU | | EZT | 150IU |
| | EZU | 150ZU | | | 150ZU |
| | | IKT | | | IKT |
| | | ZKT | | | ZKT |
| | | IKU | | | IKU |
| | | ZKU | | | |

*The test period.*—Cam contacts CC20 close, coil 147 (Fig. 10b) is energized, and its contacts 147a (Fig. 10f) open. In section #1, both coils EIT are deenergized since the related EZT or GZT coils are not energized. In the units order of section #1, lower part, coil GIU is held through contacts GZUc; in section #1, upper part, coil GIU is held through contacts EZUb. In section #2, upper part, coil GIT is held through contacts EZTb. With coils EIT in the upper and lower parts of section #1 deenergized, contacts EITb are open and the 3d special circuit of GIT cannot be established even though contacts GIUb are closed when the contacts 160a close subsequently at "13." Thus, in section #1, neither coil GIT is energized. In section #2, upper part, coil GIT is not dropped as a result of the opening of test contacts 147a but is dropped because the contacts KCUa of section #2 open. This occurs as a result of the following operations. Qualitative comparison control coil IKU (#2) is energized by the companion coil KZU (#2) is not energized. Hence, when cam contacts CC30 close at about "12½," coil KU (#2) is energized through the "b" transfer contacts of coils IKU and ZKU of section #2. Coils 150IU and 150ZU are energized. Hence, when contacts CC30 close, coils 151U remain deenergized. With coil 151U (#2) deenergized and coil KU (#2) energized, coil KCU (#2) is energized through the "a" transfer contacts of coils 151U and KU of section #2 and through cam contacts CC30. Coil KCU (#2) opens its "a" contacts, breaking the stick circuit of coil GIT of the upper limit part of section #2. Hence, contacts GITb (upper #2) do not close and even though contacts GITb (lower, #2) remained closed, a circuit will not be completed through coil 2CA when cam contacts CC2 close. Thus, the card with data TP will not be sorted to the pocket assigned to section #2 whose limits are B4 to Y8 because of the lack of qualitative agreement between the data of the card and the limits of this section. In section #1, neither coil GIT is energized; hence, the card will not be directed to the pocket assigned to section #1 whose limits are CZ to LP.

The following additional principle is demonstrated by Example 5.

A lack of qualitative agreement between a character in an order of the card field and the character in the corresponding order of the limits of a section nullifies the quantitative comparison and prevents sorting of the card to the pocket assigned to the section.

Example 6

The card has data M4, the limits are digits 1 to 9 in section #1 and A1 to Z1 in section #2. The positions are indicated below.

| Data | Tens | | Units | |
|---|---|---|---|---|
| | Zone | Intrazone | Zone | Intrazone |
| Card—M4 | 11 | 4 | | 4 |
| #1: | | | | |
| Lower 1 | | | | 1 |
| Upper 9 | | | | 9 |
| #2: | | | | |
| Lower A1 | 12 | 1 | | 1 |
| Upper Z1 | 0 | 9 | | 1 |

The operations are as follows:

*The "9" cycle point.*—The "9" position in the units order of the upper limit of section #1 is read out, causing coil SIU (#1) to be energized, in turn causing energization of coil GIU (#1, upper). Contacts SIUc (Fig. 10f) of section #1 also close and coil IKU (#1) is energized. The "9" position in the tens order of the upper limit of section #2 is read out, coil SIT (#2) is energized, in turn causing coil GIT (#2, upper) to be energized. Contacts SITc also closed and energization of coil IKT (#2) resulted.

*The "4" cycle point.*—Positions "4" in the tens and units orders of the detail field are read out and detail coils 127T, 128T, 128'T, 127U, 128U, and 128'U are all energized. Contacts 127Ub and 128Tb close (Fig. 10f) and coils 150IU and 150IT are energized.

*The "1" cycle point.*—Position "1" in the units order of the lower limit of section #1 is read out and coil LIU (#1) is energized. Contacts LIUa close to no avail because contacts 128Ub are open. Position "1" in the units orders of the upper and lower limits of section #2 are read out. Contacts LIUa and SIUa close to no effect. Contacts SIUc close, causing energization of coil IKU (#2). Position "1" in the tens order of the lower limit of section #2 is read out; coil SIT (#2) is energized to no effect because coil 128T was previously energized and is held till about "0½."

*The "0" cycle point.*—Zone position "0" in the tens order of the upper limit of section #2 is read out, coil SZT (#2) is energized, its "a" contacts close and coil GZT (#2, upper) is energized. Contacts SZTc (#2) closed and coil ZKT (#2) is energized.

*The "11" cycle point.*—Position "11" in the tens order of the card field is read out and coils 127T, 128T, and 128'T energized. Contacts 127Tc (bottom of Fig. 10f) close and both coils 150ZT are energized.

*The "12" time.*—Position "12" in the tens order of the lower limit of section #2 is read out to no avail because position "11" in the corresponding order of the card field is superior and contacts 128'Tb are held open by maintained energization of coil 128'T.

At this point, the following coils are energized:

| Section #1 | | | Section #2 | | |
|---|---|---|---|---|---|
| Lower | Upper | Qualitative | Lower | Upper | Qualitative |
| | GIU | 150IU 150IT-150ZT IKU | | GIT GZT | 150IU 150IT-150ZT IKT-ZKT IKU |

*The test period.*—Cam contacts CC20 close, and coil 147 (Fig. 10b) is energized, opening contacts 147a (Fig. 10f). Since the units order of each section is set to a digit, coils LNU and SNU (Fig. 10d) are energized and their "a" contacts (Fig. 10f) are closed, shunting contacts 147a. Hence, coil GIU (#1, upper) is not deenergized upon opening of contacts 147a. Coil GIT (#2, upper) remains energized through contacts GZTc.

*Qualitative test.*—Cam contacts CC30 close to determine which of coils 151T and U, KT and U, and KCT and KCU are to be energized.

In each section, coils 150IT and 150ZT, 140ZT are energized; hence, coil 151T is deenergized. Coil 150IU is energized while paired coil 150ZU is deenergized; hence, coil 151U is energized.

In section #1, coils IKT and ZKT are not energized; hence, coil KT is deenergized. With KT and 151T both deenergized, coil KCT remains deenergized. Coil IKU is energized while coil ZKU is not energized; hence, coil KU is energized. With coil KU and 151U energized, coil KCU is not energized. Accordingly, contacts KCTa and KCUa (#1) remain closed and coil GIU (#1, upper) remains energized.

In section #2, coils IKT and ZKT are energized; hence, coil KT is deenergized. With coils KT and 151T deenergized, coil KCT (#2) remains deenergized. Coil IKU is energized while coil ZKU is not; hence, coil KU is energized. As coil 151U also is energized, coil KCU is not energized. Thus, in section #2, both contacts KCTa and KCUa remain closed, and coils GIT and GIU (upper, #2) remain energized.

*Comparison readout.*—In section #1, coil IKT is not energized; hence, contacts IKTc are in normal condition, placing coil ICA under control of contacts GIUb. The lower limit pair of contacts GIUb has not opened while the upper limit pair of contacts GIUb has closed. Qualitative control coils 150IT have been energized. Hence, contacts 150ITc in series with contacts GIUb, are open. Thus, upon closure of cam contacts CC2, the open contacts 150ITc of section #1 prevent completion of a circuit through the GIUb contacts of section #1, and coil ICA remains unenergized.

In section #2, coil IKT is energized and contacts IKTc are shifted, placing coil 2CA under control of the GITb contacts, upper and lower. In the present example, these are both closed. Hence, coil 2CA will be energized and the card with data M4 will be sorted to pocket assigned to section #2 whose limits are AI to ZI.

An additional principle demonstrated by Example 6 is:

When the detail field of the card has a significant position 9 to 1 in a higher order while the limits of a section lack a significant figure in the corresponding order, the card will not be sorted to the pocket assigned to said section, regardless of the results of the quantitative comparison. This principle was demonstrated by the comparison of detail value M4 with limits 1 to 9 of section #1.

Example 7

The card has detail data 0 (zero) T and the limits are 0 (zero) S to 0 (zero) Y in section #1 and A0 (zero) to Y0 (zero) in section #2. The positions are as follows:

| Data | Tens | | Units | |
|---|---|---|---|---|
| | Digit | Zone | | Intrazone |
| Card 0 (zero) T | | 0 | 0 | 3 |
| Section #1: | | | | |
| Lower 0 (zero) S | | 0 | 0 | 2 |
| Upper 0 (zero) Y | | 0 | | 8 |
| Section #2: | Zone | Intrazone | Digit | |
| Lower A0 (zero) | 12 | 1 | 0 | |
| Upper Y0 (zero) | 0 | 8 | 0 | |

The operations are as follows:

*The "8" cycle point.*—The tens order position "8" of the upper limit of section #2 is read out, coil SIT is energized, contacts SITa close and coil GIT (#2, upper) is energized. Contacts SITc close, causing energization of coil IKT (#2).

Position "8" in the units order of the upper limit of section #1 is read out, coil SIU is energized, contacts SIUa close, and coil GIU (#1, upper) is energized. Contacts SIUc close, energizing coil IKU (#1).

*The "3" cycle point.*—Position "3" in the units order of the detail data is read out, causing energization of coils 127U, 128U, 128'U. Contacts 127Ub close, causing coils 150IU to be energized. Coil 128U is held through cam contacts CC17 into the "0" time and contacts 128Ub remain open till then.

*The "2" cycle point.*—Position "2" in the units order of the lower limit of section #1 is read out, coil LIU (#1) is energized, and its "a" contacts close to no avail because contacts 128Ub are still open.

*The "0" cycle point.*—The "0" positions in the tens and units orders of the card are read out, a detail readout circuit is completed through coils 127T, 128T, and 128'T, and another detail readout circuit through coils 127U, 128U, and 128'U. Contacts 127Uc close, causing energization of coils 150ZU. Contacts 127Tc also close, and coils 150ZT are energized.

Digit positions "0" in the tens orders of the upper and lower limits of section #1 are read out, related coils LIT and SIT are energized, their "b" contacts close and with contacts 127Ta also closed, coils EIT (#1, upper and lower) are energized. Contacts SITd also close, and coil ZKT (#1) is energized.

Zone positions "0" in the units orders of the two limits of section #1 are read out; coils LZU and SZU are energized. Their "b" contacts close, and with contacts 127Ua also closed at this time, coils EZU (upper and lower, #1) are energized. Contacts SZUc close, and coil ZKU (#1) is energized.

Zone position "0" in the tens order of the upper limit of section #2 is read out, coil SZT is energized, contacts SZTb close and with contacts 127Ta also closed, coil EZT (#2, upper) is energized. Contacts SZTc close and coil ZKT (#2) is energized.

Digit positions "0" in the units orders of the two limits of section #2 are read out and coils LIU and SIU are energized. Contacts SIUb close and with contacts 127Ua being also closed, parallel coils EIU and GIU (#2, upper) are energized. Contacts LIUa also closed, but as contacts 128b are still open, coil GIU (#2, lower) is not energized. Contacts SIUd closed and energized coil ZKU (#2).

*The test period.*—Contacts 147a open and coils EIT in section #1 are held through shunt contacts LNTa and SNTa which are closed for section #1 because both its limits are digits in the tens order. Coil GIU in section #1, upper limit part, is held through contacts EZUb. In section #2, upper part, coil GIT is held through contacts EZTb while coil GIU is held through contacts SNUa.

At "13" of the cycle time, cam contacts CC36 close, coil 160 is energized, and contacts 160a close. With GIU and EIT in the upper limit part of section #1 both energized, the 2d special circuit of GIT (#1, upper), such as traced in Example 3, is completed through a pair of contacts 160a.

At this point, the following readout control coils are energized:

| Section #1 | | | Section #2 | | |
|---|---|---|---|---|---|
| Lower | Upper | Qualitative | Lower | Upper | Qualitative |
| EIT EZU | GIT GIU EIT EZU | ZKT IKU—ZKU 150IU—150ZU 150ZT | | GIT GIU EIU EZT | ZKU IKT—ZKT 150IU—150ZU 150ZT |

*Qualitative test.*—When cam contacts CC30, close, coils KT and 151T of section #1, and KU and 151T of section #2 are energized. With KT and 151T energized in section #1, coil KCT (#1) is not energized. As coils KU and 151U (#1) both are energized, coil KCU (#1) remains unenergized. In section #2, coil 151T is energized while coil KT is not energized; hence coil KCT is energized. Further, with coil KU (#2) energized, and coil 151U not energized, coil KCU (#2) is energized. Hence, contacts KCUa (#2) and KCTa (#2) are open, and deenergization of coils GIU and GIT of the upper part of section #2 results.

*Comparison readout.*—In section #1, coils GIT and GIU remain energized. Coil IKT was not energized owing to the lack of a significant position 9 to 1 in the tens order of the upper limit. Thus, contacts IKTc (#1) are in normal condition in which the lower side of these contacts connects coils ICA to the central blade of contacts IKUc. Since the units order of the upper limit of section #1 has a significant position "8," coil IKU was energized and contacts IKUc are now in shifted condition in which the upper side of these contacts is closed. As the tens order of the detail field does not have a significant position 9 to 1, coils 150IT were not energized; hence contacts 150ITc in series with the contacts GIUb (upper and lower, #1) and the upper side of contacts IKUc (#1) remain closed. Hence, the following circuit of coil ICA is established (Fig. 10f):

*Units order comparison readout pick-up.*—Line 106, contacts CC2, 150ITc (#1) GIUb (#1, lower), GIUb (#1, upper), the upper side of contacts IKUc (#1), the lower side of contacts IKTc (#1), coil ICA, to line 107.

Coil ICA closes its "a" contacts, picking up coil ICR which is then held through contacts ICRa and cam contacts CC3. Thus, the card with data 0 (zero) T will be sorted to the pocket assigned to section #1 whose range is 0 (zero) S to 0 (zero) Y.

It may be noted that if the upper limit of section #1 did not have a significant position 9 to 1 in the units as well as in the tens order, then coil IKU (#1) would not have been energized and its upper side would have remained open while its lower side would have remained closed. The comparison readout would then be controlled by a still lower order of quantitative comparison coils; i. e., a tenths order which has not been shown or discussed in order to simplify the explanation and disclosure. It is believed clear, however, that the principles of the comparison readout operations and controls may be extended to as many orders as desired or necessary.

Example 7 demonstrated that when a higher order of the card field and a corresponding order of the upper limit of a section both lack a significant digit, the control of the comparison readout is determined by comparison of the next lower orders.

*Example 8*

The card has data C5 and the limits of a section are C0 (zero) to T0 (zero). The positions and data are indicated below:

| Lower limit | | Card field | | Upper limit | |
| --- | --- | --- | --- | --- | --- |
| Tens C | Units 0 | Tens C | Units 5 | Tens T | Units 0 |
| 12—3 | 0 | 12—3 | 5 | 0—3 | 0 |

*The "5" cycle point.*—Position "5" in the units order of the card field is read out, and coils 127U, 128U, and 128'U are energized. Contacts 128Ua close and coil 128U is held through cam contact CC17 into the "0" cycle time.

*The "3" cycle point.*—Positions "3" in the tens orders of the limits and the card are read out. In the manner indicated before, coils EIT of both limits are energized. Detail coil 128T remains energized into the "0" cycle time.

*The "0" cycle point.*—The digit "0" positions in the units orders of the limits are read out, coils LIU and SIU are energized, and contacts SIUa close to no avail because contacts 128Ub are still open. Zone position "0" in the tens order of the upper limit is read out, coil SZT is energized contacts SZTa close, and as contacts 128'Tb are still unopened, coil GZT (upper) is energized.

*The "12" cycle point.*—Positions "12" in the tens orders of the card and the lower limit are read out, coils 127T and LZT are concurrently energized, and coil EZT (lower) is energized as a result.

At this point, coils EIT of both limits, GZT of the upper limit, and EZT of the lower limit are energized. Coil GZT closes its "b" contacts and coil GIT (upper) is energized. Coil GIT (lower) remains unenergized. The card will therefore, be sorted to the pocket assigned to the section.

The qualitative comparison need not be discussed as it is believed fully understood from the preceding examples.

*Example 9*

The card has data 44 and the limits in a section are 1 to 50. At the "5" time, coil GIT (upper) and coil IKT are energized. At the "4" time, coils 150IT and 150IU are energized. Coils 128T and 128U are energized at "4" and held into the "0" time. At the "0" time, coil IKU is energized. Coil GIT of the upper limit part is maintained energized during the test period through shunt contacts SNTa of no-zone coil SNT of the section. When cam contacts CC30 close, coils 151T, 151U, KT and KU are energized. With paired coils 151T and KT and paired coil 151U and KU energized, qualitative readout coils KCT and KCU remain inactive, indicating qualitative agreement. Coil GIT (upper) closes its "b" contacts; the coil GIT (lower) has not been energized. Coil IKT was energized, and its contacts IKTc are closed. The tens order comparison readout pick-up circuit will, therefore, be completed, and the card will be sorted to the pocket assigned to the section.

It is believed clear from the several examples that if a card has detail data lying within the range of a section, the upper limit quantitative comparing coil GIT, if a significant figure is in the higher order of the upper limit or the upper limit coil GIU, if a significant position is only in the units order of the upper limit, will be energized to control the machine for sorting the card to the pocket assigned to the section. Thus, the qualitative comparison need be made only between the detail data and the upper limit of a section in order to prevent sorting of the card, should qualitative agreement be lacking, to the destination assigned to the section. This is because upon lack of qualitative agreement, the upper limit quantitative comparing coils GIT and GIU will be prevented from remaining energized and hence, the section will be prevented from embracing the detail data.

It may also be understood from the preceding description and examples that the separate quantitative comparisons of zone and intrazone or digit positions in each order are integrated during the test period when cam contacts CC20 close and energize coil 147 to open contacts 147a. The energization of an intrazone and digit quantitative comparing coil must then be held through either of three alternative paths, two of which are controlled by zone comparison coils of the related order when the limit in the order is an alphabetic character, and the other of which is effective when the order of the limit has a digit. After the test period, a further integration takes place between the orders, so that should the tens orders of detail data and a limit be equal, the final quantitative comparison would be determined by the units order comparison. Likewise, the zone and intrazone qualitative comparisons of each order are integrated during the period of closure of cam contacts CC30. During this same period, the qualitative and quantitative comparisons are integrated by determining whether contacts KCTa and KCUa or either of them in the return circuit of the intrazone and digit quantitative comparison coils of the upper limit should be opened or should remain closed and, further, by determining through coils IKT and IKU, as well as through coils 150IT, whether the tens or units orders of quantitative comparison coils should be placed in control of the comparison readout.

The means for reading out limits from the manual representing means (Figs. 4, 7, and 8) has been explained. Instead of utilizing the manual representing means to determine the limit ranges, automatic limit representing means may be used. The limits in the automatic representing means may be derived from an all-limit card CM or single-limit cards CS (Fig. 5). The automatic limit representing means includes the entry-receiving means shown in Fig. 6 and described before as being settable to represent positions 9 to 0 of the digits or intrazone positions 9 to 1 of alphabetic data. An explanation will now be given in detail of the manner in which limits derived from limit cards are entered in the automatic limit representing means.

ENTERING LIMITS DERIVED FROM LIMIT CARDS

For this type of operation, the cards to be sorted are arranged in groups, each group to be sorted according to limits derived from a limit card or cards. The limit card may be an all-limit card CM, a single-limit card CS, or a single-limit card CS' (Fig. 5). When an all-limit card is detected by the machine, the previous limits are canceled from a plurality of sections of the automatic limit-representing means and new limits are entered from the card to control sorting of the cards following the limit card and preceding the next limit card. To enable the machine to detect the presence of an all-limit card, a suitable column of the card; for example, column 12, as shown in Fig. 5, is punched in the "11" position. When a single-limit card CS or CS' is detected by the machine, limits are canceled from a selected section and new limits entered in this section. The selection of the section to be reset and receive new limits from the single-limit card CS is controlled by a selection perforation 9 to 1 in a suitable column, say column 12, as shown in Fig. 5. To enable the machine to detect a single-limit card CS, the lower right hand corner of the card is cut off, as indicated in Fig. 5.

Before starting the machine in operation for limit entry from limit cards and sorting according to such limits, the switches 122 and 123 (Fig. 10a) are set in "limit" positions. Further, a switch 164 (Fig. 10a, right) is closed if cards CS are to be handled. As before, plug connections are made between sockets 125 of analyzer A and sockets 126 of the detail readout coils 127U and T, 128U and T, and 128' U and T to place these readout coils under control of the card fields which contains the detail values to be compared with the limits. Plug connections (not shown) are also made between lower and upper limit sockets 165 of both sections and eight sockets 121 of the brushes 21 of analyzer B adapted to sense the fields of a card CM bearing the upper and lower limits of sections #1 and #2. Also, a group of four sockets 166 for the lower and upper limits of either section is plugged by plugwires (not shown) to the sockets 121 of the brushes 21 adapted to sense the lower and upper limit fields of a single-limit card. The latter group of four sockets 121 may be included in the group of eight sockets 121 connected to sockets 165 or may be outside the group of eight sockets 121. The plug connections from sockets 121 to sockets 165 and 166 connect the limit entry circuits, to be traced later, to the brushes 21 of analyzer B which are adapted to sense the card fields bearing the limits. The detail field of cards C has two columns which may correspond in column position to two columns of any limit field of the limit cards, and two brushes 21 of the group selected to sense the limits may also sense the detail columns of cards C without any harmful result. The two left hand sockets 165 shown in Fig. 10a are wired to the lower limit entry controls of section #1, the next two sockets 165 relate to the upper limit entry controls of section #1, the other sockets 165 similarly relate to the lower and upper limit entry controls of section #2. The two left hand sockets 166 relate to the lower limit and the two right hand sockets 166 to the upper limit entry controls of either section, whichever is selected by a single-limit card.

In addition to the above adjustments, switch bars 135 (bottom of Fig. 10d) are set in the positions shown, in which their "a" sides are closed to place the limit readout coils in circuit with automatic limit-representing circuit elements. In addition, a plugwire (not shown) is connected between a socket 167 (upper right of Fig. 10a) to the analyzer A socket 125 of the brush adapted to sense the column of an all-limit card CM bearing the "11" control perforation. In Fig. 5, column 12 is shown as containing the "11" control perforation. For convenience, the same column is used on single-limit cards to bear the section-selecting perforation. To enable the section-selecting perforations of single-limit cards to effect their requisite control, plug connections (not shown) are made between a pair of sockets 168 and a pair of sockets 169 and 170 (Fig. 10b, left). The sockets 168—1 to 9 are wired respectively to positions 1 to 9 of an emitter EM3. The sockets 168 selected for connection correspond to the selection perforations which are to exercise section-selecting control. For example, if section #1 is to be selected by a "5" perforation, the socket 168—5 is connected to socket 169. Further, if an "8" perforation for example, is to select section #2, the socket 168—8 is connected to socket 170.

Having made these preliminary adjustments, the main switch 103 (Fig. 10b, lower right) is closed, placing power on opposite lines 106 and 107. The PCM and FCM clutch magnet circuits are completed as soon as power is on the line and the entire feed mechanism is prepared to operate. The machine is then started by depressing the start key to close start key contacts ST' (Fig. 10b, lower right). As before, this causes energization of relay coils 115 and motor relay coil 116. Coil 116 closes its "a" contacts, setting motor M in operation. During the first cycle, the first card is fed out of the hopper to a position just in advance of analyzer A brushes 17

(Fig. 1), meanwhile causing card lever contacts CL1' to close and CL2' to open. Coil 117 is energized by closure of contacts CL1'; contacts 117a close, shunting the start key contacts, and the start key may be released without interrupting operation of motor M. Assume, now, that the first card is an all-limit card CM.

OPERATIONS RELATING TO AN ALL-LIMIT CARD CM

The first cycle has brought the card CM to the position where it has closed card lever contacts CL1' and is about to enter analyzer A. During the second cycle, the card CM passes through analyzer A and the second card, which is the first detail card C of the group, reaches a position just in advance of analyzer A and in which it maintains card lever contacts CL1' closed and card lever contacts CL2' open. At the end of the second cycle, the first card CM is just in advance of analyzer B brushes 21 and has just caused card lever contacts CL3' to close. Closure of contacts CL3' energizes coil 119.

During the second cycle, as the card CM proceeded through analyzer A, the special control perforation "11" thereof was sensed at the "11" time, causing the following circuit to be completed (Fig. 10a):

*Coil 109.*—Line 107, circuit breaker CB1, the contact roll 8 of analyzer A, the brush 17 sensing the "11" perforation in the special control column, the brush socket 125, the plugwire (not shown) to socket 167 (upper right of Fig. 10a), card lever relay contacts 117b, cam contacts CC8 (see Fig. 9), coil 109, to line 106.

Coil 109 closes its contacts 109c to provide a stick circuit through cam contacts CC4 which do not open until after "0" of the next (third) cycle. Coil 109 opens contacts 109a and 109b, respectively in the PCM and FCM clutch magnet circuits, causing deenergization of these clutch magnets (also see Fig. 3). Consequently, at the end of the second cycle, the picker feed and the feed of a card through analyzer B are interrupted. The first card CM, thus stays for the present, in a position just in advance of analyzer B brushes 21 and the second card stays in a corresponding position with respect to analyzer A brushes 17. While the cards are at rest during the third cycle, the automatic limit representing means are cleared of their previous limits. As explained previously, the automatic limit representing means comprises the entry receiving means shown in Figs. 6 and 6a for receiving entries of positions valued 9 to 1. In addition, the automatic representing means comprises relays settable to represent the zone positions, if any. The zone representing relays comprise relay coils ZR (Fig. 10b, upper half). There are eight columns of coils ZR, each colum being related to one limit order. Thus, the two left hand columns are the tens and units orders for the lower limit portion of section #1, the next two columns are the tens and units orders for the upper limit of section #1, after these come the tens and units orders of relay coils for the lower limit of section #2, and the last two columns relate to the tens and units orders for the upper limit of section #2. Each column has three zone representing coils, one for the "12" zone position, another for the "11" zone position, and the third for the "0" zone position, as indicated in Fig. 10b. When a zone representing coil is energized under control of a limit card, it is held through a stick circuit including the "a" contacts of the zone representing coil and a pair of normally closed reset cycle contacts 100 (also see Fig. 4). The common return line of the stick circuits for the coils of section #1 includes normally closed reset contacts 100 of this section, while the stick circuits of the coils of section #2 have a common return path extending through reset contacts 100 of section #2.

As described before, at the "11" point of the second cycle, coil 109 was energized, after which it was held through cam contacts CC4 into the "0" point of the third cycle. Coil 109, upon energization, opened its "a" and "b" contacts to cause deenergization of picker clutch magnet PCM and feed clutch magnet FCM to interrupt the feed of cards at the end of the second cycle. Coil 109 also closed its contacts 109d and 109e (Fig. 10b, lower half at the left). When cam contacts CC11 closed at "12" of the second cycle, the following circuit was established (Fig. 10b):

*Reset magnet 1RM.*—Line 106, magnet 1RM, contacts 109d, cam contacts CC11, to line 107.

A similar circuit is established through contacts 109e and CC11 to energize reset magnet 2RM.

Referring to Fig. 4, energization of magnet 1RM will cause the reset clutch 94 of section #1 to be rendered effective while magnet 2RM similarly prepares the reset clutch of section #2 to be effective. The reset clutches do not pick up the driven parts of the clutches until the beginning of the third cycle. Then, during the third cycle, while the cards are at rest, each of the reset gears 95 makes one revolution. During the revolution of the gear 95 in a section, the brushes 83 of the readout commutators shown in Fig. 6 are reset to zero position. Each of these commutators may have been set to position 9 to 1 to represent either a digit 9 to 1 or an intrazone position 9 to 1. When the commutator is in zero position, it represents the "0" digit. By resetting these commutators to zero in the manner described, any 9 to 1 position settings of the limits previously entered are canceled. At "14" of the reset cycle, cams 97 (see Fig. 4) on the reset cycle gears 95 operate levers 98 to open contacts 100. When these contacts open, the common return paths of the zone position representing relay coils ZR (Fig. 10b) are broken, and any such relay coils as have been previously energized are now deenergized. As a result, the representations of zone positions of previously entered limits are canceled.

At the "0" point of the third cycle, during which the reset cycle is taking place, and prior to the opening of cam contacts CC4 which maintain the stick circuit of coil 109 closed, cam contacts CC5 close, completing the following circuit (Fig. 10a):

*Coil 174.*—Line 106, coil 174, relay contacts 109f, cam contacts CC5, to line 107.

Coil 174 closes contacts 174a to provide a stick circuit for coil 174 through cam contacts CC6 which do not open until about "1½" of the next (fourth) cycle.

At "14" of the third (reset) cycle, cam contacts CC32 close, placing a coil 108 in parallel circuit with coil 174. Coil 108 closes its contacts 108c to provide a stick circuit extending through cam contacts CC33 which will not open until "13" of the following (fourth) cycle.

Cam contacts CC4 open shortly after "0" of the third (reset) cycle, breaking the stick circuit of coil 109. Contacts 109b in the circuit of clutch magnet FCM (Fig. 10b) reclose, preparing the feed rolls 19 and 20 and contacts roll 22 (Figs.

1 and 3) to resume operation at the beginning of the fourth cycle. When coil 108 was energized during the third cycle, contacts 108a in the circuit of clutch magnet PCM were opened. Accordingly, since coil 108 remains energized until "13" of the fourth cycle, the second card will remain at rest during the fourth cycle and the following (third) card will not be fed from the hopper. However, during the fourth cycle, the first card, CM will be fed through analyzer B. Until the "13" point of the fourth cycle, coil 108 will remain energized. Consequently, until then, the group of contacts 108d (Fig. 10a, lower left) will remain closed to enable limit entry circuits to be completed in the manner which will be described.

During the fourth cycle, the card CM is passing through analyzer B. Assume that in the tens column of the lower limit field relating to section #1, the limit card CM has a position "3." Then, at the "3" point of the fourth cycle, the following entry circuit will close (Figs. 10a and b):

*Intrazone position limit entry.*—Line 107, circuit breaker CB2, switch 123, card lever relay contacts 119b, contact roll 22 of analyzer B, the brush 21 sensing the "3" perforation in the tens order lower limit column related to section #1, the socket 121 of this brush, the plugwire (not shown) to the extreme left hand socket 165, the pair of 108d contacts in series therewith, the normally closed side of a pair of contacts 111c, wire 176 (turn to Fig. 10b), the normally closed side of relay contacts 177a, the extreme left hand entry magnet EM, to line 106.

Magnet EM, having been energized at the "3" cycle point, the gear 79 (Figs. 6 and 6a) of the related order will be clutched in for an advance of three steps in the manner described before, causing a brush 83 of the related readout commutator to come to rest on the commutator segment 184-4-0 (Fig. 3).

of the related zone coils ZR—0, 11, and 12 upon the sensing of a zone perforation in a limit column of the card.

It will be noted that if the limit column of the card designates a digit 9, 8, 7 . . . 2, or 1, it has a single perforation in the corresponding index position and does not have a zone perforation. Hence, for this latter case, the energization of magnet 177 and the shifting of its contacts 177a are immaterial since a zone perforation will not be sensed. If the limit card column is perforated only in the "0" index position, designating thereby the digit "0," then related coil 177 will remain unenergized, its contacts 177a will stay in normal condition, and the sensing of the "0" perforation will be unable to cause energization of the zone relay coil ZR—0.

Thus, the list contacts 91 of each limit order are utilized to enable a zone relay coil ZR—0, 11, or 12 to be energized under control of a zone perforation in the related card column only if a preceding 9 to 1 perforation has been sensed in the same card column.

Assuming, for instance, that the left hand column of automatic representing means of section #1 has received an entry of "3," the list contacts 91 of this column will be closed at "3" and remain closed. Accordingly, when cam contacts CC22 close at "1," the left hand coil 177 will be energized, closing its "b" contacts to provide a stick circuit through cam contacts CC23 and also shifting its contacts 177a. Assume, further, that the tens order lower limit (section #1) column of the limit card has a "0" zone perforation following the "3" intrazone perforation. When the "0" zone perforation is sensed by a brush 21, the following zone entry circuit is established at the "0" time (start with Fig. 10a):

*Zone entry circuit.*—Line 107, circuit breaker CB2, switch 123, card lever relay contacts 119b, in a section will be canceled during a reset cycle from the part of the representing means which represents positions 9 to 1 (also digit "0") and from the part of the representing means which represents zone positions 0, 11, and 12. The new limits represented on the limit card, last detected, will then be entered in the manner described above, during the cycle after reset and in which the limit card is moving through analyzer B.

Just before "0" of the cycle in which the limit card CM is traversing analyzer B, cam contacts CC6 open, breaking the stick circuit of coil 174 (Fig. 10a). It will be noted that a pair of normally closed contacts 108b is in the limit sorting circuit (Fig. 10a) which extends through comparison readout contacts 1CRb and socket 130 or through contacts 2CRb and socket 131. Coil 108, being energized until "13" of the cycle in which the limit card CM is traversing analyzer A, the contacts 108b remain open until after the "12" position of emitter EM1 has passed circuit closing position. Accordingly, the limit sorting circuit cannot be completed during the cycle in which card CM is passing analyzer B, and the card CM ordinarily will go to the reject pocket. At "13" of the same cycle, cam contacts CC33 open, breaking the stick circuit of coil 108. The relay contacts 108d in the limit-entry circuits thereupon reopen. Contacts 108b reclose to prepare the limit sorting circuit to be effective. Contacts 108a (Fig. 10b) also reclose, and the PCM clutch magnet circuit is reestablished. Accordingly, the picker feed and the feed of the card through analyzer A will resume during the next (fifth) cycle.

The manner in which limits are entered under control of all-limit cards has been explained. A description will now be given of the manner in which a single-limit card CS is detected and the limits for one section represented thereon entered into the automatic representing means.

*Operations relating to a single-limit card CS.*—The single-limit card CS (Fig. 5) has its right hand, lower corner cut away, contains the limits for a single section, and has a section-selection perforation which may be in any of the 9 to 1 positions of a special column. In Fig. 5, column 12 of card CS has selection perforation "4" for selecting section #1. The analyzer A brush 17 for sensing the special column has its socket 125 connected by a plugwire (not shown) to socket 167 (Fig. 10a, right), as previously explained. The switch 164 (Fig. 10a) has been closed and the other preliminary adjustments made in the manner described before. Assuming the section-selection perforation for section #1 is in the "4" position and the one for section #2 is in the "6" position, plug sockets 169 and 170 (Fig. 10b) are connected respectively, to plug sockets 168—4 and 168—6. Assume, further, that the machine has been started in operation in the manner previously explained and that a cycle is taking place in which a single-limit card CS with section-selecting perforation "4" is being fed from the hopper towards analyzer A. The cards are fed face down, so that the lower cut corner of the single-limit card is on the far side of the machine and in the path including card lever CL2 (Fig. 1). Ordinarily, card lever contacts CL2' are held open continually while cards C or CM are feeding through the machine. However, as the single-limit card has its lower right hand corner cut away, it misses the card lever CL2 for about the interval of a cycle point and a half. It may be explained at this point that a card feeding toward analyzer A operates card lever CL2 to open contacts CL2' at about "14" of the cycle. Due to the length of the card lever CL2, the card during the next cycle will maintain this card lever in operated condition and contacts CL2' open till about "14½." Meanwhile, the next card has engaged and operated the card lever CL2 at about "14." The effective length of the special cut corner of a card CS is about 1½ cycle points. Thus, if the first card of a stack is a card CS, the card lever contacts CL2' instead of opening at "14" of the first cycle, remain closed due to the special cut corner of the card CS until about "15½" of the cycle, as indicated in the next to last line of the timing chart, Fig. 9. If the card CS is an intermediate card of the stack, it is moved to analyzer A during an intermediate cycle. The previous card will maintain contacts CL2' open till "14½." The cut corner of card CS misses card lever CL2 from "14" to "15½." Therefore, if card CS is fed to analyzer A during an intermediate cycle, the abnormal closure of contacts CL2' is between "14½" and "15½" of the cycle, as indicated in the last line of the timing chart. Card lever contacts CL1' are closed as usual. Accordingly, with card lever contacts CL2' and CL1' closed, both card lever relay coils 118 and 117 (Fig. 10b) are energized and their relay contacts 118a and 117c are closed. Referring to Fig. 10a, with contacts 118a and 117c closed and switch 164 also closed, when cam contacts CC7 close at "15" (see Fig. 9), the following circuit is established (Fig. 10a):

*Coil 180.*—Line 107, switch 164, cam contacts CC7, relay contacts 117c, 118a, coil 180, to line 106.

Coil 180 closes its "a" contacts to provide a stick circuit through cam contacts CC10 which will not open until "13" of the next cycle. Referring to Fig. 10b, lower half, coil 180 closes contacts 180b in series with the common of emitter EM3. During the said next cycle, the single-limit card is passed through analyzer A. When the brush 17 of the column containing the section-selecting perforation senses the "4" perforation (for selecting section #1), the following circuit is established (start with Fig. 10a):

*Selective reset circuit.*—Line 107, circuit breaker CB1, the contact roll 18, the brush 17 sensing the section-selecting perforation "4," its socket 125, the plugwire (not shown) to socket 167, wire 181 (turn to Fig. 10b), a relay coil 182, now-closed contacts 180b, the "4" position of emitter EM3, the connected socket 168—4, the plugwire (not shown) to socket 169, reset magnet IRM, to line 106.

Energization of magnet IRM prepares section #1 for reset during the cycle following the one in which the single-limit card is analyzed by analyzer A. Coil 182 in the above circuit also has been energized and closes its contacts 182a (Fig. 10b, lower left) to complete a pickup circuit through a relay coil 183. Contacts 183a close, providing a stick circuit for coil 183 through cam contacts CC13 which does not open until "13" of the cycle. Coil 183 also closes contacts 183b and when cam contacts CC16 close at "12" of the cycle, a pickup circuit is established through relay coil 110. Coil 110 closes its contacts 110c to provide a stick circuit through cam contacts CC15 which will not open until "11" of the next cycle. Coil 110 also opens contacts 110a and 110b, respectively in the circuits of clutch magnets PCM and FCM (Fig. 10b, lower right). Accordingly, at the end of the cycle during which the single-limit card passes through analyzer A, the feed of this card and the feed of the following card and the operation of the pickers are interrupted. Thus, the single-limit card was detected due to its lower cut corner and then passed through analyzer A which sensed the section #1 selecting perforation to cause energization of magnet IRM. During the next cycle, while the cards are at rest, the reset operations with respect to section #1 take place in the manner already described.

During the cycle in which the single-limit card passed through analyzer A, the coil 110 was energized and held through its stick contacts 110c and cam contacts CC15. At "15" of the same cycle, cam contacts CC34 close, placing a coil 184 in parallel with coil 110. The resulting energization of coil 184 causes contacts 184a to close to provide a stick circuit for coil 184 through cam contacts CC35. The latter contacts do not open until about "14½" of the next cycle, i. e., during the cycle in which reset is to take place.

When coil 184 was energized, it also closed contacts 184b (lower middle of Fig. 10b). At "14" of the reset cycle, during which section #1 is being reset, normally open reset contacts 99 of this section (see Fig. 4) are momentarily closed, completing the following circuit (Fig. 10b):

*Coil 111 circuit.*—Line 107, now-closed contacts 184b, reset contacts 99 of section #1, coil 111, to line 106.

Coil 111 closes its stick contacts 111d to provide a stick circuit through cam contacts CC9 which remain closed until about "13½" of the cycle following the reset cycle.

At this point, it may be noted that had the single-limit card selected section #2 to be reset and receive new limits, the #2—99 contacts would have closed at "14" of the reset cycle and coil 112 would have been picked up and held until about "13½" of the following cycle through its "d" contacts and cam contacts CC9.

If coil 111 is energized, it opens contacts 111a in the PCM clutch magnet circuit, while if coil 112 is energized, it opens contacts 112a in this circuit. Since coil 111 or 112 when energized is held until about "13½" of the cycle following reset, contacts 111a or 112a will remain open for this interval, preventing the picker feed from operating. Hence, during the cycle following the reset cycle, the card following the single-limit card CS remains at rest in a position in which it has just closed card lever contacts CL1' and is about to enter analyzer A. Coil 110 was energized during the cycle in which the single-limit card passed through analyzer A and is held through cam contacts CC15 until "11" of the reset cycle. At this point, coil 110 is deenergized, and its contacts 110b in the FCM clutch magnet circuit reclose. Accordingly, the single-limit card CS, which during the reset cycle was at rest in a position in which it had just closed card lever contacts CL3' and is about to enter analyzer B, will resume feed during the cycle following the reset cycle. During said following cycle, the limits represented on the single-limit card will be analyzed by analyzer B and entered into the section selected by the card. Thus, if the single-limit card CS has selected section #1, coil 111 has been energized and will not deenergize until cam contacts CC9 open at about "13½" of the cycle following reset. If the single-limit card CS has selected section #2, coil 112 will be energized, also until about "13½" of said following cycle.

During said following cycle, the single-limit card is passing through analyzer B. Either coil 111 or 112 has been energized and either the contacts 111c or 112c (Fig. 10a, lower left) have been shifted. If contacts 111c are shifted, the limits represented on the single-limit card are entered in section #1 while if the contacts 112c are shifted, the limits will be entered in section #2. Assuming coil 111 is energized and its contacts 111c are shifted, then upon the sensing by a brush 21 of a limit-representing perforation in the single-limit card passing through analyzer A, a limit entry circuit is established which starts as follows (Fig. 10a):

*Limit entry derived from single-limit card.*—Line 107, circuit breaker CB2, switch 123, card lever contacts 119b, the contact roll 22, the brush 21 sensing the limit perforation, its socket 121, a plugwire (not shown) to a socket 166, connected wire 186, the left, now-closed side of a pair of contacts 111c, to a wire 176.

From wire 176, the entry circuit proceeds, in the manner described in connection with an all-limit card CM, either to the related entry magnet EM of section #1 if a limit position 9 to 1 has been sensed or to a zone representing coil ZR of section #1 if a zone position has been sensed after the previous sensing of an intrazone position in the same column.

In a similar manner, if contacts 112c had been shifted, the entry of the limit position represented on the single-limit card would have been routed to either an entry magnet or a zone representing coil of section #2.

With either coil 111, or 112 energized, its "b" contacts (Fig. 10a, upper center), common to the limit sorting circuits, are open. Coil 111 or 112 will be held through cam contacts CC9 until about "13½" of the cycle in which the single-limit card is being analyzed by analyzer B. Hence, for this period, the limit sorting circuit through emitter EM1 cannot be established, forcing the machine to route the limit card to the reject pocket. Means, described later, are provided to route the limit card to a different pocket than the reject pocket, if desired.

At about "13½" of the cycle in which the limits were read out of the single-limit card, cam contacts CC9 open, breaking the stick circuit of coil 111 or 112, whichever was energized. Contacts 111a or 112a reclose and reestablish the PCM clutch magnet circuit (Fig. 10b). Accordingly, the picker feed will resume operation at the beginning of the next cycle and the card following the single-limit card CS and which has been at rest just in front of sensing brushes 17 will be fed through analyzer A while the pickers will feed the next card from the hopper. The card following the single-limit card CS is a detail card C, and its detail data will be read out as it passes through analyzer A and compared with the limits which are read out during the same cycle from the automatic limit representing means.

The manner in which the automatic representing means is set to limits derived from limit cards CM and CS has been explained. A description will now be given of the manner in which the limits are read out of the automatic representing means to be compared each cycle with the detail data of a detail card passing through analyzer A.

*Limit readout from automatic representing means.*—It will be recalled that the automatic representing means comprises an intrazone and digit position representing part and a zone position representing part for each order of each limit. The intrazone and digit representing part comprises the readout commutators 83—84—85 settable to positions 0 to 9; these commutators are diagrammatically shown in Fig. 10d. The zone position representing part for each order comprises a column of three zone relay coils ZR—0, 11, and 12, as shown in Fig. 10b. Each column of zone relay coils controls two columns of relay contacts, one column containing the three normally open, parallel contacts ZR—0b, ZR—11b, and ZR—12b, and the other column including the three normally closed, serially connected contacts ZR—0c, ZR—11c, and ZR—12c, as shown in Fig. 10d. When a zone relay coil is energized, it stays energized, as explained before, until a reset operation initiated by a new limit card occurs. The energized zone relay coil closes its normally open "b" contacts and opens its normally closed "c" contacts.

The commutators 83—84—85 control the intrazone or digit limit readout coils whose reference designations include the middle letter I. The zone relay contacts "b" control the zone limit readout coils whose reference designations include the middle letter Z. When a column of zone relay contacts "c" remains closed, it causes energization of a related no-zone readout coil whose reference designation has the middle letter N.

An example of the readout of a limit from the automatic representing means will now be given. Assume that the tens order of the lower limit of section #1 is set to represent letter T, the code for which is 3—0. Accordingly, the left hand column of the commutators 83—84—85 is shown in Fig. 10d has one brush 83 on common segment 84 and the opposite brush on segment 85—3 to represent the intrazone position "3" of the limit T. Further, the left hand zone relay coil ZR—0, shown in Fig. 10b, is energized and is holding its contacts ZR—0b closed and its contacts ZR—0c open; the latter two contacts are shown at the extreme left of Fig. 10d. During each cycle, an emitter EM5 (at the right of Fig. 10d) successively connects the 9 to 0, 11, and 12 common lines 188 of the automatic representing means to the current side 107. In the denominational order taken as an example, the readout commutator is set to "3." Accordingly, at the "3" time of each cycle, the following circuit is completed (Fig. 10d):

*Intrazone limit readout.*—Line 107, the "3" position of emitter EM5, the "3" line 188, the "3" segment 85 of the commutator column at the extreme left, the brushes 83 of the commutator column, its common segment 84, the normally closed side "a" of the connected switch 136, the limit readout coil LIT (#1), to line 106.

The energized limit readout coil LIT of section #1 is effective at the "3" time to operate its "a" and "b" contacts (Fig. 10e) in the comparing circuits.

In the assumed example, the zone position is "0" and the contacts ZR—0b at the extreme left of Fig. 10d are closed. At the "0" time of the cycle, the following circuit is completed:

*Zone limit readout.*—Line 107, the "0" position of emitter EM5, the "0" zone line 188, the aforesaid closed contacts ZR—0b, wire 189, the normally closed "a" side of the connected switch 136, the coil LZT (#1), to line 106.

The energized coil LZT (#1) operates its "a" and "b" contacts in the comparing circuits at the "0" time.

In a similar manner, the other limits are read out of the automatic representing means.

The zone relay contacts "c" of each column are connected in series so that if any one of them is opened, a circuit cannot be completed through them. If a denominational order contains an alphabetic limit, it has a zone position represented by one energized zone coil ZR in a corresponding column. The energized zone coil opens its "c" contacts in the related column to prevent making a circuit through the contacts of the column. When the denominational order is set to represent any of the digits 0 to 9, then none of the zone relay coils ZR of the associated column is energized and, accordingly, none of the "c" contacts of the related column is open. A circuit will then be maintained through the column of closed "c" contacts to energize the related zone limit readout coil. For example, if the left hand column discussed previously is set to represent digit "3" instead of letter T, none of the "c" contacts in the column at the extreme left of Fig. 10d are open and a circuit is completed from line 107 through wire 190, through the ZR—0c, ZR—11c, and ZR—12c contacts in series, the normally closed side "a" of the connected switch 136, the coil LNT (#1), to line 106.

The manner in which the limits are read out of the automatic representing means each cycle has been explained. During each cycle, the detail data of a card C passing through analyzer A are also read out. In the same way as explained before in connection with comparison of detail data with limits read out of the manual limit representing means, the limits read out of the automatic representing means are compared to the detail data of each card C passing through analyzer A. The comparison operations, qualitative and quantitative are performed, as previously described, to determine whether the detail data was within the limits of section #1 or #2 or outside the ranges of both sections.

*Operations relating to single-limit cards CS'.*— Reference to Fig. 5 shows that a card CS' differs from a card CS in not having the special right hand cut corner and in having a "9" perforation in a special column 44. A succession of single-limit cards CS' may precede a group of detail cards C if a plurality of automatic limit representing sections are to be reset, one after another, to new limits. For operation with cards CS', a hand switch 164' (Fig. 10a, upper right) is closed, and a plugwire (not shown) is connected between a plug socket 191, wired to switch 164' and the socket 125 of the brush 17 for sensing the special column containing the reset-initiating perforation "9" of cards CS'. In Fig. 5, this special column is column 44. The machine is set in operation in the same manner as described before and during the cycle in which a card CS' is feeding to analyzer A, it holds contacts CL1' closed and CL2' open. During the next cycle, the card CS' is traversing the analyzer A and at the "9" time, the "9" perforation in the special column (column 44 in Fig. 5) is sensed, causing the following circuit to be established (Fig. 10a):

*Coil 180' pick-up circuit.*—Line 107, circuit breaker CB1, contact roll 18, the brush 17 sensing the "9" perforation in the special column, the brush socket 125, the plugwire (not shown) to socket 191, switch 164' cam contacts CC14 card lever relay contacts 117d, coil 180', to line 106.

Coil 180' closes its "a" contacts, providing a holding circuit through cam contacts CC37 which do not open until "0" (Fig. 9).

Coil 180' also closes its contacts 180'b (Fig. 10b, lower middle) which are in parallel with contacts 180b and serve in the same manner to prepare the Selective reset circuit for closure when a section-selecting perforation in the single-limit card is sensed. In Fig. 5 card CS' is shown as having a "6" perforation in column 12 for selecting section #2 to be reset. The remaining operations in connection with the card CS' are the same as described in connection with a single-limit card CS. A plurality of cards CS' may precede a detail card group, and each successive card CS' will control entry of new limits into a different automatic limit representing section.

AUTOMATIC PRESELECTION OF POCKETS

It has been explained hereinbefore that the sorting pockets to which the detail cards are routed according to whether their detail data are within the range of section #1 or #2 are manually preselected. The manual preselection was effected by extending plugwires (not shown) from sockets 130 and 131 (Fig. 10a) to sockets 132—9 to 12. Socket 130 is associated with section #1 and is wired to contacts 1CRb closed by the comparison readout coil 1CR if the detail data of a card were found to be within the range of section #1. Socket 131 is associated with section #2 and wired to contacts 2CRb closed by comparison readout coil 2CR if the detail data were found to be within the range of section #2. Thus, by plugging socket 130 to a socket 132, the limit sorting circuit for cards lying within the range of section #1 would be closed at the time indicated by the segment corresponding to the manually selected socket 132 and the corresponding sorting pocket would be selected for such cards. Similarly, a limit sorting circuit for cards within the range of section #2 would be closed at a differential time determined by the particular socket 132 plugged to socket 131 and a corresponding sorting pocket would be selected for such cards.

Provisions are made for preselecting the pockets automatically, instead of manually, for cards within the range of section #1 or #2. The automatic preselection of pockets is controlled by perforations in special columns of the limit cards. These perforations are in positions corresponding to the pockets which are to be automatically preselected for cards within the ranges of the sections #1 and #2. The limit card CM may have two such special columns, one with a perforation to preselect the sorting pocket for cards within the range of section #1 and the other with a perforation to preselect the pocket for cards within the range of section #2. As an example, the card CM in Fig. 5 has special columns 13 and 14 for containing the pocket preselecting perforations. Column 13 is provided, for example, with a "2" perforation to preselect pocket 25—2 (Fig. 2) for cards within the range of section #1 and column 14 is provided with perforation "1" to preselect pocket 25—1 for cards within the range of section #2. The single-limit card CS or CS' will have only one special column perforated to preselect a pocket for cards lying within the range of the section in which new limits are to be entered from the single-limit card. Thus, in Fig. 5, card CS has special column 13 perforated in position "3" to preselect pocket 25—3 for cards lying within the range of section #1 in which the card CS shown in Fig. 5 is to enter new limits. Card CS' shown in Fig. 5 has special column 14 with perforation "4" to preselect the "4" sorting pocket for cards within the range of section #2 to which the card CS' shown in Fig. 5 pertains. The limit card CM at the head of a group of detail cards will thus preselect pockets for sections #1 and #2 to which the detail cards which follow the limit card and precede the next limit card will be sorted according to whether their detail data are within the range of section #1 or #2. The single-limit card will preselect a pocket for the section to which the card pertains and to which the detail cards of the group headed by the single-limit card will be sorted when the detail data lie within the limits of this section.

When the machine is to preselect pockets automatically, the operator preliminarily extends a plugwire (not shown) from a plug socket 192 (Fig. 10a, right) to the socket 121 of the brush 21 adapted to sense the special column (column 13 in Fig. 5) containing the perforation for preselecting the pocket related to section #1. Another plugwire (not shown) is connected between a socket 193 (lower right, Fig. 10a) and the socket 121 of the brush 21 adapted to sense the column (column 14 in Fig. 5) which contains the perforation to preselect the pocket related to section #2. Further, instead of plugging sockets 130 and 131 to sockets 132 (Fig. 10a), socket 130 (related to section #1) is connected by a plugwire (not shown) to a socket 194, while plug socket 131 (related to section #2) is connected by a plugwire (not shown) to a socket 195.

*Automatic pocket preselection by a card CM.—* It will be recalled that during the cycle in which a limit card CM passed through analyzer A, its special "11" control perforation was sensed to cause energization of coil 109 (Fig. 10a, upper center). This cycle in which the card CM passes through analyzer A may be referred to, for convenience, as the second cycle (the first cycle is the one in which the card was fed out of the hopper). Coil 109, upon energization, closed its stick contacts 109c to provide a holding circuit, through cam contacts CC4 (see also Fig. 9) which will be held until about "0½" of the third cycle. Coil 109 also opened contacts 109a and 109b in the PCM and FCM clutch magnet circuits (Fig. 10b), causing the card CM and the following card to remain at rest during the third cycle. Contacts 109d and 109e also closed to form the circuits of reset magnets 1RM and 2RM (Fig. 10b, left) so that reset of section #1 and #2 would take place during the third cycle. During the reset cycle, cam contacts CC5 closed at about "0" and in conjunction with the still-closed contacts 109f picked up coil 174 (Fig. 10a) which closed its "a" contacts to provide a holding circuit for the coil through cam contacts CC6 until about "1½" of the fourth cycle. At about "14" of the third cycle, cam contacts CC32 closed placing coil 108 (Fig. 10a) in parallel circuit with coil 174. Coil 108 then closed its stick contacts 108c to provide a holding circuit through cam contacts CC33 until about "13½" of the fourth cycle. When coil 109 was deenergized at about "0½" of the third (reset) cycle, the FCM clutch magnet circuit was reestablished to resume the feed of card CM at the beginning of the fourth cycle, and during this latter cycle, card CM proceeded through analyzer B. As card CM traversed analyzer B, its limit representing perforations were sensed to close limit entry circuits to enter the new limits in the automatic representing means of both sections.

During the third cycle, when resetting took place, the reset contacts 102 of both sections (see Fig. 4) closed momentarily at about "14." At this point, coil 108 is energized and its contacts 108f (Fig. 10a, right side, center) are closed. With contacts 102 of sections #1 and #2 closed and contacts 108f also closed, the following circuit is established:

*Coils 196 and 197.*—Line 107, contacts 108f, through the path including reset contacts 102 of section #1 and a coil 196 and in parallel through the path including reset contacts 102 of section #2 and a coil 197, to line 106.

Coils 196 and 197 are both energized by the above circuit; each coil closes its "a" stick contacts to hold the coil through common cam contacts CC31 which do not open until about "12½" of the fourth cycle (the cycle following the reset cycle), in which the limit card CM traverses analyzer B. Coil 196, upon energization, closes its contacts 196b, and coil 197, upon energization, closes its contacts 197b (Fig. 10a, right, lower). Contacts 196b are wired to socket 192 preliminarily plugged to the brush 21 for sensing the special column containing the pocket-preselecting perforation for section #1, while contacts 197b are wired to socket 193 plugged to the brush 21 for sensing the special column containing the pocket-preselecting perforation for section #2. As the card CM traverses analyzer B, the pocket-preselecting perforations are sensed by the brushes 21 to complete circuits at differential times corresponding to the values of the perforations. For example, if the pocket preselecting perforation for section #1 is "2," the following circuit is completed at the "2" time of the fourth cycle:

*Automatic pocket preselection control.*—Line 107, circuit breaker CB2, switch 123, card lever relay contacts 119b, contact roll 22, the brush 21 sensing the "2" perforation in the special column for section #1, the brush socket 121, the plugwire (not shown) to socket 192, now-closed contacts 196b, the "2" position of emitter EM6, the connected coil 198—2, to line 106.

Coil 198—2 closes its "a" stick contacts to provide a holding circuit through normally closed reset contacts 101 of section #1 (see also Fig. 4). These reset contacts remain closed until another reset cycle takes place under control of the next limit card CM or of a single-limit card for section #1 following the group of detail cards preceded by the limit card now passing through analyzer B. Thus, the energized coil 198 will be held until the next reset cycle.

Energized coil 198—2 also closes and maintains closed its contacts 198b—2 (Fig. 10a) wired at one side to the "2" spot of emitter EM1 and at the opposite side to plug socket 194 preliminarily plugged to section #1 socket 130. Thus, if a detail card has data within the limits of section #1, contacts 1CRb will be closed and a limit sorting circuit will be completed from line 107 through contacts 112b, 111b, 108b, 1CRb, socket 130, the plugwire (not shown) to socket 194, closed contacts 198—2, the "2" position of emitter EM1, switch 122, sorting magnet SM, to line 106. The card will thereby be directed to the "2" pocket 25 automatically preselected by closed contacts 198—2 for cards within the range of section #1.

Similarly, if the pocket preselecting perforation in the limit card, instead of being perforation "2" for section #1, were one of the other perforations in the special column for section #1, one of the other coils 198 would have been energized and one of the other contacts 198b would have been maintained closed. All the 198b contacts are wired in parallel to the #1 section socket 194 to enable the limit sorting circuit, such as traced above, to be completed through any one of the closed pair of contacts 198b—9 to 0, 11 and 12.

In a similar manner, the sensing of the perforation, in the limit card, for preselecting a pocket for section #2 will close an Automatic pocket preselection control circuit similar to the one traced above except that it extends through the brush 21 sensing the column assigned to section #2, its plug connections to socket 193, closed contacts 197b, emitter EM7, and one of the control coils 199—9 to 0, 11, 12. The energized coil 199 closes its "a" stick contacts to provide a holding circuit through reset contacts 101 of section #2. The coil 199 also closes its contacts 199b wired at one side to a corresponding spot of emitter EM1 and at the opposite side to the socket 195 preliminarily plugged to the socket 131 associated with section #2. All of the 199b contacts are connected in parallel to the socket 195 so that the limit sorting circuit for cards whose data lie within the range of section #2 will be completed through any of the closed contacts 199b.

In the foregoing manner, the limit card CM may automatically preselect sorting pockets for a plurality of sections and to which the detail cards following the limit card will be sorted according to whether their detail data are within the limits of one section or another.

*Automatic preselection of pockets by single-limit cards.*—A single-limit card will have only one special column containing a pocket-preselecting perforation for the section into which new limits are to be entered from the single-limit card. It will be recalled that when a single-limit card was detected, it caused a Selective reset circuit to be established through the magnet 1RM or 2RM (Fig. 10b, left) depending on which section the single-limit card related to. The Selective reset circuit also energized a coil 182 which closed its "a" contacts to pick up a coil 183 (Fig. 10b, lower left). Coil 183 closed its "a" contacts to provide a holding circuit through cam contacts CC13 which remained closed until "13" of the cycle in which the single-limit card traversed analyzer A. This cycle may be referred, for convenience, as the second cycle. Coil 183 also closed its contacts 183b to pick up a coil 110 which was held through its contacts 110c and cam contacts CC15 until about "11" of the third (reset cycle). Coil 110 also opened its "a" and "b" contacts to break the circuits of clutch magnets PCM and FCM so as to interrupt card feed during the reset cycle. When cam contacts CC34 closed at "15" of the second cycle, coil 184 (lower left, Fig. 10b) was picked up. Coil 184 closed its "a" contacts to provide a holding circuit through cam contacts CC35 which remained closed until "13" of the third (reset) cycle. Coil 184 also closed contacts 184b, so that when reset contacts 99 of the section selected for resetting by the single-limit card closed at "14" of the reset cycle, the coil 111 or 112, depending on which section is being reset, was energized. Coil 111 or 112, whichever was energized, closed its "d" contacts to provide a holding circuit through cam contacts CC9 which remained closed till about "13½" of the fourth cycle. When coil 110 was deenergized at "11" of the reset cycle, the circuit of clutch magnet FCM was reestablished so that feed of the single-limit card should resume at the beginning of the fourth cycle. During this fourth cycle, the single-limit card traverses analyzer B.

Meanwhile, at "14" of the reset cycle when coil 111 or 112 was energized, reset contacts 102 of the section being reset also closed. Coil 111, if energized, closed its contacts 111f, while coil 112, if energized, closed its contacts 112f (Fig. 10a, right). These contacts 111f and 112f are each in parallel with contacts 108f. Thus, if section #1 is being reset, its contacts 102 will be closed at the same time as contacts 111f are closed and the circuit of coil 196 will be established. If section #2 is being reset, contacts 102 of section #2 and contacts 112f will close during overlapping periods, and coil 197 will be energized. If coil 196 is energized, it closes its contacts 196b, while if coil 197 is energized, it closes contacts 197b. Then, during the fourth cycle (following the reset cycle) as the single-limit card is traversing analyzer B, an Automatic pocket preselection control circuit such as traced before, will be established through a coil 198 if the card pertains to section #1 or through a coil 199 if the card pertains to section #2. A coil 198, if energized, will maintain its "b" contacts closed to preselect the pocket for detail cards within the range of section #1 and a coil 199 if energized, will close its "b" contacts to preselect a pocket for detail cards within the range of section #2.

If the single-limit card pertains to section #1, it will be perforated with the desired pocket-preselecting perforation in the special column (column 13 in Fig. 5) assigned to section #1. If the single-limit card pertains to section #2, it will have a desired pocket-preselecting perforation in the special column (column 14 in Fig. 5) assigned to section #2.

*Variations in pocket selections.*—It has been explained hereinbefore that limit cards CM, CS, and CS' and detail cards whose detail data are outside the limit bounds of all the sections are ordinarily routed to the reject pocket. It may be desired, instead, to direct limit cards to a pocket other than the reject pocket and out-of-bounds detail cards to a pocket other than the reject pocket. Means are provided for sending limit cards and out-of-bounds detail cards to any desired pockets.

*Alternative pocket selection for limit cards.*—If it is desired to send limit cards CM to a pocket other than the reject pocket, the operator preliminarily connects a plugwire (not shown) between a socket 205 (top center of Fig. 10a) and the socket 132 corresponding to the desired pocket to which the limit cards CM are to be directed. If it is desired to send limit cards CS or CS' pertaining to section #1 to a pocket other than the reject pocket, the operator preliminarily plug-connects a socket 206 (top center of Fig. 10a) to the socket 132 corresponding to the desired alternative sorting pocket. If it is desired to send cards CS or CS' pertaining to section #2 to a pocket other than the reject pocket, the plug socket 207 is connected to the socket 132 corresponding to the alternative desired pocket. Socket 205 is wired to contacts 108e, socket 206 to contacts 111e, and socket 207 to contacts 112e.

During the cycle in which a limit card CM is passing through analyzer B, coil 108 is held energized until "13" of the cycle, as explained hereinbefore. Contacts 108b are open to prevent completion of the limit sorting circuit through contacts 1CRb or 2CRb (Fig. 10a) so that ordinarily the card CM will go to the reject pocket. As coil 108 is energized, its contacts 108e are closed and if the plug socket 205 has been plugged to a socket 132, a pocket-selecting circuit will be established from line 107 through contacts 108e, socket 205, the plugwire (not shown) to a desired socket 132, the connected position of emitter EM1, switch 122, sorting magnet SM, to line 106. The card CM will thereby be routed to a desired pocket other than the reject pocket.

While a single-limit card for section #1 is passing through analyzer B, coil 111 is energized in the manner previously explained, and its contacts 111e are closed. If socket 206 is plugged to a socket 132, a limit-sorting circuit will be completed from line 107 through contacts 111e, socket 206, the plugwire (not shown) to a desired socket 132, and thence through emitter EM1, switch 122, and magnet SM, to line 106. The single-limit cards for section #1 will thereby be sorted to any desired pocket other than to the reject pocket.

While a single-limit card pertaining to section #2 is traversing analyzer B, coil 112 is energized, closing its contacts 112e. If socket 207 is plugged to a socket 132, a circuit will be completed from line 107 through contacts 112e, socket 207, the plugwire (not shown) to the selected socket 132 and thence as in the previous circuits. Thus, the single-limit card pertaining to section #2 may be sorted to any selected pocket instead of to the reject pocket.

*Selective pocket selection for out-of-bounds detail cards.*—When it is desired to direct out-of-bounds detail cards to a pocket other than the reject pocket, the operator preliminarily connects a plugwire (not shown) between a socket 208 (Fig. 10a, center) to a socket 132. When a detail card is outside the limit bounds of sections #1 and #2, neither the coil 1CR nor 2CR is energized and both contacts 1CRc and 2CRc remain closed during the cycle in which this detail card is traversing analyzer B. Contacts 1CRc and 2CRc are in series with socket 208 and if this socket has been plugged to a socket 132, a circuit will be established from line 107 through safety contacts 112b, 111b, 108b, contacts 1CRc, contacts 2CRc, socket 208, the plugwire (not shown) to a selected socket 132, the connected position of emitter EM1, switch 122, sorting magnet SM, to line 106.

Thus, out-of-bounds detail cards may be directed to any desired pocket instead of to the reject pocket.

While the fundamental novel features of the invention have been pointed out as applied to the structure shown and described, it will be understood that various omissions and substitutions and changes in the form and details of the devices illustrated and in their operation may be made by those skilled in the art without departing from the spirit of the invention. It is the intention therefore to be limited only as indicated by the scope of the following claims.

What is claimed is:

1. In a machine for operating on a record on which a chosen, individual character is codally represented by a combination of a plurality of marked points forming component characteristics according to a given code in which each character has its own individual codal representation, means to sense the component codal characteristics of the record character, settable representing means comprising a plurality of individually settable representing parts, each to represent one of component characteristics of a control character, means controlled by the sensing means and one representing part to compare a component characteristic of the record item with a component characteristic of the control character and including a device operated when the latter characteristic is greater, means controlled by the sensing means and another of the representing parts for separately comparing other component characteristics of the record item and control character and including other devices operated selectively according to the relative magnitude of the latter characteristics, sorting means to sort the record to one of different locations, and means controlled by the plurality of comparing means according to the selective operations of the first and second mentioned devices for controlling the sorting means to sort the record to one of said locations.

2. In a machine for operating on a record on which a chosen, individual character is represented by zone and intrazone markings combining to form component codal characteristics according to a given character code in which each character has its own individual codal representation, means to sense the characteristics on the record, representing means comprising a settable zone representing part and a separately settable intrazone representing part to represent zone and intrazone characteristics of a control character, comparing means including means controlled by the sensing means and the representing parts to separately compare the zone characteristics and the intrazone characteristics of the record and control characters and including means for correlating the separate comparisons to determine whether the record item as a whole or the control character as a whole is greater, sorting means to sort the record to one of a plurality of locations, and means controlled by the comparing means according to whether the record character or control item is greater for causing the sorting means to sort the record to one of said locations.

3. In a machine for operating on a record on which a chosen, individual character is represented by a combination of marked points forming codal component characteristics according to a given code of character representation in which each character has its own codal representation, means to sense the component characteristics of the character on the record, a lower limit representing means and an upper limit representing means with each representing means including a plurality of representing parts to represent one of the component characteristics of a limit character, comparing means including means controlled by the sensing means and the representing parts for separately comparing the component characteristics of the record character with the component characteristics of each limit item and also including means to correlate the separate comparisons to ascertain whether the record character as a whole is within the range of the lower and upper limit characters, sorting means to sort the record to any one of a plurality of locations, and means controlled by the comparing means for controlling the sorting means to sort the record selectively to one of the locations depending on whether the record character is within or outside the range of limit characters.

4. In a machine for operating on a record on which an individual character is represented by a combination of marked points forming codal component characteristics according to a given code, means to sense the component characteristics of the character on the record, means to represent concurrently the lower and upper limits of a plurality of distinct, collateral limit ranges, comparing means controlled by the sensing means according to the component characteristics of the sensed character and by the representing means according to the limits represented thereby concurrently comparing the sensed character with the limits of the plurality of the ranges for determining whether the limits of one range or another encompass the character represented by the component characteristics, sorting means for sorting the record to any of a plurality of locations, and means controlled by the comparing means for causing the sorting means to selectively sort the record to one or another of the locations depending on which limit range encompasses the record character.

5. In a machine for operating on a run of records issuing from a common stack and containing detail records preceded by a special record, mechanism for feeding the records successively from said stack through the machine along a common feed path, means for sensing the special record for combinational data designations of control data, settable data representing means, means controlled by the sensing means for setting the representing means according to the combinational designations sensed on the special record, and means controlled by the representing means according to their setting and by the detail records according to designations of detail data thereon for determining whether the detail data or the control data are of greater magnitude.

6. In a cyclically operating machine for operating on a record on which a chosen character is represented by a combination of marked index points forming codal component characteristics according to a given code in which each character has its own codal representation, means for analyzing the record for character characteristics, item storing means comprising a plurality of electrical representing organizations separately conditionable to represent and store separate characteristics of a character, means controlled by the analyzing means for separately conditioning the representing organizations to store electrical representations of the characteristics of the record character, cyclically operating means, and circuits controlled by the cyclically operating means and the electrical representing organizations during each of successive cycles after the character characteristics have been stored for reading out said character characteristics from the representing organizations.

7. In a machine for operating on a record on which a chosen, individual character is represented by a combination of marked index points forming codal component characteristics according to a given code in which each character has its own codal representation, electrical means for analyzing the record for item characteristics, character representing means comprising a commutator organization settable to represent one of the characteristics of a character and a relay organization conditionable to represent another of the characteristics of a character, means controlled by the analyzing means for setting the commutator organization to represent one of the characteristics of the record character, and means controlled by the analyzing means for selectively conditioning the relay organization to represent another characteristic of the record character.

8. In a machine for operating on a record on which an item may be represented by component characteristics according to a given code, means for analyzing the record for said characteristics, item representing means comprising a first part conditionable to represent one component characteristic and a second part conditionable to represent a second component characteristic of an item, means controlled by the analyzing means according to one characteristic on the record for conditioning said first part accordingly, means controlled by the analyzing means according to the second characteristic on the record and dependent further upon the conditioning of said first part for conditioning the second part to represent the second characteristic and comparing means to compare the item represented by said parts with representations of another item and including means to read out the said parts for the characteristics represented thereby.

9. In a machine for operating on a record which may bear any of different kinds of data, means to represent upper and lower limit data of a limit range, means to sense the record for data, means controlled by the sensing means and the representing means for effecting a quantitative comparison of the sensed data with the upper and lower limit data, means controlled by the sensing means and the representing means for effecting a qualitative comparison of the sensed data with the limit data to ascertain whether the sensed data and limit data agree in kind, and means controlled by the quantitative and qualitative comparing means for controlling operation of the machine.

10. In a machine for operating on records bearing data and control designations, mechanism for feeding the records in succession through the machine, means for sorting the records to different destinations, means controlled by a special record according to any one of different possible control designations thereon for preselecting one destination or another destination for records according to whether one or another of said control designations is present on the special record, means for representing control data, means also controlled by the special record according to control data designations thereon for setting the representing means to represent said control data, means for sensing the records following the special record for data designations, means controlled by the sensing means and the representing means for comparing the data on such following record with the control data, and means controlled by the comparing means and the destination preselecting means for controlling the sorting means to sort such following record to the preselected destination.

11. In a machine for operating on records bearing data, means for representing upper and lower limits of a limit range, means for sensing the records for data, means controlled by the sensing means and the representing means for ascertaining whether data sensed on a record are within or outside the limits of the range, means controlled by the ascertaining means for locating records with data encompassed by the limit range at a given destination, means for locating records with data outside the limit range at another destination, and record-controlled means for variably selecting the latter destination.

12. In a machine for operating on a run of records bearing data representations, means for storing and representing a limit range including a lower limit representing part and an upper limit representing part, means for analyzing a special record for limit data, means controlled by the analyzing means for conditioning the representing means according to the limit data, means for sensing a record or records following the special records for data, means controlled by the sensing means for ascertaining whether the limit range encompasses the data on such following record, means for sorting the records to different destinations, means controlled by the ascertaining means for controlling the sorting means to sort such following record to a given destination when the limit range encompasses the data on the latter record, means for causing the sorting means to sort the special record to a destination, and means for variably selecting the destination to which the special record is sorted.

13. In a machine operating on records bearing data represented by component characteristics according to a combinational designation code, means to sense the characteristics of data on the records, devices given a combinational setting under control of the sensing means according to component characteristics of control data on a control record presented to the sensing means, said devices being constructed and arranged to retain their setting after cooperation between the sensing means and the latter record has ceased, means effective after the said cooperation has ceased for comparing component characteristics of detail data on subsequently presented records with the combinational setting of the devices to determine the relative magnitude of the detail data and the control data, means selectively operable under control of the comparing means to manifest different relative magnitudes of the control data and the detail data, and record-controlled means for automatically resetting said devices.

14. In a machine operating on limit and detail records bearing plural order character data including one or more characters individually designated by a combination of marked index points forming codal component characteristics of a character according to a given combinational designation code in which each character has its own codal designation independent of the order in which the character may be found, means to sense the characteristics of data on the records, a plurality of orders of upper and lower limit data storing means, each limit means of an order including devices settable combinationally according to component characteristics of limit data characters, means for imparting combinational settings to the devices of the upper and lower limit data storing means under control of the sensing means and according to upper and lower limit data characteristics sensed thereby, means for comparing detail data component characteristics sensed by the sensing means with the combinational settings of the upper and lower limit devices to determine whether the detail character data is encompassed by the upper and lower limit character data, and means controlled by the comparing means for manifesting the result of the comparison.

15. In a machine operating on a record on which plural order character data includes one or more chosen characters individually represented by component codal characteristics according to a given character code, means to sense the record for codal characteristics, plural order representing means settable to represent plural order control data and comprising in each order a plurality of individually settable representing parts, each settable to represent one of the component codal characteristics of a control character in an order of the control data, means controlled by the sensing means and one representing part of an order to compare a component characteristic of a control character in said order with a component characteristic of a chosen character in a related order of the record data, said comparing means including devices selectively operated according to the relative magnitude of the latter component characteristics, means controlled by the sensing means and another of the representing parts of said order of the representing means for separately comparing other component characteristics of the latter control and record characters and including other devices selectively operated according to the relative magnitude of the latter characteristics, sorting means to sort the record to one of different locations, and means controlled by the plurality of comparing means according to the selective operation of the first and second mentioned devices for controlling the sorting means to sort the record to one of said locations.

16. In a machine as defined in claim 2, said correlating means including means to cause the zone characteristics comparing means to dominate the intrazone characteristics comparing means.

17. In a machine operating on a record bearing plural order data of which one or more chosen characters are represented individually by combinations of marked points forming component codal characteristics of the character representation according to a character code in which each character has its own codal representation, means to sense the record for codal characteristics, a plurality of representing means, each having plural order limit representing means to represent the plural order limits of a different limit range, comparing means controlled by the sensing means according to component characteristics of characters in said plural order record data and by the representing means for each limit range according to the limits represented thereby for concurrently comparing the record data with the limits of each of the plurality of limit ranges, said comparing means including a plurality of between-limit manifesting devices, one device for each limit range, each device selectively operated when the record data is within the limits of the related range, and means selectively controlled by said manifesting devices according to their selective operation for sorting the record to one or another destination according to which of the limit ranges encompasses the record data.

18. In a machine operating on detail records preceded by a special record and arranged in a common supply stack, means to feed the special record and thereafter the detail records, one after another, from said common stack, means for sensing the special record fed from the stack for combinational data designations of control data, settable data representing means, means controlled by the sensing means for setting the representing means according to the combinational data designations sensed on the special record, a plurality of comparison manifesting devices operated selectively under control of the representing means according to the setting thereof and under further control of the detail records, one after another, according to designations of detail data thereon, one said device being operated to manifest superiority of the control data and the other being operated to manifest superiority of detail data, and machine controlling means selectively effective under joint control of said devices according to whether the control data or the detail data of each successively fed detail record are of greater magnitude.

19. In a machine as defined in claim 7, said character representing means having its relay organization comprised of a plurality of relays, each representative of a different character distinguishing codal characteristic, said relays being selectively settable under control of the analyzing means depending upon the distinguishing codal characteristic of said chosen character on the record, and circuit means for sustaining the said relay organization in the latter condition.

20. In a machine as defined in claim 13, said control record and said subsequently presented records being arranged in a common supply stack and means to feed the control record and the other records from the common stack and along a common feed path, one record after another.

ARTHUR H. DICKINSON.
ROBERT T. BLAKELY.